United States Patent
Jung et al.

(10) Patent No.: US 10,852,699 B2
(45) Date of Patent: Dec. 1, 2020

(54) WEARABLE ELECTRONIC DEVICE AND OPERATION METHOD THEREOF

(71) Applicant: Samsung Electronics Co., Ltd., Gyeonggi-do (KR)

(72) Inventors: Han-Soo Jung, Gyeonggi-do (KR); Giang Yoon Kwon, Seoul (KR); Youngseong Kim, Seoul (KR); Hyunyeul Lee, Seoul (KR)

(73) Assignee: Samsung Electronics Co., Ltd.

( * ) Notice: Subject to any disclaimer, the term of this patent is extended or adjusted under 35 U.S.C. 154(b) by 263 days.

(21) Appl. No.: 15/382,962

(22) Filed: Dec. 19, 2016

(65) Prior Publication Data

US 2017/0176950 A1    Jun. 22, 2017

(30) Foreign Application Priority Data

Dec. 18, 2015 (KR) .................. 10-2015-0182277

(51) Int. Cl.
| | |
|---|---|
| *G04G 9/06* | (2006.01) |
| *G04G 9/00* | (2006.01) |
| *G01C 21/00* | (2006.01) |
| *G06F 1/16* | (2006.01) |
| *G06F 3/0482* | (2013.01) |

(Continued)

(52) U.S. Cl.
CPC .............. *G04G 9/00* (2013.01); *G01C 21/00* (2013.01); *G04B 19/225* (2013.01); *G04G 9/0064* (2013.01); *G04G 9/02* (2013.01); *G04G 21/00* (2013.01); *G04G 21/04* (2013.01); *G04G 21/08* (2013.01); *G06F 1/163* (2013.01); *G06F 3/0362* (2013.01); *G06F 3/0482* (2013.01);

(Continued)

(58) Field of Classification Search
CPC .......... G04G 9/00; G04G 21/04; G04G 21/08; G04G 9/02; G04G 9/06; G04G 9/064; G04B 19/225; G04B 21/00; G08G 1/005
See application file for complete search history.

(56) References Cited

U.S. PATENT DOCUMENTS 9,373,259 B2 * 6/2016 Maitra .................. G08G 1/123
9,794,397 B2 * 10/2017 Min .................. H04M 1/72583
(Continued)

FOREIGN PATENT DOCUMENTS

| KR | 1020060051353 | 5/2006 |
|---|---|---|
| KR | 1020100132226 | 12/2010 |

(Continued)

OTHER PUBLICATIONS

Korean Office Action dated Jan. 20, 2020 issued in counterpart application No. 10-2015-0182277, 13 pages.
(Continued)

*Primary Examiner* — Sean Kayes
(74) *Attorney, Agent, or Firm* — The Farrell Law Firm, P.C.

(57) ABSTRACT

A wearable electronic device and an operation method thereof are provided. The wearable electronic device includes a display configured to display a clock screen using an hour hand and a minute hand, and a processor configured to execute an application for displaying an icon including time information, and to display the icon in a location of the time information in a minute area of the clock screen or an hour rotation area of the clock screen when the application is executed.

20 Claims, 69 Drawing Sheets

(51) Int. Cl.
  *G08G 1/005* (2006.01)
  *G04G 9/02* (2006.01)
  *G04G 21/04* (2013.01)
  *G04G 21/08* (2010.01)
  *G04B 19/22* (2006.01)
  *G04G 21/00* (2010.01)
  *G06F 3/0362* (2013.01)
  *G06F 3/0484* (2013.01)
  *G06F 3/0481* (2013.01)

(52) U.S. Cl.
  CPC ......... *G06F 3/04842* (2013.01); *G08G 1/005* (2013.01); *G06F 3/04817* (2013.01)

(56) References Cited

U.S. PATENT DOCUMENTS

| | | | |
|---|---|---|---|
| 10,025,399 B2* | 7/2018 | Kim | G06F 3/0485 |
| 10,088,809 B2* | 10/2018 | Lee | G06F 3/03547 |
| 10,168,891 B2* | 1/2019 | Choi | H04M 1/72519 |
| 2006/0073851 A1 | 4/2006 | Colando et al. | |
| 2014/0347289 A1 | 11/2014 | Suh et al. | |
| 2015/0205509 A1* | 7/2015 | Scriven | G06Q 10/1093 715/834 |
| 2016/0179353 A1* | 6/2016 | Iskander | G06F 3/04847 715/765 |
| 2017/0168461 A1* | 6/2017 | Bang | G04G 17/045 |
| 2018/0101142 A1* | 4/2018 | Dudhat | G04G 99/006 |

FOREIGN PATENT DOCUMENTS

| | | |
|---|---|---|
| KR | 1020140137170 | 12/2014 |
| KR | 1020150062761 | 6/2015 |

OTHER PUBLICATIONS

Korean Office Action dated Jul. 31, 2020 issued in counterpart application No. 10-2015-0182277, 13 pages.

* cited by examiner

WEARABLE ELECTRONIC DEVICE AND OPERATION METHOD THEREOF

PRIORITY

This application claims priority under 35 U.S.C. § 119(a) to Korean Patent Application Serial No. 10-2015-0182277, which was filed in the Korean Intellectual Property Office on Dec. 18, 2015, the entire content of which is incorporated herein by reference.

BACKGROUND

1. Field of the Disclosure

The present disclosure generally relates to a wearable electronic device and an operation method thereof.

2. Description of the Related Art

As digital technologies have developed, various types of electronic devices are widely utilized, such as a smart phone, a tablet personal computer (PC), a personal digital assistant (PDA), an electronic organizer, a notebook, a wearable device, and the like. The electronic devices have reached a level of mobile convergence that includes the functions of other devices. For example, the electronic devices may provide various functions, for example, a call function, such as a voice call, a video call, and the like, a message transmission/reception function, such as a short message service (SMS)/multimedia message service (MMS), an e-mail, and the like, an electronic organizer function, a photographing function, a broadcasting program playback function, a video playback function, a music playback function, an Internet function, a messenger function, a game function, a social networking service (SNS) function, and the like.

Electronic devices have been designed in various forms. One of the various forms is a wearable electronic device. The wearable electronic device may be worn on a body part of a user.

A wearable electronic device may display operation information of a subway, a bus, and the like by containing an application for providing the operation times of public transportation. A general application displays public transportation information as a list and, thus, a user needs to recognize the transportation information through text. Also, in the case of the transportation information displayed in an electronic device, a large amount of information is included in a small size screen and a user may have difficulty in recognizing the information. Also, the transportation information displayed in the electronic device provides only information associated with one station or one bus. That is, the transportation information displayed in the electronic device may be information that fails to integrate/organize information that a user requires, and may display only one piece of transportation information in a single screen.

SUMMARY

According to an aspect of the present disclosure, a method and apparatus are provided for efficiently displaying transportation information provided from the outside (e.g., a content provider) in a screen of a wearable electronic device.

According to another aspect of the present disclosure, when displaying transportation information, an electronic device provides a method and apparatus for displaying the arrival information of a transportation means as an icon image in a screen of a wearable electronic device so that a user intuitively recognizes the time information.

According to another aspect of the present disclosure, an electronic device is provided that may be a wearable electronic device that displays the time, and the wearable electronic device may provide a method and apparatus for displaying arrival information by displaying transportation means icon images in a location corresponding to an hour hand/minute hand.

According to another aspect of the present disclosure, an electronic device is provided that may be a wearable electronic device that displays the time, and the wearable electronic device may provide a method and apparatus for displaying a corresponding bus icon image in a location of an arrival time in a radius of the minute hand when displaying an arrival time of a bus.

Accordingly an aspect of the present disclosure provides a wearable electronic device which includes a display configured to display a clock screen using an hour hand and a minute hand, and also includes a processor. The processor is configured to execute an application for displaying an icon including time information, and to display the icon in a location of the time information in a minute hand rotation area of the clock screen or an hour hand rotation area of the clock screen when the application is executed.

Another aspect of the present disclosure provides an operation method of a wearable electronic device which includes displaying a clock screen using an hour hand and a minute hand, receiving time information associated with a transportation means, and displaying a transportation means icon in a location of the time information in a minute hand rotation area of the clock screen or an hour hand rotation area of the clock screen.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
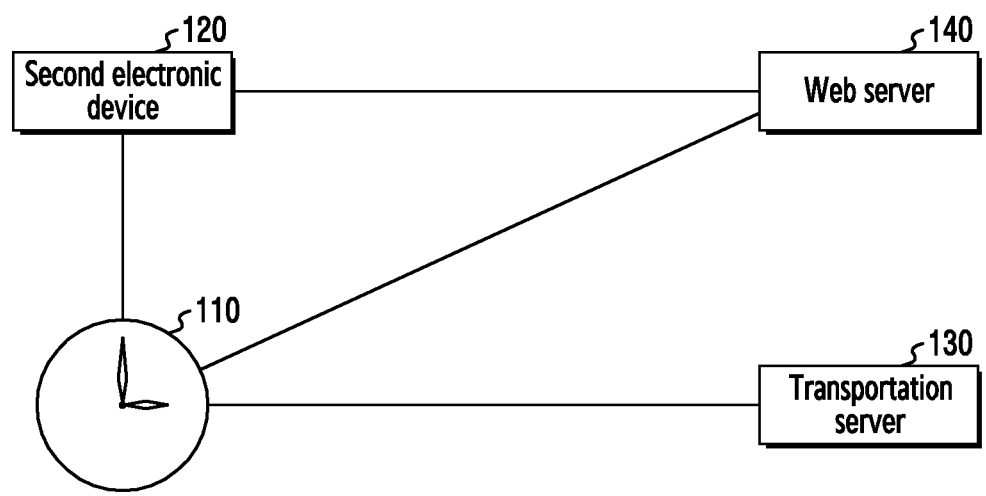
FIG. 1 is a diagram illustrating a system configuration including a wearable electronic device according to an embodiment of the present disclosure.

Hereinafter, an embodiment of the present disclosure will be described with reference to the accompanying drawings. In the following description, specific details such as detailed configuration and components are provided to assist the overall understanding of the embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness.

The present disclosure may describe various embodiments and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" as used in the present disclosure indicate the presence of disclosed corresponding functions, operations, elements, and the like, but do not limit additional one or more functions, operations, elements, and the like. In addition, it should be understood that the terms "include" or "have" as used in the present disclosure are to indicate the presence of features, numbers, steps, operations, elements, parts, or a combination thereof described in the specification, and do not preclude the presence or addition of one or more other features, numbers, steps, operations, elements, parts, or a combination thereof.

The terms "A or B", "at least one of A or/and B" or "one or more of A or/and B" as used in the present disclosure include any and all combinations of words enumerated with it. For example, "A or B", "at least one of A and B" or "at least one of A or B" means (1) including at least one A, (2) including at least one B, or (3) including both at least one A and at least one B.

Although the terms such as "first" and "second" used in an embodiment of the present disclosure may modify various elements, these terms do not limit the corresponding elements. For example, these terms do not limit an order and/or importance of the corresponding elements. These terms may be used for the purpose of distinguishing one element from another element. For example, a first user device and a second user device may all indicate user devices and may indicate different user devices. For example, a first element may be referred to as a second element without departing from the scope of the present disclosure, and similarly, a second element may be referred to as a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" as used in an embodiment of the present disclosure may be used interchangeably with "suitable for", "having the capacity to", "designed to", "adapted to", "made to", or "capable of" according to a situation. The term "configured to (set to)" does not necessarily mean "specifically designed to" in hardware. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a general-purpose processor, e.g., a central processing unit (CPU) or an application processor (AP), capable of performing a corresponding operation by executing one or more software programs stored in a memory device.

The terms as used herein are used to describe certain embodiments and do not limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in an embodiment of the present disclosure.

An electronic device according to an embodiment of the present disclosure may include at least one of a smart phone, a tablet personal computer (PC), a mobile phone; a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device (e.g., a head-mount-device (HMD), an electronic eyeglasses, an electronic clothing, an electronic bracelet, an electronic necklace, an electronic appcessory, an electronic tattoo, a smart mirror, or a smart watch). For example, the wearable device according to an embodiment of the present disclosure may a flexible device. Hereinafter, an electronic device according to an embodiment of the present disclosure will be described with reference to the accompanying drawings. In the present disclosure, the term "user" may indicate a person using an electronic device or a device (e.g., an artificial intelligence electronic device) using an electronic device. An electronic device may be a wearable electronic device that may display the time. The wearable electronic device may include a clock function. A wearable electronic device may provide a method and apparatus for displaying arrival information of a transportation means in a screen that displays an analog clock. Hereinafter, descriptions will be provided by assuming the transportation means to be a bus.

Generally, bus service routes that users use may be predetermined routes, such as a route from home to office, a route from home to school, and the like. Therefore, when a user checks bus arrival information, the user may repeatedly check a limited number of bus stations and routes. For example, a station where a user gets on a bus and a station where the user gets off the bus for commuting may be fixed. Currently, various applications provide bus arrival information. In the case of an electronic device (e.g., a smart phone), a user operates an electronic device to enter a corresponding application, and needs to search for a desired bus service route. The user needs to provide a number of interactions to obtain an optimal bus, and identifies the displayed bus arrival information by reading text information provided in a list. Also, as the electronic device that displays transportation information, a wearable electronic device (e.g., a smart watch such as Gear S2) may be better than a general electronic device in view of accessibility, but the wearable electronic device has a small screen and may have difficulty in displaying various pieces of information at once.

According to an embodiment of the present disclosure, an electronic device may be a wearable electronic device including a clock function (e.g., a function of displaying an analog clock) that may display the time using an hour hand/minute hand. A wearable electronic device may provide a method and apparatus for displaying transportation information integrated/organized based on user settings in a clock screen, using the feature of an analog clock. The wearable electronic device may display, in the clock screen, transportation information (e.g., a bus arrival time, empty seats, and the like) transmitted from a server that provides transportation means information, together with the current time. A wearable electronic device may provide a method and apparatus, which may display a screen to enable a user to intuitively recognize the current time and the arrival time of a transportation means, may define the location of an icon and a layer structure when displaying bus information, may define a method of processing the time information of a transportation means, transferred from an external server, and may clearly distinguish similar numbers when displaying transportation means information (e.g., a bus number).

FIG. 1 is a diagram illustrating a system configuration including a wearable electronic device according to an embodiment of the present disclosure.

Referring to FIG. 1, a wearable electronic device 110 is an electronic device that a user may wear on a wrist, and may display the analog time that indicates the time using an hour hand and a minute hand. A second electronic device 120 may be a smart phone (mobile phone), and may execute short-range communication with the wearable electronic device 110. A transportation server 130 may be an external device (e.g., a content provider) that provides operation time information of a transportation means. A web server 140 may execute a web service with respect to the second electronic device 120.

The wearable electronic device 110 may execute a wireless communication function with the transportation server 130. When a transportation application is executed, the wearable electronic device 110 may transmit information associated with a corresponding transportation means to the transportation server 130, and may download operation time information of the transportation means from the transportation server 130. The wearable electronic device 110 may display, in a clock screen, the current time using an hour hand, a minute hand, and a second hand, and may process and display the operation time information of a transportation means, which is received from the transportation server 130, together in the clock screen. The wearable electronic device 110 may display a transportation means icon image when displaying the operation time information of a transportation means, may display the icon image in the location of an arrival time in the rotation area of the minute hand when the time information is based on a minute unit, and may display the icon image in the location of an arrival time in the rotation area of the hour hand when the time information is based on an hour unit.

The wearable electronic device 110 may require information from a web server 140 for searching for a station (e.g., a bus stop ID, a station ID, an airport ID, and the like) and transportation means information (e.g., a bus number, a train number, a flight number, and the like) for setting an arrival time of a transportation means. The wearable electronic device 110 may directly access the web server 140 to search for desired information, or alternatively, may access the web server 140 via the second electronic device 120 and search for desired information.

Hereinafter, descriptions will be provided by assuming the transportation means to be a bus, however, the present disclosure is not limited to such. The wearable electronic device 110 may execute a bus application, and may display an estimated arrival time of a set bus in the rotation area of the minute hand or the rotation area of the hour hand, in the state in which the clock screen is displayed.

Figure 2:
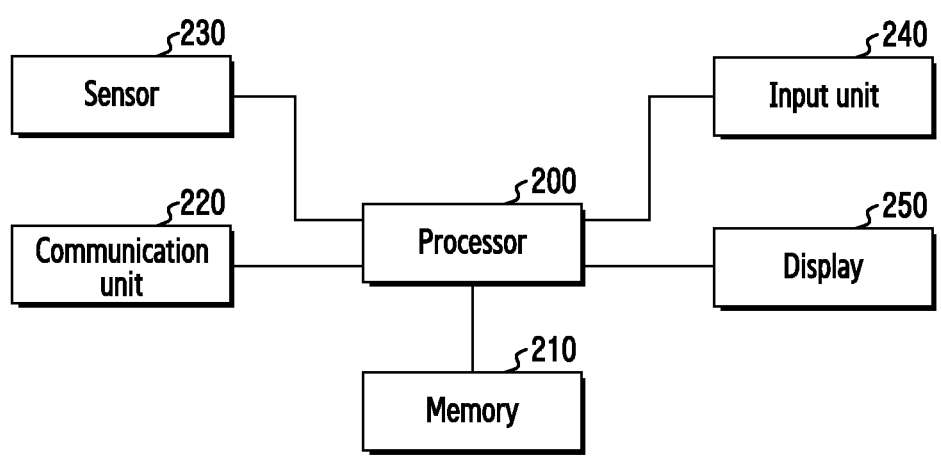
FIG. 2 is a block diagram of an electronic device according to an embodiment of the present disclosure.

FIG. 2 is a block diagram of an electronic device according to an embodiment of the present disclosure. The electronic device of FIG. 2 may be a wearable electronic device.

Referring to FIG. 2, the electronic device includes a processor 200, a memory 210, a communication unit 220, a sensor (or sensor unit) 230, an input unit 240, and a display 250. According to an embodiment of the present disclosure, the electronic device may omit at least one of the above elements or may further include other elements.

The processor 200 may include one or more of a central processing unit (CPU), an application processor (AP), and a communication processor (CP). The processor 200, for example, may carry out calculation or data processing relating to the execution of an application and/or control of at least one other element of the electronic device. The processor 200 may execute a bus application, and may display an estimated bus arrival time as an icon image in the minute hand rotation area and the hour hand rotation area of the clock screen.

The memory 210 may include a volatile memory and/or a non-volatile memory. The memory 210 may store a command or data relevant to at least one other element of the electronic device. The memory 210 may store software and/or program. The program may include, for example, a kernel, middleware, an application programming interface (API), and/or application programs (or "applications"). At least some of the kernel, the middleware, and the API may be referred to as an operating system (OS).

The communication unit 220 may include a wireless communication module and a wired communication module. The wireless communication module may include a cellular communication module and a short-range communication module.

At least one of long term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM) may be used as a cellular communication module. The cellular communication module may provide, for example, a voice call, a video call, a text message service, an Internet service, and the like, through a communication network. According to an embodiment of the present disclosure, the cellular communication module may identify and authenticate an electronic device within a communication network using a subscriber identification module (e.g., a SIM card). The cellular communication module may perform at least some of the functions that the processor 200 may provide. The cellular module may include a communication processor (CP).

The short-range communication module may include at least one of WiFi, Bluetooth, near field communication (NFC), global navigation satellite system (GNSS), and global navigation system (GPS). A magnetic secure transmission (MST) may create a pulse according to transmission data using an electromagnetic signal, and the pulse may generate a magnetic field signal. An electronic device may transmit a magnetic field signal to a point of sales (POS), and the POS may detect a magnetic field signal using an MST reader, and may restore data by converting the detected magnetic field signal into an electric signal. The GNSS may include at least one of, for example, a global positioning system (GPS), a global navigation satellite system (Glonass), a Beidou navigation satellite system (Beidou), and Galileo (European global satellite-based navigation system), according to a region where the system is used, a bandwidth, and the like. Hereinafter, the term "GPS" may be interchangeably used with the term "GNSS".

The wired communication module may include, for example, at least one of a universal serial bus (USB), a high definition multimedia interface (HDMI), recommended standard 232 (RS-232), a plain old telephone service (POTS), and the like.

When a bus application is executed, the communication unit 220 may transmit information associated with a set bus to the transportation server 130, and may receive arrival information of the set bus, which is transmitted from the transportation server 130. Also, the communication unit 220 may access the web server 140 to search for web information. Also, the communication unit 220 may communicate information for web searching to the second electronic device 120.

The sensor 230 measures a physical quantity or senses an operation state of an electronic device, so as to convert the measured or sensed information into an electric signal. The sensor 230 may include at least one of a gesture sensor, a gyro sensor, an atmospheric pressure sensor (barometer), a magnetic sensor, an acceleration sensor, a grip sensor, a proximity sensor, a color sensor (e.g., red, green, and blue (RGB) sensor), a biometric sensor (medical sensor), a temperature-humidity sensor, an illuminance sensor, an ultra violet (UV) sensor, and a flexibility sensor for sensing a transformation (e.g., twisting, curving, bending, and the like) of an electronic device.

The sensor 230 according to an embodiment of the present disclosure may further include a bezel sensor for sensing a rotation of a bezel of an electronic device. When a transportation application is executed, the processor 200 may recognize a rotation of a bezel through the bezel sensor, and may display detailed arrival information of a transportation icon corresponding to the recognized rotation value.

The input unit 240 may include at least one input unit out of a touch panel, a (digital) pen sensor, a key, and an ultrasonic input unit. The touch panel may use at least one of a capacitive type, a resistive type, an infrared type, and an ultrasonic type. Also, the touch panel may further include a control circuit. The touch panel may further include a tactile layer to provide a tactile reaction to a user. The (digital) pen sensor may include a recognition sheet, which is a part of the touch panel or is separated from the touch panel. The key may include a physical button, an optical key, or a keypad. The ultrasonic input unit may detect, through a microphone, ultrasonic waves generated by an input means, and may determine data corresponding to the detected ultrasonic waves. The input unit according to an embodiment of the present disclosure may be a touch panel, and the touch panel may include a pressure sensor function.

The display 250 may include a liquid crystal display (LCD), a light-emitting diode (LED) display, an organic light-emitting diode (OLED) display, a microelectromechanical systems (MEMS) display, or an electronic paper display. The display 250 may display various screens (e.g., text, images, videos, icons, or symbols) to a user.

The input unit 240 and the display 250 may be embodied as an integrated touch screen. The touch screen may display a screen under the control of the processor 200, and may detect a touch, gesture, proximity, or hovering input using an electronic pen or a user's body part.

The wearable electronic device may be included in the scope of the above described electronic device, and operations that are operated together between electronic devices may be also operated between the wearable electronic device and various electronic devices. For example, the wearable electronic device may include all devices using one or more of various processors (e.g., the processors 200), such as an application processor (AP), a communication processor (CP), a graphic processing unit (GPU), and a central processing unit (CPU), including all information and communication devices, multimedia devices, wearable devices, and application devices thereof that support functions according to an embodiment of the present disclosure.

Alternatively, in the state in which the wearable electronic device is connected with another electronic device, the wearable electronic device may perform an operation to enable the electronic device and the wearable device to interoperate to perform a function corresponding to the wearable device, according to a connection or disconnection of the wearable electronic device to the electronic device.

The processor 200 may control the execution of an application using the memory 210. The applications (e.g., the application programs) may include, for example, one or more applications that may perform functions, for example, home, dialer, short messaging service/multimedia messaging service (SMS/MMS), instant message (IM), browser, camera, alarm, contacts, voice dial, email, calendar, media player, album, clock, health care (e.g., measure exercise quantity or blood sugar level), or environment information (e.g., providing atmospheric pressure, humidity, or temperature information).

According to an embodiment of the present disclosure, the applications may include an information exchange application for supporting the exchanging of information between an electronic device and an external electronic device (another electronic device). The information exchange application may include, for example, a notification relay application for transferring specific information to an external electronic device or a device management application for managing an external electronic device.

For example, the notification relay application may have a function of transferring notification information generated by other applications of the electronic device (e.g., the SMS/MMS application, the e-mail application, the health care application, or the environmental information application) to an external electronic device. Furthermore, the notification relay application may, for example, receive notification information from the external electronic device, and may provide the received notification information to a user.

The device management application, for example, may manage (e.g., install, delete, or update) at least one function of an external electronic device communicating with the electronic device (e.g., a function of turning on/off the external electronic device itself (or some components thereof) or a function of controlling the luminance (or a resolution) of the display), applications operating in the external electronic device, or services provided by the external electronic device (e.g., a telephone call service and a message service).

According to an embodiment of the present disclosure, the applications may include an application (e.g., a health care application of a mobile medical appliance, and the like) that is designated according to the attributes of an external electronic device. The applications may include an application received from an external electronic device. The applications may include a preloaded application or a third-party application that may be downloaded from a server.

According to an embodiment of the present disclosure, a transportation application may visualize transportation information using a clock screen of an electronic device, and may provide the same to enable a user to intuitively recognize the same. The transportation application may display a transportation icon image on an analog clock screen, and may display the transportation icon image in a location determined based on a difference with the current time obtained by combining the distance (the length of an hour hand/minute hand) from the center point of the clock and an angle with an hour hand/minute hand indicating the current time.

According to an embodiment of the present disclosure, an electronic device may display the arrival time of a transportation means using a transportation application and a transportation mini application. An application means effectively using a resource by directly interoperating with an operating system through an installation process. A mini application indicates interoperating with an operating system or an application in a manner of being a mini application engine, or being embedded therein, as opposed to directly interoperating with the operating system or the application. The mini application may be a widget. The widget may be a mini application, which is one of the graphic user interfaces (GUIs) that support smooth interaction between a user, an application, and an operating system. A transportation widget may display information associated with a set transportation means in a screen of an electronic device, and may display some information of a transportation application.

Hereinafter, in an embodiment of the present disclosure, descriptions will be provided in view of hardware. However, an embodiment of the present disclosure includes a technology that uses both hardware and software, and thus, an embodiment of the present disclosure does not exclude a method that includes software.

Figure 3A:
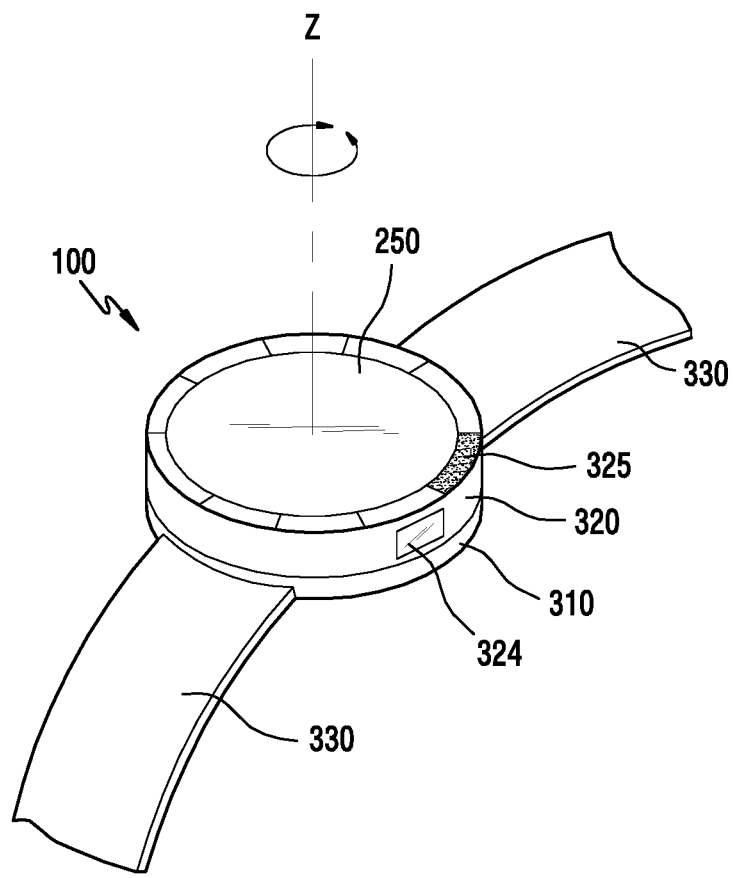
FIGS. 3A to 3C are diagrams illustrating a configuration of an electronic device according to an embodiment of the present disclosure.
Figure 3B:
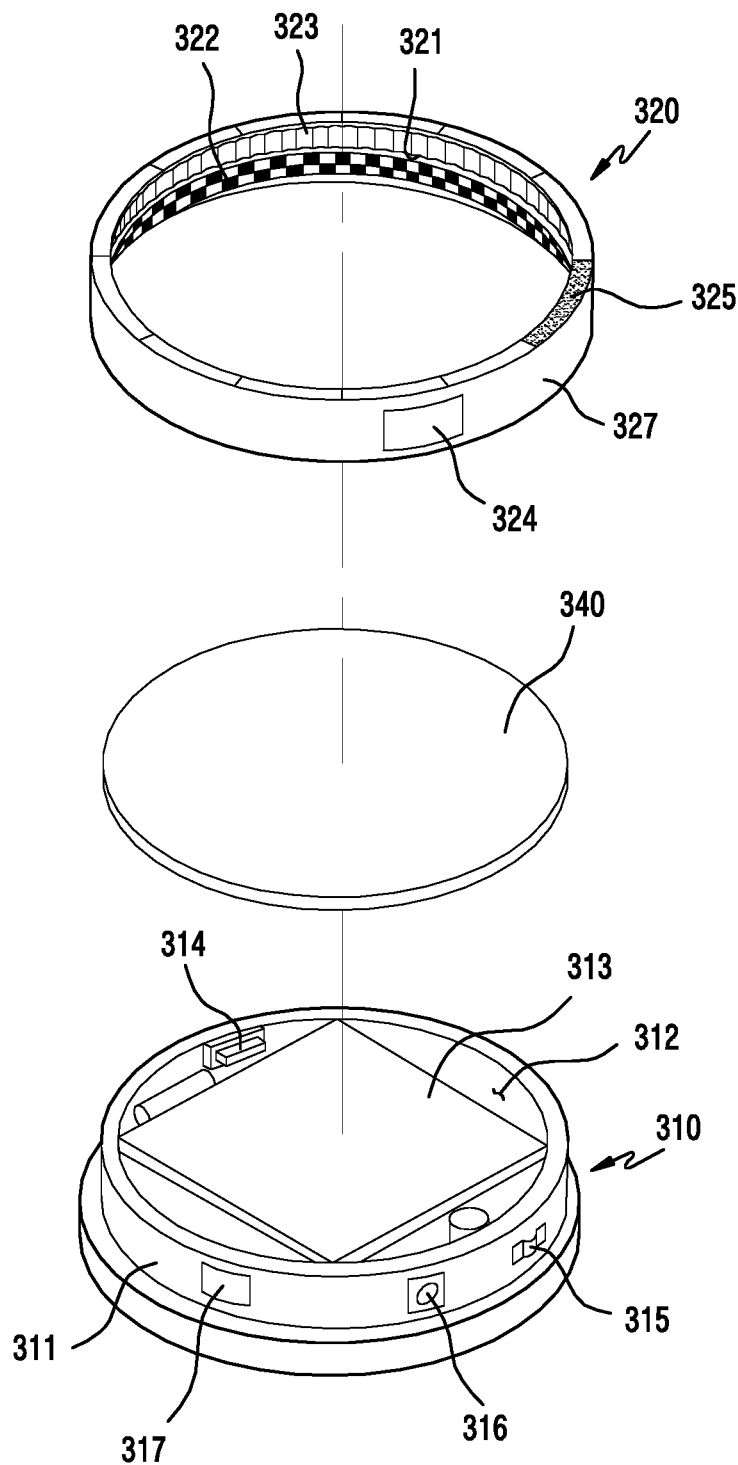
Figure 3C:
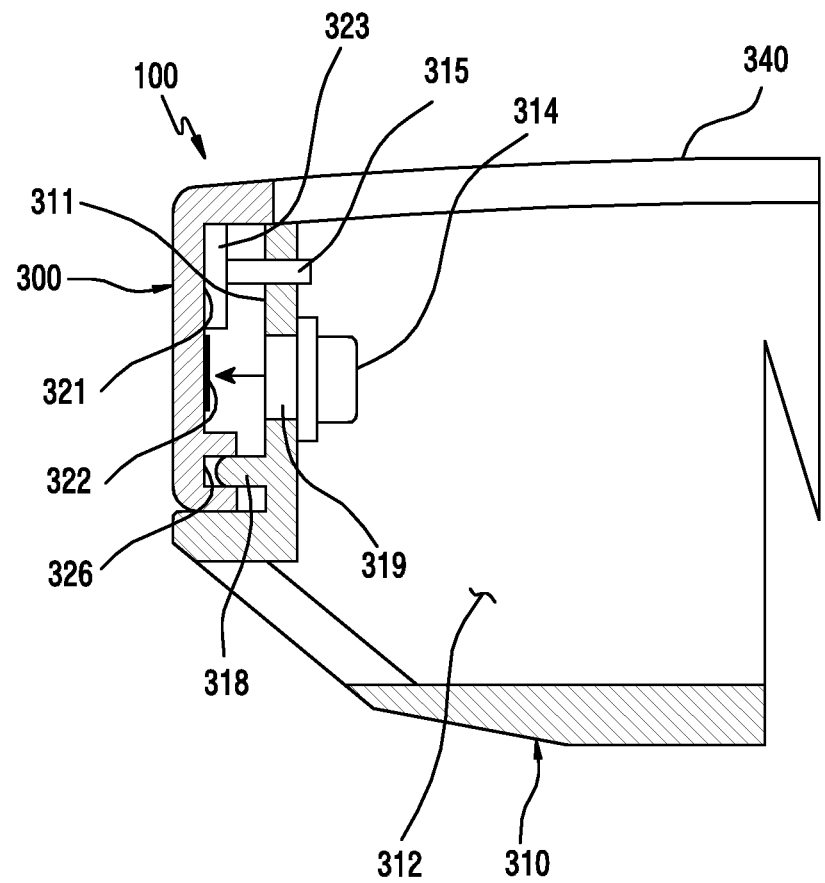

FIGS. 3A to 3C are diagrams illustrating a configuration of an electronic device according to an embodiment of the present disclosure. FIG. 3A is a perspective view of an electronic device according to an embodiment of the present disclosure.

Referring to FIG. 3A, an electronic device 100 may be a wearable electronic device that may be worn on a wrist of a user. The electronic device 100 may include a main body 310 and a connection part 330 (e.g., strap) on which the main body 310 is mounted. According to an embodiment of the present disclosure, the electronic device 100 may be worn by wrapping the connection part 330 around the user's wrist while the main body 310 is placed on the wrist, and the connection part 330 may include a plurality of openings formed at predetermined intervals such that the wearing position of the electronic device may be adjusted to be suitable for the user's wrist. The connection part 330 may be formed of at least one of metal, leather, rubber, silicon, and urethane.

According to an embodiment of the present disclosure, the main body 310 may include the display 250. The display 250 may be a touch screen. At least one key button may be disposed in a proper position of the main body 310. The electronic device 100 may have a battery (e.g., a rechargeable battery, etc.) contained therein as a power supply means, and may be selectively mounted on a portable charging cradle in order to charge the battery.

According to an embodiment of the present disclosure, the electronic device 100 may include a rotating body 320 that is installed to be rotatable in the main body 310. The rotating body 320 may be installed in a manner of enclosing the whole display 250 disposed in the main body 310. When the electronic device 100 is a wrist wearable electronic device, the rotating body 320 may be disposed in the form of a rotatable bezel. The rotating body 320 may rotate about the Z-axis clockwise or counterclockwise, and may be configured to rotate up to 360 degrees or to rotate freely without any limitation. The rotating body 320 may include an indicator 325 on the top side along a frame. The indicator 325 may be formed in a manner of covering the rotating body 320 with paint, in an imprinting manner, or in the type of including a display. The indicator 325 may be disposed in a location that a user may readily check so that the user may easily recognize a rotation direction or an amount of rotation of the rotating body 320.

According to an embodiment of the present disclosure, the rotating body 320 may include at least one function window 324 disposed on an outer circumference side. The sensor 230 including various sensors may be disposed in the main body 310. The function window 324 may be disposed in a location corresponding to at least one of sensor devices, according to a rotation of the rotating body 320. The processor 200 may sense a rotated location of the rotating body 320, using a bezel sensor, and may automatically perform a function of a corresponding sensor or may execute displaying in the display 250, according to a location of the function window 324 based on the rotation of the rotating body 320. The electronic device 100 may perform various functions according to a rotation parameter of the rotating body 320, irrespective of the function window 324. The rotation parameter may include at least one of a rotation direction of a rotating body, a rotation speed, an amount of rotation, and a rotated location.

FIG. 3B is an exploded perspective view of an electronic device according to an embodiment of the present disclosure.

Referring to FIG. 3B, the electronic device 100 may include the main body 310, and the rotating body 320 that is installed to be rotatable in the main body 310. The main body 310 may include various electronic components disposed in an internal space. The electronic components may include a display module 313. The display module 313 may include a touch-based input detection sensor. The display module 313 may include an input detection sensor (e.g., a digitizer) for recognizing a hovering-based indirect touch input provided by an electronic pen.

According to an embodiment of the present disclosure, the electronic components include a rotation detection member 314 that may detect a rotation of the rotating body 320. The rotation detection member 314 may be a bezel sensor that senses a rotation of a bezel. The rotation detection member 314 may be an encoder sensor for detecting a plurality of openings formed at regular intervals in the rotating body 320. The rotation detection member 314 may be an image sensor for detecting a predetermined pattern formed in the rotating body 320. The rotation detection member 314 may be an infrared light sensor. The rotation detection member 314 may be a photo-coupler.

According to an embodiment of the present disclosure, the electronic components may include various sensor devices disposed in the main body 310. A sensor device may include various sensors, such as a camera sensor, a fingerprint sensor, an infrared sensor, a heart rate monitor (HRM) sensor, a photo sensor, a proximity sensor, an illuminance sensor, a temperature sensor, and the like. When a function is executed through the function window 324 included in the rotating body 320, corresponding sensors may be exposed in a corresponding outer circumference side where the rotating body 320 of the electronic device 100 is installed.

According to an embodiment of the present disclosure, at least one engaging member 315 (e.g., detent, ratch, and the like) may be disposed in an outer circumference side 311 where the rotating body 320 of the main body 310 is installed to be rotatable. The engaging member 315 is installed to be in contact with the rotating body 320 in the main body 310, and is capable of maintaining a rotated location of rotating body 320. The engaging member 315 may provide a user with a sense of rotation (e.g., sense of clicking) when the user rotates the rotating body 320.

According to an embodiment of the present disclosure, the rotating body 320 is formed in a hollow type, and may be installed in a manner in which an inner circumference side 321 encloses the outer circumference side 311 of the main body 310. The rotating body 320 may include a pattern 322 that is detected by the rotation detection member 314, and is disposed along the inner circumference side 321. When the rotation detecting member 314 is an image sensor, the pattern 322 may be formed by alternating black and white. When the rotation detection member 314 is an image sensor, the pattern 322 may be a textured pattern. In this instance, the image sensor may determine the predetermined textured pattern, detect a rotated location of the rotating body, and provide the same to a processor of the electronic device.

According to an embodiment of the present disclosure, the rotating body 320 may include an engaging groove 323 formed along the inner circumference side 321. The engaging groove 323 may be formed successively along the inner circumference side 321 of the rotating body 320. When the rotating body 320 is installed to be rotatable in the main body 310, and rotates in a predetermined direction, the engaging member 315 operates in a manner of running over an adjacent engaging groove from one engaging groove so that a user may be provided with a touch feeling of engagement (e.g., a sense of clicking) for each predetermined rotation angle according to a rotation of the rotating body 320.

According to an embodiment of the present disclosure, the rotating body 320 may include the indicator 325 on the top side. The indicator 325 may be formed in an imprinting or printing manner. The indicator 325 may provide a user with rotation related information that enables the user to recognize a rotation direction and an amount of rotation of the rotating body 320.

According to an embodiment of the present disclosure, the function window 324 may be disposed in the outer circumference side 327 of the rotating body 320. The function window 324 may be formed of a transparent material or a semitransparent material. The function window 324 may be formed of a glass material or a synthetic resin material. When the rotating body 320 is connected to be rotatable with the main body 310, the function window 324 may be disposed in a manner of enabling the functions of sensors 316 and 317, which are exposed in the outer circumference side 311 of the main body 310, to be performed through the function window 324.

According to an embodiment of the present disclosure, the main body 310 may include a main body window 340, which protects the display module 313 and forms the exterior of the electronic device 100. The rotating body 320 may be connected to be rotatable with the main body 310 in the state in which the main body window 340 is installed in the main body 310. The rotating body 320 may be formed of a synthetic resin material or a metal material.

FIG. 3C is a partial sectional view of the electronic device 100 in an engaged state according to an embodiment of the present disclosure.

Referring to FIG. 3C, the electronic device 100 may include the main body 310 including the main body window 340, and the rotating body 320 that is installed to be rotatable in the main body 310. According to an embodiment of the present disclosure, a guide rib 318 may protrude from the outer circumference side 311 of the main body 310. A guide groove 326 may be formed in a corresponding location of the rotating body 320. Accordingly, when the rotating body 320 is installed in the main body 310, the guide rib 318 of the main body 310 is inserted into the guide groove 326 of the rotating body 320 and provides guidance, so that the rotating body 320 may not be separated from the main body 310, and may be rotated by being guided. The guide rib 318 may be installed in the rotating body 320, and the guide groove 326 may be formed in a corresponding location of the main body 310.

According to an embodiment of the present disclosure, the rotation detection member 314 may be installed in an inner space 312 of the main body 310, so as to detect a pattern, which is disposed in an inner circumference side of the rotating body that rotates, through an opening 319. The rotation detection member 314 may be at least one of an encoder sensor, an optical sensor, and an image sensor. Although the rotation detection member 314 may be disposed in an inner space 312 of the main body 310, the present disclosure is not0 limited thereto. For example, when a space is allowed, the rotation detection member 314 may be installed in the outer circumference side 311 of the main body 310 in a space between the main body 310 and the rotating body 320.

According to an embodiment of the present disclosure, the engaging member 315 may be installed to protrude from the outer circumference side 311 through the inner space 312 of the main body 310, and may be disposed to engage with the engaging groove 323 formed in the inner circumference side 321 of the rotating body 320. The engaging member 315 may be disposed in a manner of being attached to the outer circumference side 311 of the main body 310. The engaging member 315 may be a detent or a ratch using a spring.

According to an embodiment of the present disclosure, when the rotating body 320 (e.g., a bezel) rotates, the processor 200 may recognize rotation information of a bezel (e.g., a rotation angle or an amount of rotation) by a bezel sensor, which is the rotation detection member 314. For example, an electronic device may display detailed arrival information of a transportation means that is displayed in a location associated with the amount of rotation of a bezel when the electronic device recognizes a rotation of the bezel in the state of executing a transportation application.

Figure 4A:
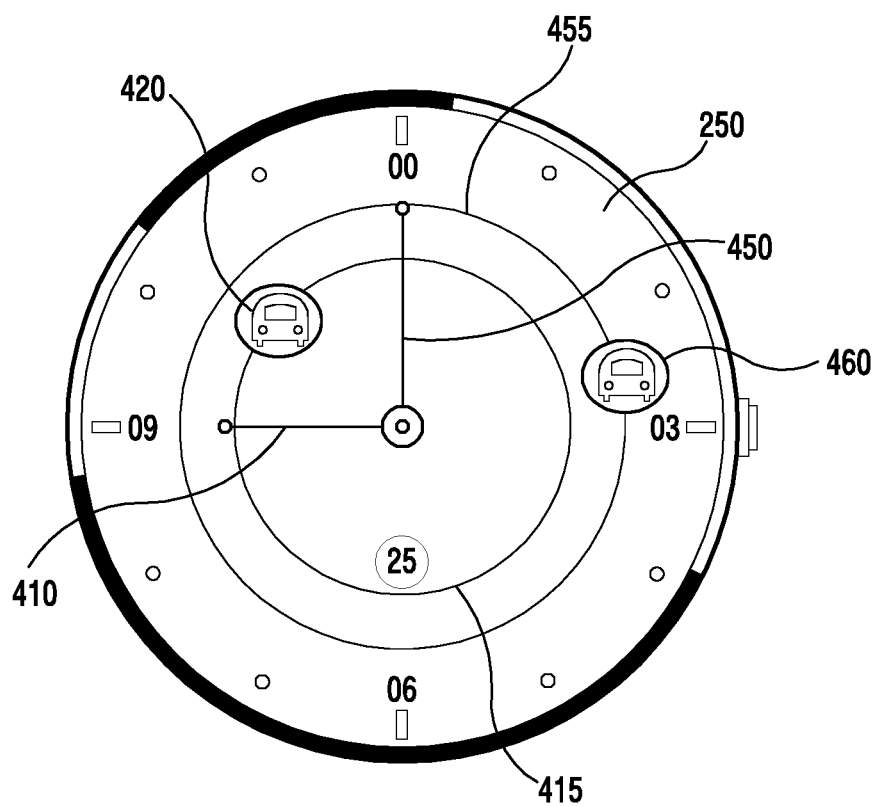
FIGS. 4A to 4C are diagrams illustrating displaying an arrival time of a transportation means in an electronic device according to an embodiment of the present disclosure.
Figure 4B:
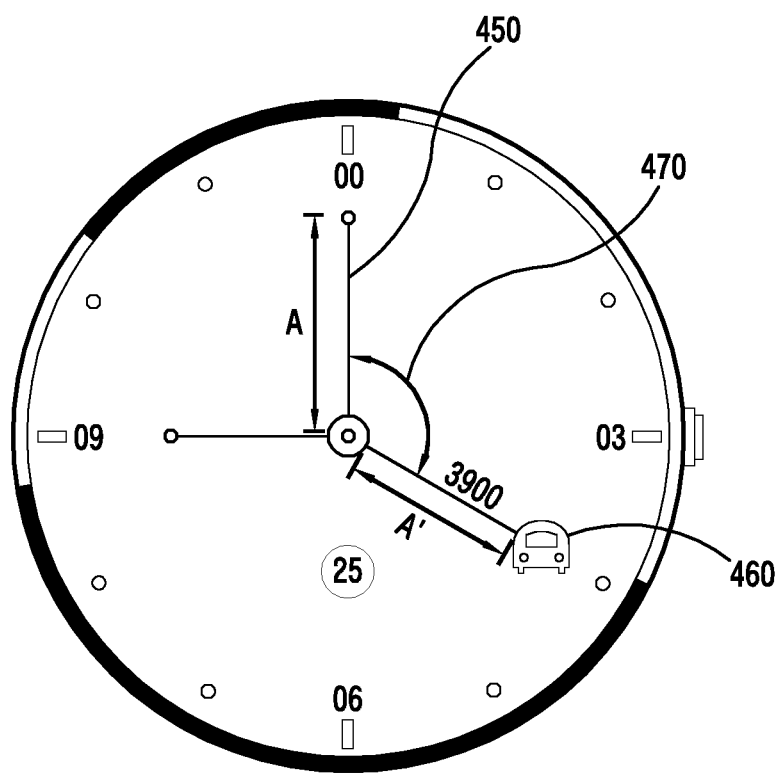
Figure 4C:
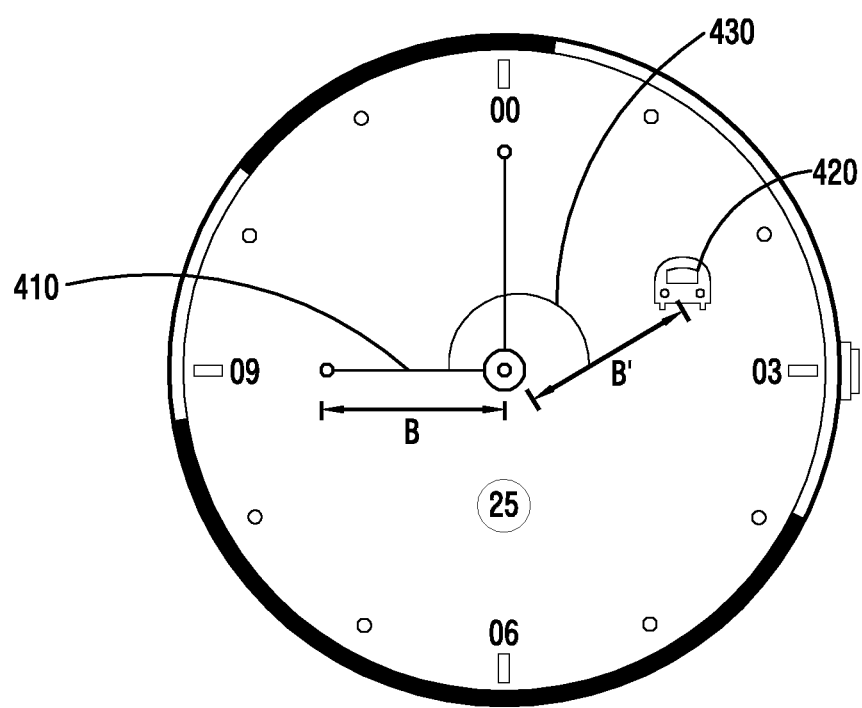

FIGS. 4A to 4C are diagrams illustrating examples of displaying the arrival time of a transportation means in an electronic device according to an embodiment of the present disclosure.

Referring to FIG. 4A, a clock screen displayed in the display 250 may be an analog clock screen that displays the time using an hour hand 410 and a minute hand 450. In the clock screen of FIG. 4A, one rotation of the hour hand 410 may be 12 hours, and one rotation of the minute hand 450 may be 60 minutes. An electronic device may display arrival information of a bus using the distance and the angle of the hour hand 410 and the minute hand 450 at the present, through characteristics of the analog clock (round clock). In FIG. 4A, a bus icon 420 located in a rotation area 415 of the hour hand 410 (a bus icon having the same diameter as the length of the hour hand) indicates hour information of the arrival time of a corresponding bus. A bus icon 460 located in a rotation area 455 of the minute hand 450 (a bus icon having the same diameter as the length of the minute hand) indicates minute information of the arrival time of a corresponding bus. The angles between the hour hand 410 and the minute hand 450 and the bus icons 420 and 460 may indicate the amount of time.

Referring to FIG. 4B, when the length of the minute hand 450 is A, the bus 460 including minute based arrival time information may be disposed in the location of the arrival time in the rotation area of the minute hand 450. The bus 460 including minute based arrival time may be disposed in the location a distance of A' away from the center point, and A=A'. In this instance, the angle between the minute hand 450 and the bus 460 may be the difference in minutes (e.g., the difference between the current time and the bus arrival time). In this instance, 5 minutes may be 30 degrees. Referring to FIG. 4B, the angle between the minute hand 450 and the bus 460 may be 120 degrees, and the difference between the current time and the bus arrival time may be 20 minutes.

Referring to FIG. 4C, when the length of the hour hand 410 is B, the bus 420 including hour unit-based arrival time information may be disposed in the location of the arrival time in the rotation area of the hour hand 410. According to an embodiment of the present disclosure, the bus 420 including hour unit-based arrival time may be disposed in the location a distance of B' away from the center point, and B=B'. In this instance, the angle between the hour hand 410 and the bus 420 may be the difference in hours (e.g., the difference between the current time and the bus arrival time). In this instance, 1 hour may be 30 degrees. Referring to FIG. 4C, the angle between the hour hand 410 and the bus 420 may be 150 degrees, and the difference between the current time and the bus arrival time may be 5 hours.

When a bus application is executed, the electronic device 110 may transmit, to the server 130, information including a set bus station ID, a set bus number, and the like. The server 130 may transmit bus arrival information, which is updated at set time intervals, in the form of text to the electronic device 110. In this instance, the bus arrival information may be in the form of Table 1 provided below.

TABLE 1

```
<delayYn1>N</delayYn1>
<delayYn2>N</delayYn2>
<flag>PASS</flag>
<locationNo1>2</locationNo1>
<locationNo2>10</locationNo2>
<lowplate1>0</lowplate1>
<lowplate2>0</lowplate2>
<plateNo1>Gyeonggi 77BA2403</plateNo1>
<plateNo1>Gyeonggi 77BA3604</plateNo2>
<predictTime1>5</predictTime1>
<predictTime2>23</predictTime2>
<remainSeatCnt1>26</remainSeatCnt1>
<remainSeatCnt2>30</remainSeatCnt2>
<routeID>234001285</routeID>
<stationID>121000921</stationID>
```

The arrival information of Table 1 above includes arrival information of buses as follows: according to the example, a set station ID (route ID) is 234001285, and two buses are expected to arrive at the set station. According to Table 1, a time (predict time) when Gyeonggi 77 BA 2403 bus is to arrive is 5 minutes later, and the number of empty seats is 26. According to Table 1, a time (predict time) when Gyeonggi 77 BA 3604 bus is to arrive is 23 minutes later, and the number of empty seats is 30.

As described in Table 1, the server 130 may transmit arrival information of buses that stop at a set bus station to the electronic device 110 in the form of text. In this instance, an estimated arrival time of the bus arrival information may be transferred in the form of "several minutes left" or "several seconds left". The electronic device may display the estimated arrival time in the clock screen of the display 250, based on the current time, as shown in FIG. 4A. Therefore, a user of the electronic device 110 may identify, from the clock screen, the arrival times of set buses of a bus station set by the user.

Figure 5A:
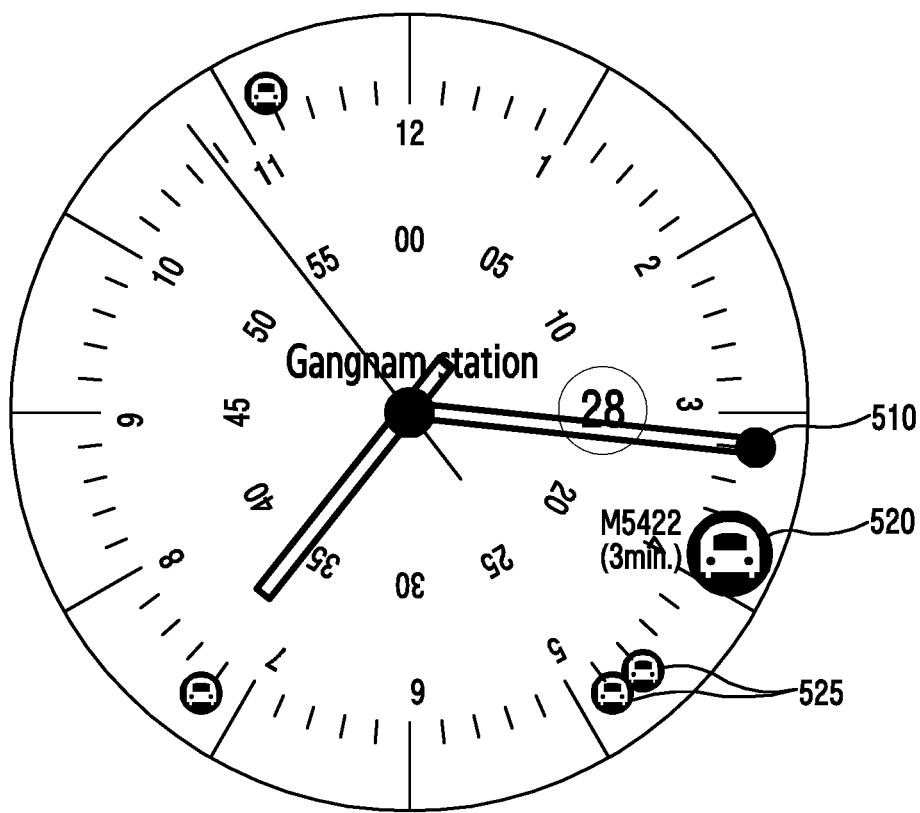
FIGS. 5A to 5C are diagrams illustrating a transportation means displaying method of an electronic device according to an embodiment of the present disclosure.
Figure 5B:
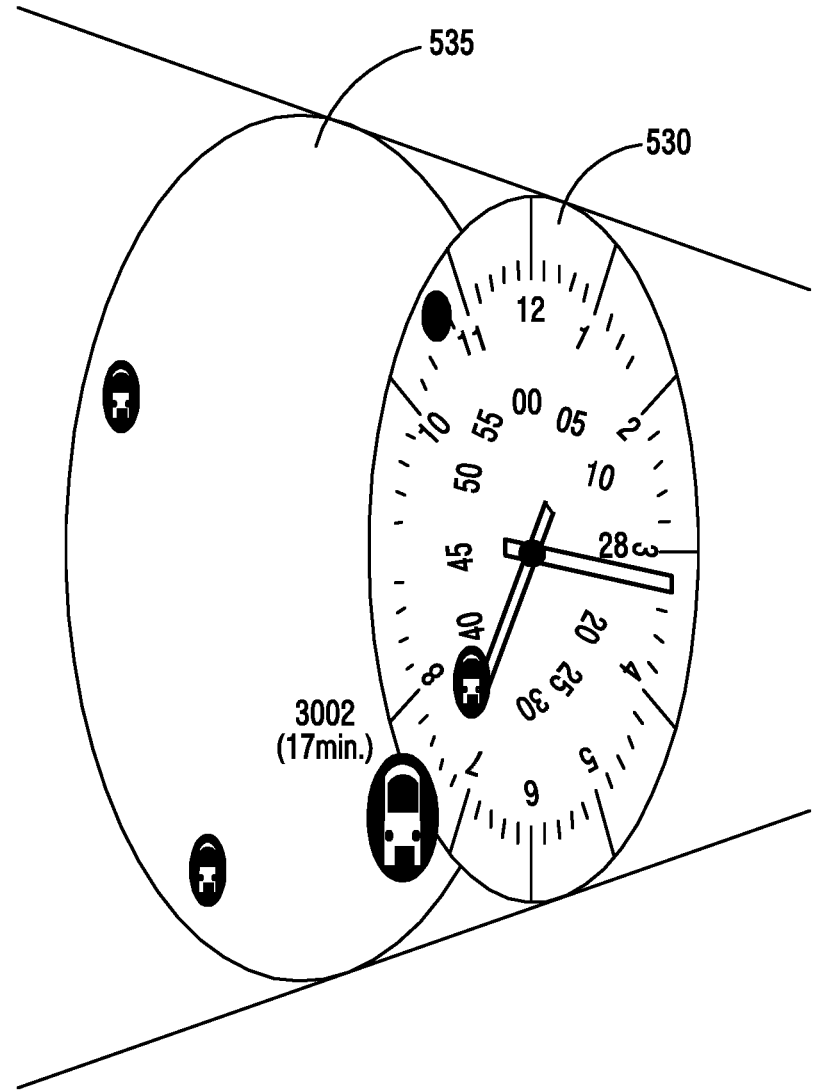
Figure 5C:
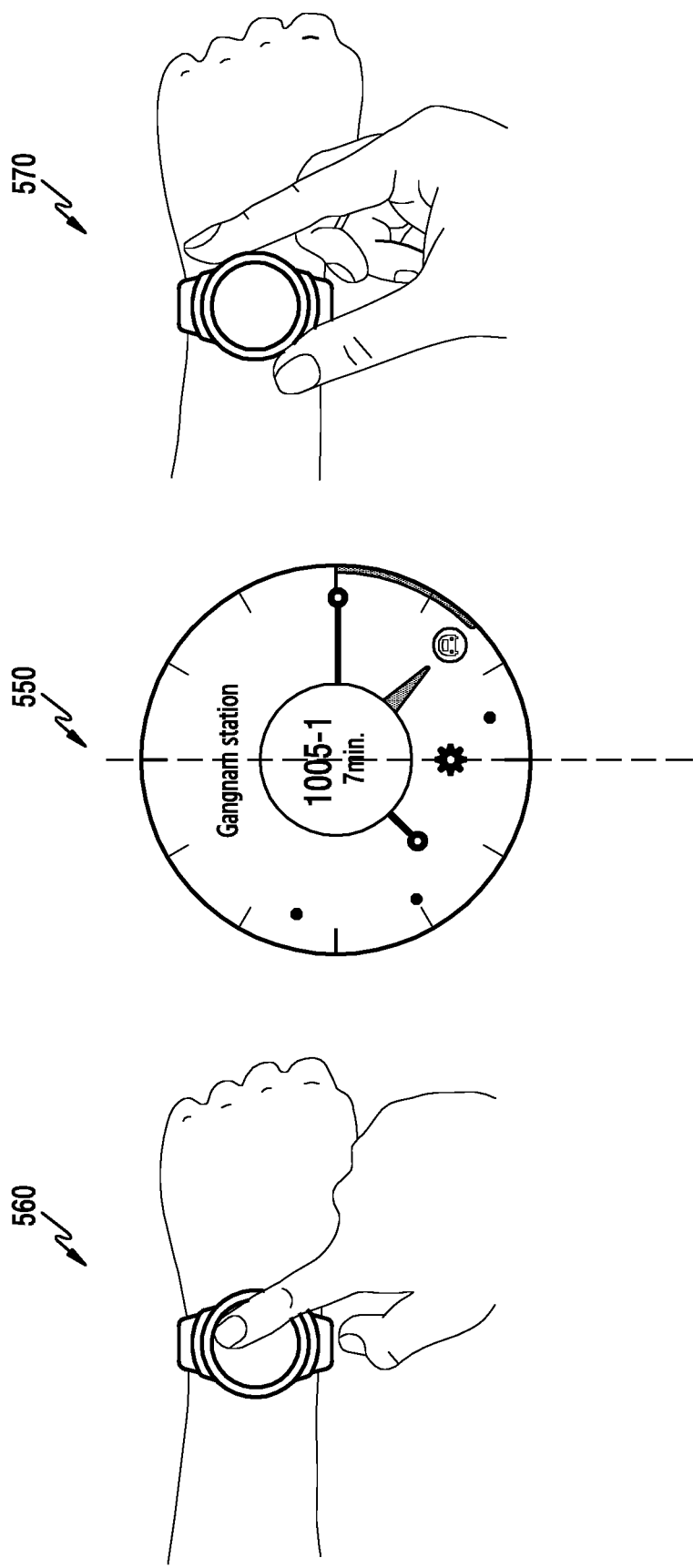

FIGS. 5A to 5C are diagrams illustrating a transportation means displaying method of an electronic device according to an embodiment of the present disclosure.

Referring to FIG. 5A, the electronic device 110 may be a wearable electronic device of a wrist watch type. An analog clock screen that displays the time using an hour hand and a minute hand may be displayed in the display 250 of the electronic device 110, as shown in FIG. 5A. When the bus arrival information, such as shown in Table 1, is received, the electronic device 110 may identify an estimated bus arrival time, and may arrange bus icons sequentially according to a difference between the current time and the estimated arrival time. When the difference in time is based on a minute unit, the bus icons may be disposed in the rotation area of a minute hand as shown in FIG. 4B. When the difference in time is based on an hour unit, the bus icons may be disposed in the rotation area of an hour hand as shown in FIG. 4C.

Referring to FIG. 5B, the electronic device may display a clock screen and a screen displaying bus arrival information in different layers. For example, when bus arrival information is displayed on a higher layer on the clock screen, a user may recognize bus time information, viewing the clock screen together. As illustrated in FIG. 5B, sections for indicating the time are already provided in an analog watch face 530, and thus, the electronic device according to an embodiment of the present disclosure may utilize the same, and may display information simply using the location of an icon. For example, the electronic device may display bus arrival information 535 on various watch faces 530 using layers. Also, unlike a watch face in the form of a round clock, when the current minutes are indicated by displaying a "white point" in the minute hand as shown in the diagram 510 of FIG. 5A, a user may recognize a bus arrival time based on the white point 510.

Referring to FIG. 5C, the electronic device may select a bus icon of which detailed arrival information is desired, by touching the bus icon as shown in the diagram 560, in the state in which a clock screen and bus arrival information are displayed as shown in the diagram 550. The electronic device may include a bezel having a structure as shown in FIGS. 3A to 3D. A user may select a bus icon for identifying detailed arrival information by rotating a bezel, as shown in the diagram 570. The electronic device may display detailed arrival information of the selected bus, as shown in the diagram 550.

Figure 6A:
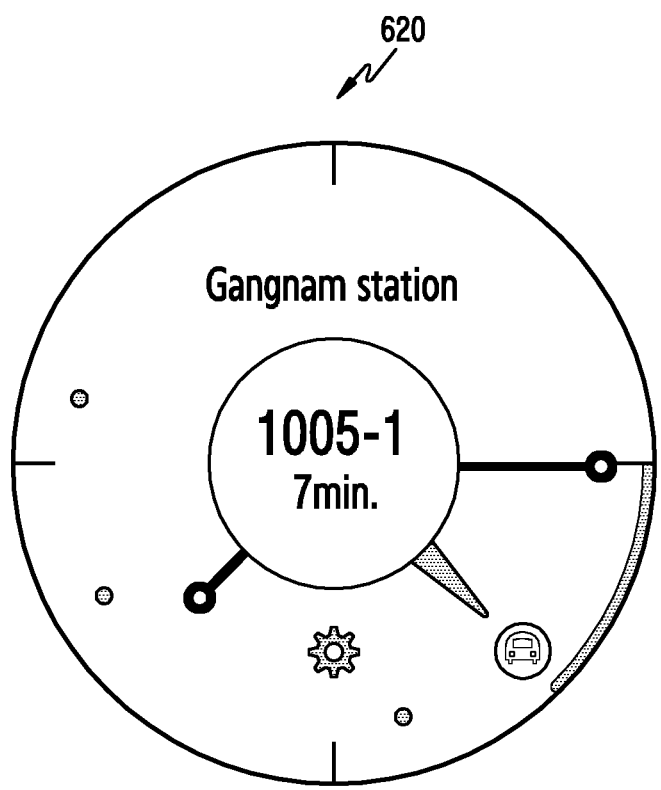
FIGS. 6A to 6C are diagrams illustrating a method in which an electronic device displays a transportation means arrival information according to an embodiment of the present disclosure.
Figure 6B:
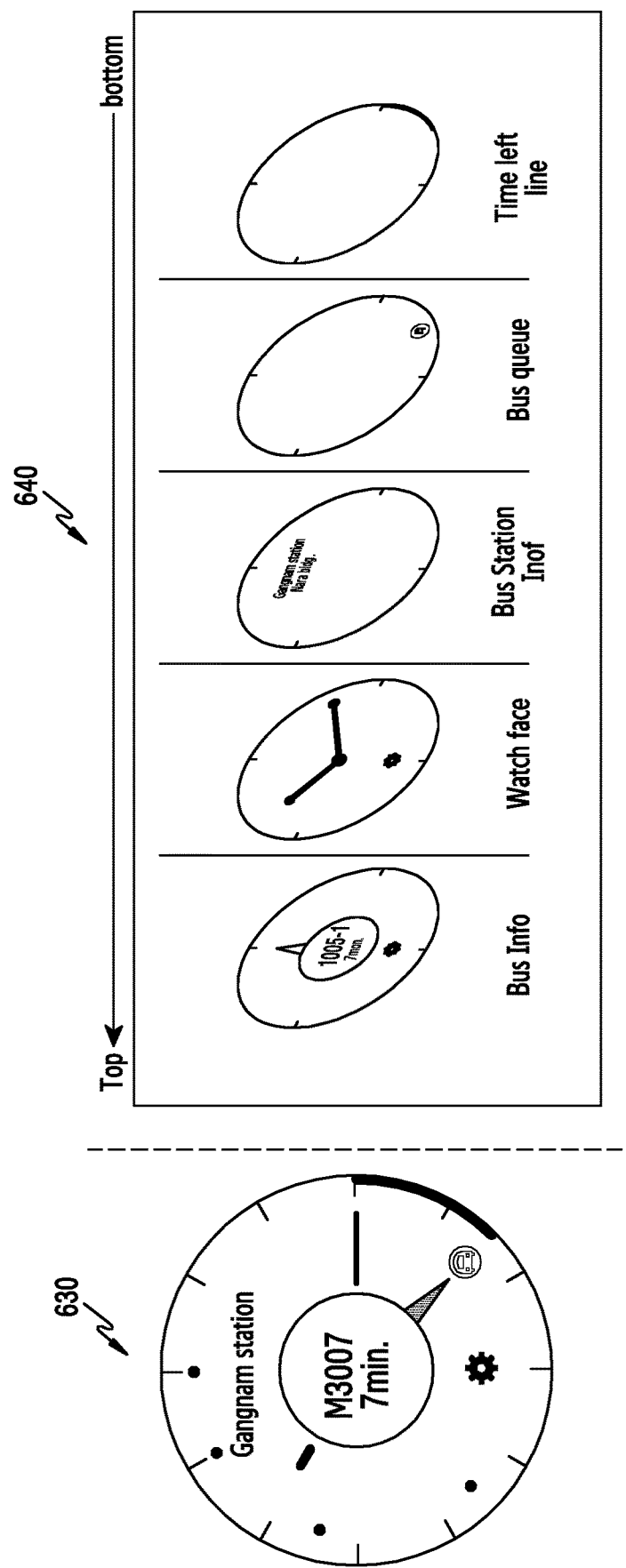
Figure 6C:
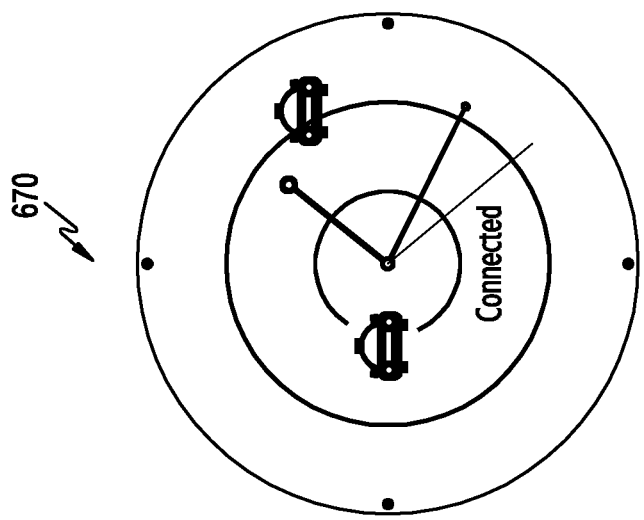
Figure 6C:
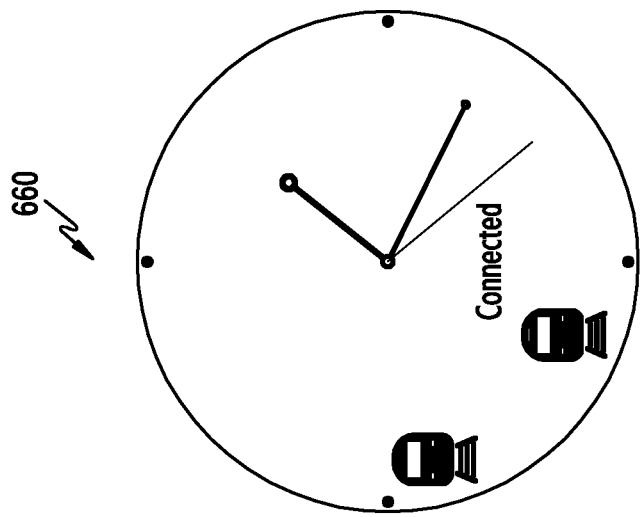

FIGS. 6A to 6C are diagrams illustrating a method in which an electronic device displays transportation means arrival information according to an embodiment of the present disclosure.

Referring to FIG. 6A, the electronic device may display an estimated bus arrival time through various types of applications. In FIG. 6A, the diagram 610 shows a bus widget screen (e.g., a bus application screen). The bus widget screen may display bus information associated with a bus that arrives first at a set bus station. The bus application screen may display estimated arrival times of buses that stop at the set bus station as bus icon images. The bus application screen 620 may display estimated arrival times of all of the buses set for the bus station.

Referring to FIG. 6B, when a bus application displays a clock and bus arrival time information, the electronic device displays each piece of information in different layers. FIG. 6B illustrates a layered structure that displays clock information and bus information based on importance. For example, the electronic device may display a bus number and an estimated arrival time at the highest layer, since they are the most important information. A user needs to recognize the current time to recognize bus information, and thus, an hour hand and a minute hand may be displayed in a subsequent layer. FIG. 6B illustrates displaying bus information (bus info) at the highest layer (top layer), and setting and displaying layers in order of clock information (watch face), bus station information (bus station info), a bus queue, and an estimated arrival time (time left line) as shown in the diagram 640 when clock and bus arrival information are displayed in the display 250 as shown in the diagram 630.

Referring to FIG. 6C, the electronic device may display one or more transportation means in a single clock screen. The electronic device may display, in the clock screen, arrival information of other transportation means in association with the time, in addition to bus arrival information. For example, by changing information of a higher layer, the electronic device may display transportation information, such as a bus, a subway, a taxi, and the like, as shown in the diagram 660 or 670. A user may recognize how many minutes are left until a subway arrives by displaying a subway icon in the same track as the minute hand. A user may recognize how far a taxi exists using the center point of the clock as an origin point.

Generally, bus service routes that users use may be predetermined routes, such as a route from home to office, a route from home to school, and the like. Therefore, when a user checks bus arrival information, the user may repeatedly check a limited number of bus stations and routes. A portable terminal device may provide bus arrival information through various applications. However, to check bus arrival information, a user needs to bring a portable terminal device up, enter a corresponding application, and search for a desired bus route, in order to check an estimated bus arrival time. Therefore, to check the bus arrival information, the user needs to provide a large number of interactions to find out an optimal bus, and to read text information provided in a list. A wearable electronic device (e.g., a smart watch such as Gear S2), which is always worn, may be better than the portable terminal device from the perspective of accessibility. However, the wearable electronic device has a limited size display, and thus, may have difficulty in displaying various pieces of information at once. According to an embodiment of the present disclosure, an electronic device may be a wearable electronic device, and may display transportation information integrated/organized based on user settings by using the features of a clock screen (analog clock). A wearable electronic device may display bus arrival information of a set bus station together with a clock screen, and thus, a user's interaction is reduced and a user may intuitively recognize time information and the bus arrival time information.

According to an embodiment of the present disclosure, the electronic device may effectively display transportation information (a bus arrival time and the like), which is provided by a server (a content provider), by executing a bus application in the state of displaying a clock screen. A wearable electronic device may provide a method and apparatus for displaying bus arrival time information on a clock screen, defining a layer structure and the location of an icon when displaying the bus arrival information, processing time information transferred from a server to enable a user to intuitively recognize the time information, and clearly distinguishing a bus number among similar numbers when displaying a bus number.

According to an embodiment of the present disclosure, a wearable electronic device may include a display configured to display a clock screen using an hour hand and a minute hand and a processor, wherein the processor is configured to execute an application that displays an icon including time information, and display the icon in a location of the time information in a minute hand and/or hour hand rotation area of the clock screen when the application is executed.

The application of the electronic device is a transportation application that displays arrival/departure time information of a transportation means, which is transmitted from an external device, and the icon is a transportation means icon. The electronic device may display detailed arrival/departure time information of a selected transportation means when the transportation means icon is selected. The electronic device may further include a rotatable bezel, may display an indicator indicating the rotation of the bezel, and may select a transportation means icon corresponding to a location of the indicator. The electronic device may display the clock screen, the transportation means icon, and the indicator in different layers. When the transportation means is a bus, the electronic device may display detailed arrival information of a selected bus, such as a number, an arrival time, and/or empty seats associated with the selected bus when a bus icon is selected. The electronic device may display a setting icon in the clock screen of the transportation application, and may set a station and/or a bus number when the setting icon is selected. The electronic device may set a plurality of stations, and may switch to and display a subsequent set station screen when a predetermined location is selected in a transportation application screen. The electronic device may display an additional option icon when the setting icon is selected, and may display information including a delete icon for deleting a bus number when the additional option icon is selected. The electronic device may include a mini application for displaying detailed information of a bus that arrives fastest at a set station, and may switch into a bus application screen when a predetermined location is selected in a mini application screen.

Figure 7:
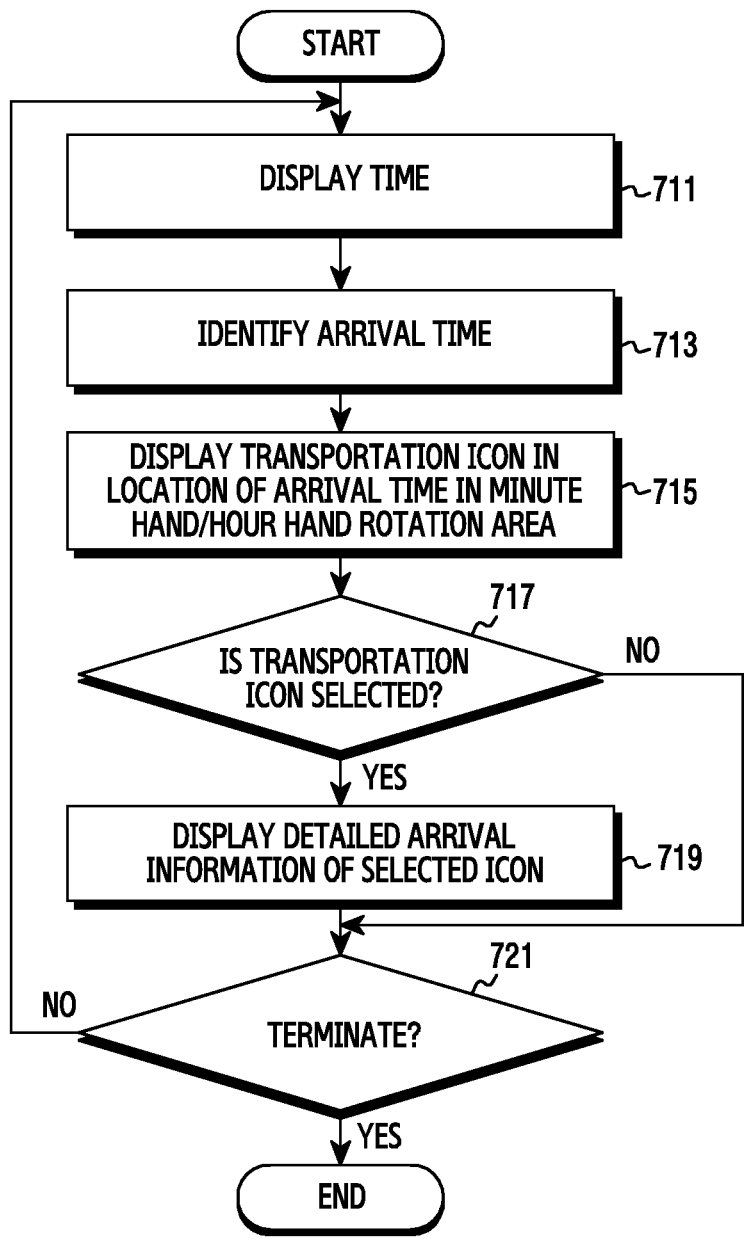
FIG. 7 is a flowchart illustrating a method in which an electronic device displays bus arrival information according to an embodiment of the present disclosure.

FIG. 7 is a flowchart illustrating a method in which an electronic device displays bus arrival information according to an embodiment of the present disclosure. FIG. 8 is a diagram illustrating an example in which an electronic device displays bus arrival information according to an embodiment of the present disclosure. The electronic device may be the electronic device of FIG. 2 or a part of the electronic device.

Referring to FIG. 7, when a bus application is executed, the electronic device displays a clock screen in the display 250 in step 711. The electronic device receives bus arrival information, such as shown in Table 1 above, from an external server (e.g., a content provider that transmits a set bus's estimated arrival time at a set bus station) at set time intervals in the state of displaying the clock screen. The electronic device analyzes the received bus arrival information in step 713. In step 715, the electronic device determines the location of a bus icon to be displayed in the clock screen as shown in FIGS. 5B and 5C, and displays the bus icon in the location of the arrival time in the minute hand rotation area and/or hour hand rotation area, as shown in FIG. 5A.

Subsequently, when a user selects the bus icon displayed in the clock screen, the electronic device recognizes the same in step 717, and displays detailed arrival information of the selected bus in step 719. The location of a desired bus icon may be set by rotating a bezel of the electronic device, and the displayed bus icon may be selected by being tapped. When the bus icon is selected, the electronic device may display, in the display 250, detailed arrival information including a bus number, an estimated arrival time, and/or the number of empty seats associated with the selected bus.

Figure 8A:
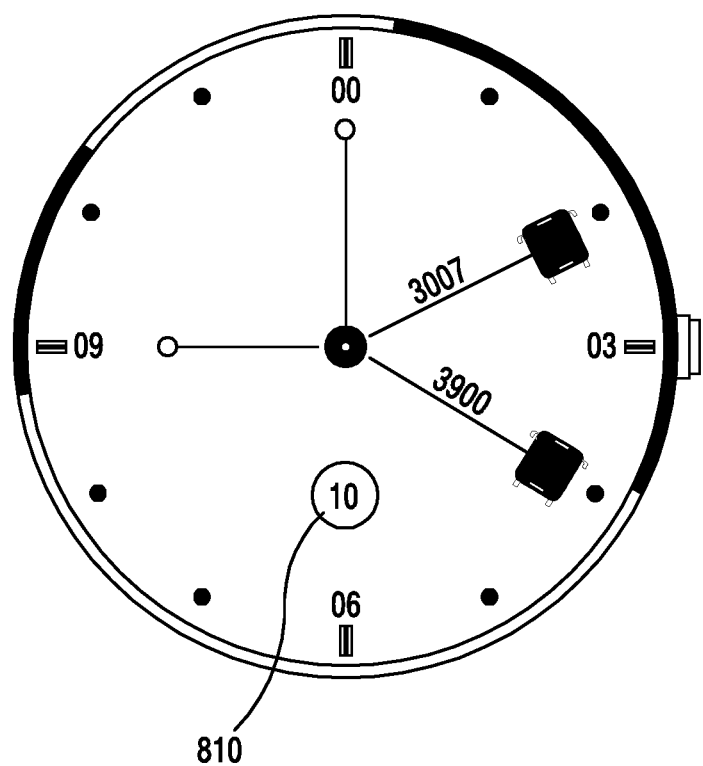
FIGS. 8A to 8D are diagrams illustrating an example in which an electronic device displays bus arrival information according to an embodiment of the present disclosure.
Figure 8B:
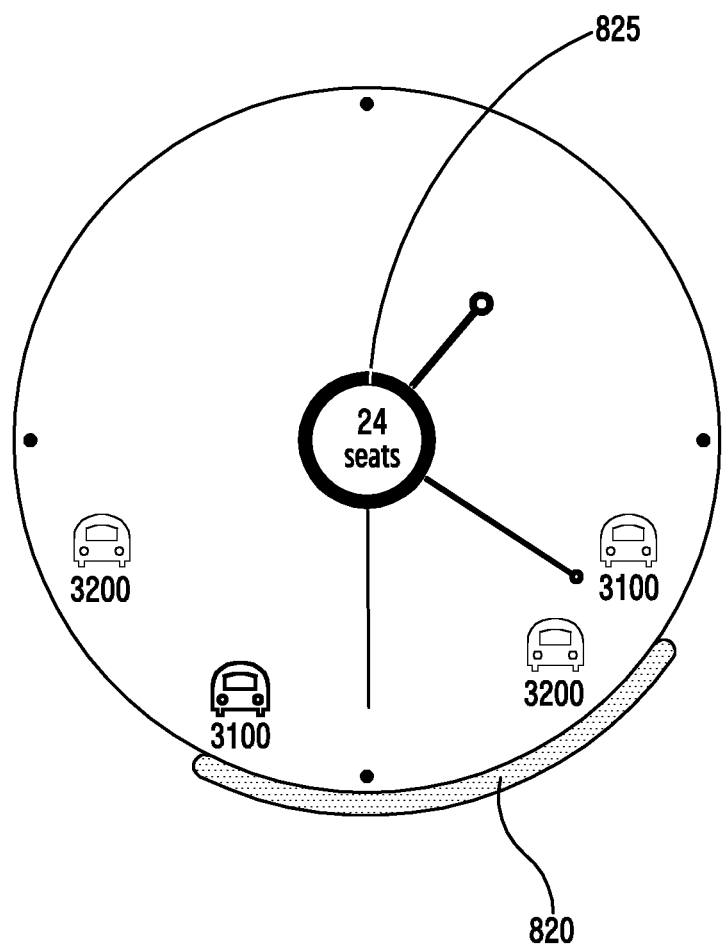
Figure 8C:
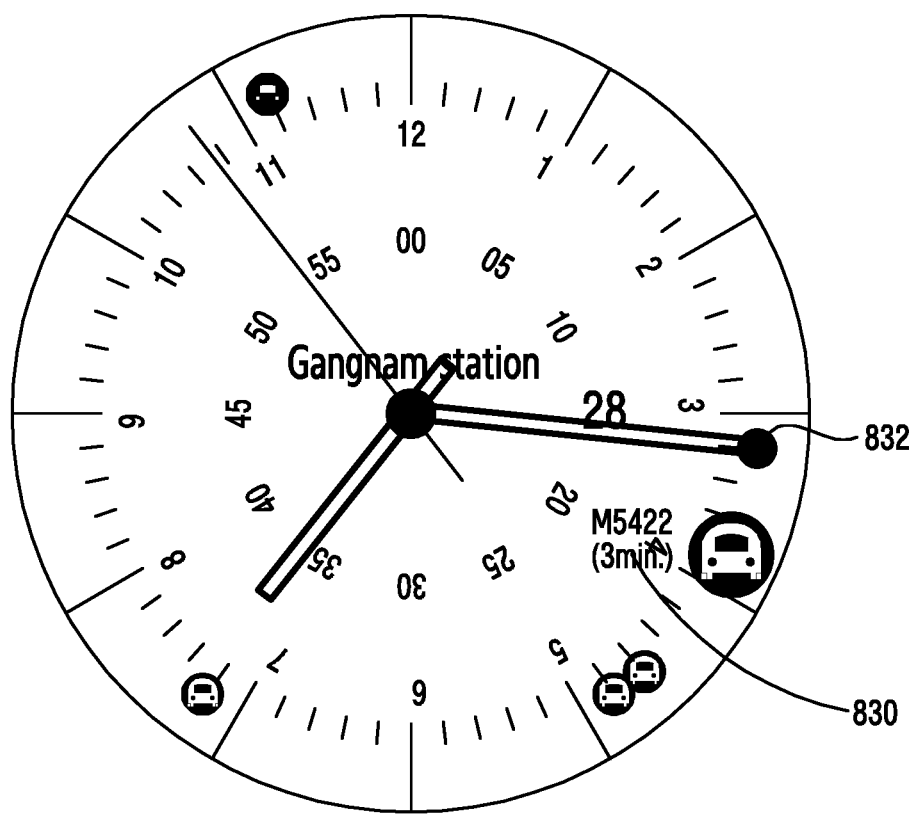
Figure 8D:
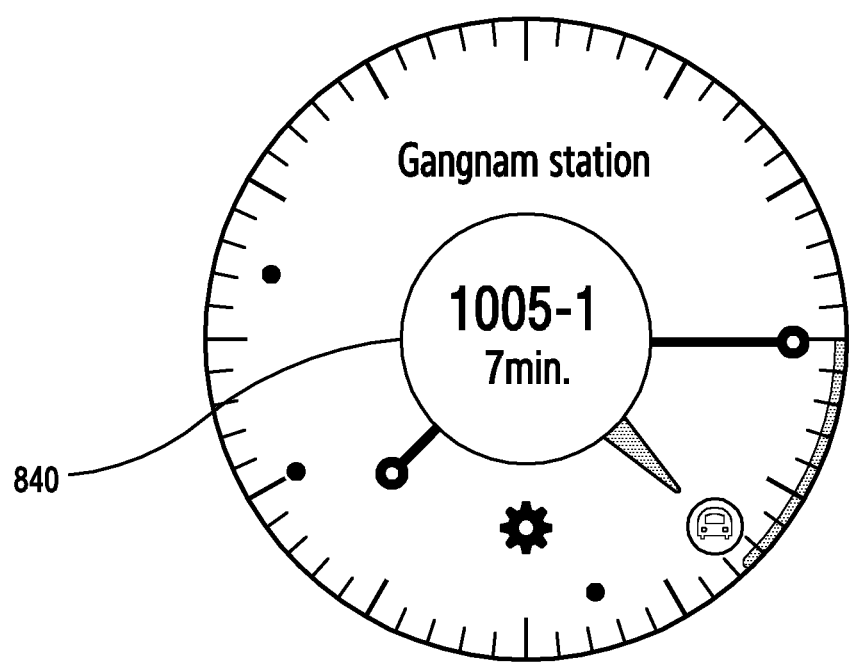

According to an embodiment of the present disclosure, a method of displaying detailed arrival information may be executed by various methods as shown in FIGS. 8A to 8D. Referring to FIG. 8A, an estimated arrival time of a selected bus may be displayed as shown in the diagram 810. For example, when a number "3007" bus icon is selected, the electronic device may display an estimated arrival time of 10 minutes in an area 810. Also, referring to FIG. 8B, the electronic device may display a mark from the current time to the selected bus icon as shown in the diagram 820, and may display detailed arrival information in an area 825. For example, when a number "3100" bus icon is selected, the electronic device may display a mark from the current location of the minute hand to the location of the number "3100" bus icon as shown in the diagram 820, and may display the number of empty seats of the number "3100" bus in the area 825. Also, as illustrated in FIG. 8C, the electronic device may display an indicator (e.g., circle (832)) in the current minute hand to indicate the current minutes, and may enable a user to recognize an estimated bus arrival time based on the white point. The electronic device may display detailed arrival information in a location adjacent to the selected bus icon. For example, when a number "M5422" bus icon is selected, the electronic device may display detailed arrival information including a bus number and an estimated arrival time in a location adjacent to the number "M5422" bus icon, as shown in the diagram 830. As illustrated in FIG. 8D, when a bus icon is selected, the electronic device displays an indicator 840 to indicate detailed arrival information, and displays detailed arrival information of a selected bus in the indicator 840. The indicator 840 may be configured in the form of a user interface (UI) indicating a selected bus icon. For example, when a number "1005-1" bus icon is selected, the electronic device may display the indicator 840 to indicate the selected number "1005-1" bus icon, and may display detailed arrival information of a corresponding bus in an area of the indicator 840.

The operation as described above may be repeatedly performed until the termination of a bus application is requested, the electronic device recognizes the same and terminates the execution of the bus application in step 721.

Figure 9:
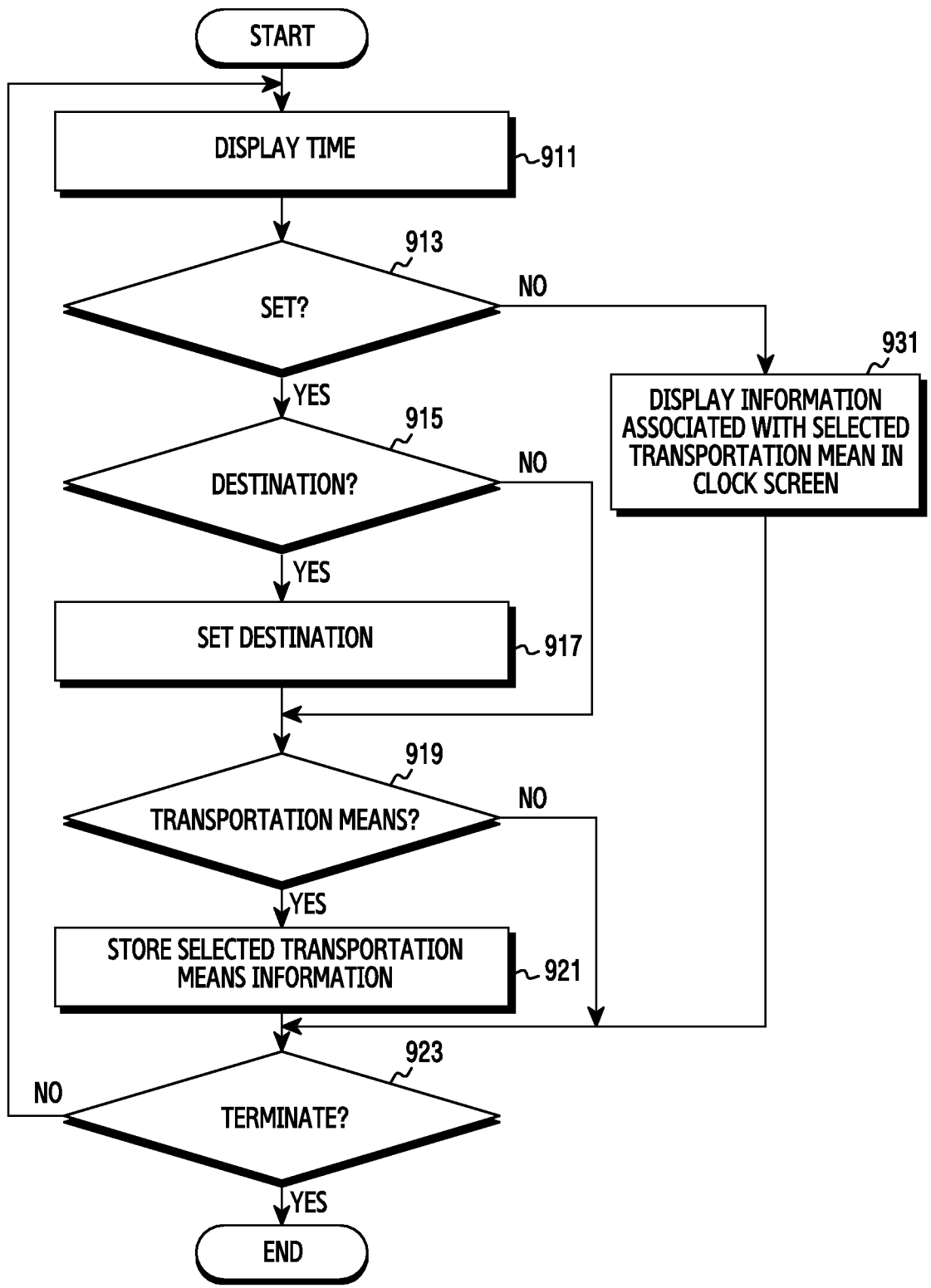
FIG. 9 is a flowchart illustrating an operation in which an electronic device executes a transportation application according to an embodiment of the present disclosure.
Figure 10A:
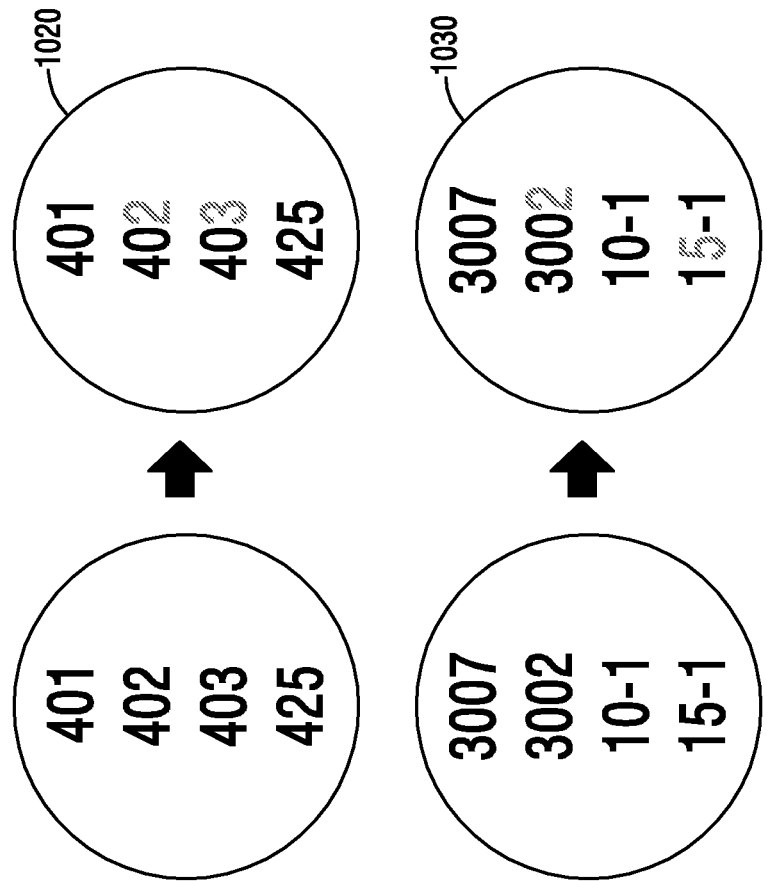
FIGS. 10A and 10B are diagrams illustrating examples in which an electronic device registers identification information of a transportation means according to an embodiment of the present disclosure.
Figure 10B:
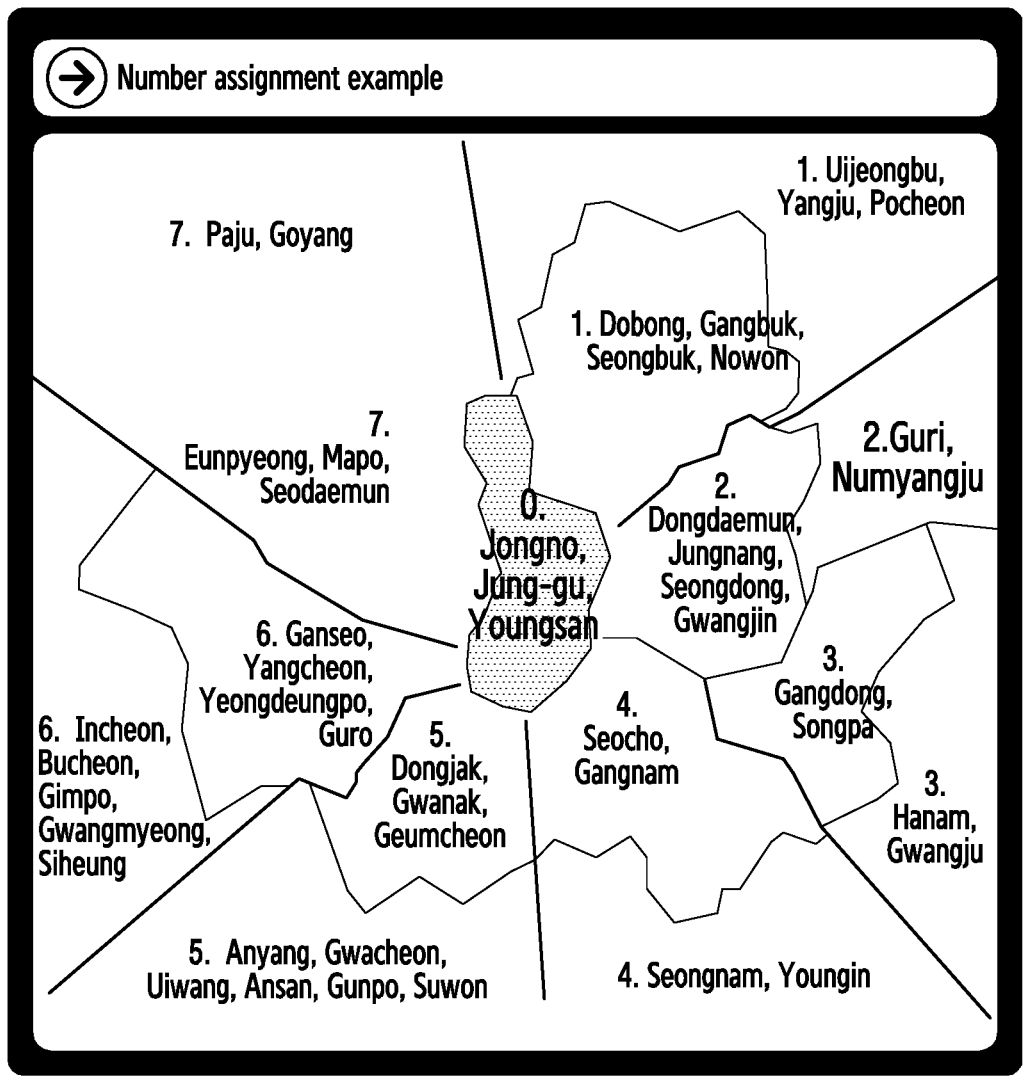

FIG. 9 is a flowchart illustrating an operation in which an electronic device executes a transportation application according to an embodiment of the present disclosure. Hereinafter, the present disclosure describes a transportation means as a bus, and describes a destination as a station where a bus arrives. FIGS. 10A and 10B are diagrams illustrating examples in which an electronic device registers identification information of a transportation means according to an embodiment of the present disclosure.

Referring to FIG. 9, when a transportation application is executed, the electronic device displays a clock screen in the display 250 in step 911. The clock screen may be an analog clock screen that indicates the time using an hour hand and a minute hand. When a setting operation has not been performed, the electronic device receives bus arrival information transmitted from an external server, analyzes the received arrival information, and displays the same as shown in FIG. 5A, in step 931. The step 931 performs a procedure of FIG. 7, analyzes the difference between the current time and an estimated bus arrival time, and displays corresponding bus icon images in locations of arrival times in a minute hand and/or hour hand rotation area, according to the result of the analysis. When a bus icon is selected, detailed arrival information of a selected bus may be displayed using one of the displaying methods of FIGS. 8A to 8D.

When a user executes a bus application, the user may set a bus station and desired buses at the bus station. When a setting mode is selected in the bus application, the electronic device recognizes the same in step 913, and displays a menu for setting a destination in step 915. The destination may be a bus station at which a bus arrives. When the user selects a destination bus station, the electronic device recognizes the same in step 915, and registers the selected bus station in step 917. Subsequently, the electronic device displays a list of buses of which arrival times at the bus station registered in step 917 are to be checked. When the user selects at least one bus number, the electronic device recognizes the same in step 919 and registers a selected bus number for the set bus station in step 921.

Referring to FIGS. 10A and 10B, when a bus number list is displayed, many similar bus numbers exist. For example, numbers of buses running in an inner city may be determined based on a region. FIG. 10B illustrates assigning line numbers of buses running in an inner region of Seoul and an outer region of Seoul. A bus running in Seoul may be assigned with a bus line number according to a set region, as illustrated in FIG. 10B. Table 2 is an example of allocating a Seoul bus line.

TABLE 2

| Division | Assignment Method |
| --- | --- |
| Blue (arterial line) bus | 3 digit number<br>Departure region + arrival region + 1 digit serial number (e.g., 141) |
| Green (feeder line) bus | 4 digit number<br>Departure region + arrival region + 2 digit serial number (e.g., 2412) |
| Yellow (circular line) bus | 2 digit number<br>region number + serial number (e.g., 41) |
| Red (broad area) bus | 4 digit number<br>9 + departure region in Gyeonggi province + 2 digit serial number (e.g., 9412) |

In Table 2, blue (arterial line) bus may be buses that depart from an outer region of Seoul and arrive at an inner region. Green (feeder line) bus may be buses that do not pass through an inner region and pass through an outer region of Seoul. Red (broad area) bus (or M bus) may be buses that depart from a province (e.g., Gyeonggi province) and arrive at the inner region of Seoul. Yellow (circular line) bus (green village bus) may be buses that circulate some areas.

As described above, bus numbers may be determined according to a line through which a bus runs. The number of digits that a bus number contains may be expressed as 2 digits, 3 digits, and 4 digits according to a type of inner line/circular line/broad area bus. Therefore, buses running in similar routes may have similar numbers. Therefore, in the case of setting a bus number for a bus station, numbers/text/patterns may be shown to be similar in a list displayed in a screen. Therefore, when setting a bus number, the electronic device according to an embodiment of the present disclosure may provide a change in color, font, size, and the like of a bus number included in the bus list displayed in the display 250, or may apply distinguishing effects, as shown in the diagrams 1010, 1020, and 1030 of FIG. 10A, thereby clearly distinguishing bus numbers. The electronic device may apply a logic that is appropriate for the form/length of a bus number to determine a degree of similarity. For example, in the case of displaying a bus number, one digit is a significantly important separator, such as 420 vs. 421 and 3002 vs. 3007, and thus, the logic may be applied when a single digit is different. When similarity is determined based on an entire list, a large number of similar results exist, and thus, emphasizing a difference may not be helpful. However, when the similarity is determined based on only the content of a list shown through a screen, a difference within the range recognized by a user is emphasized, and thus, the user may efficiently recognize the difference.

As described above, when a bus application is executed, the electronic device may display buses that are to arrive at a bus station in the clock screen, and may register a bus station and bus numbers in a setting mode. Also, when a request for terminating the bus application is generated, the electronic device recognizes the same and terminates the bus application in step 923.

A method of displaying a bus arrival time indicating when a bus is to arrive at a station may be performed in various methods. According to an embodiment of the present disclosure, an electronic device may display bus arrival information through a bus mini application, and may display bus arrival information through a bus application. The bus application may effectively use a resource by directly interacting with an operating system through an installation process. Conversely, the bus mini application may interact with an operating system or an application in a manner of being a dedicated engine or being contained therein, as opposed to directly interacting with the operating system or the application. The mini application may be a widget.

Figure 11:
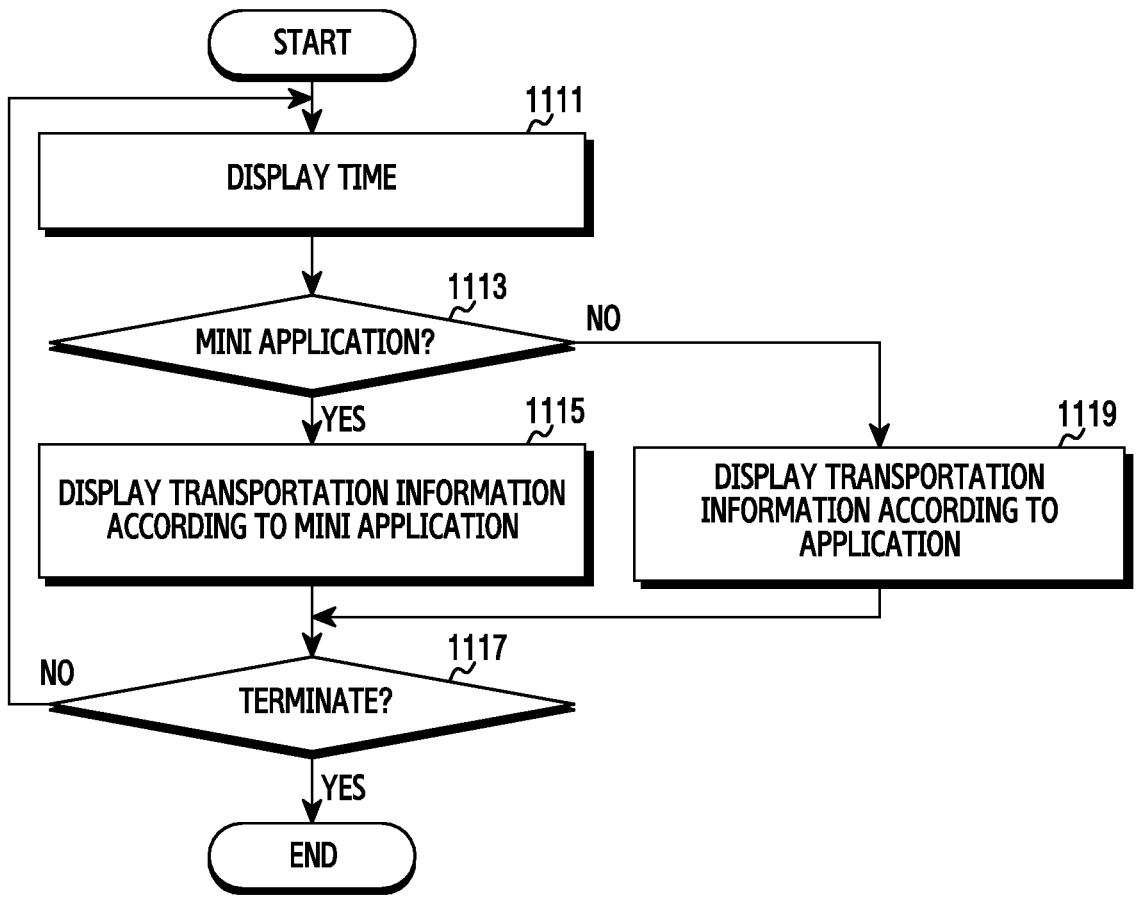
FIG. 11 is a flowchart illustrating an operation in which an electronic device switches a bus application and a bus widget according to an embodiment of the present disclosure.
Figure 12:
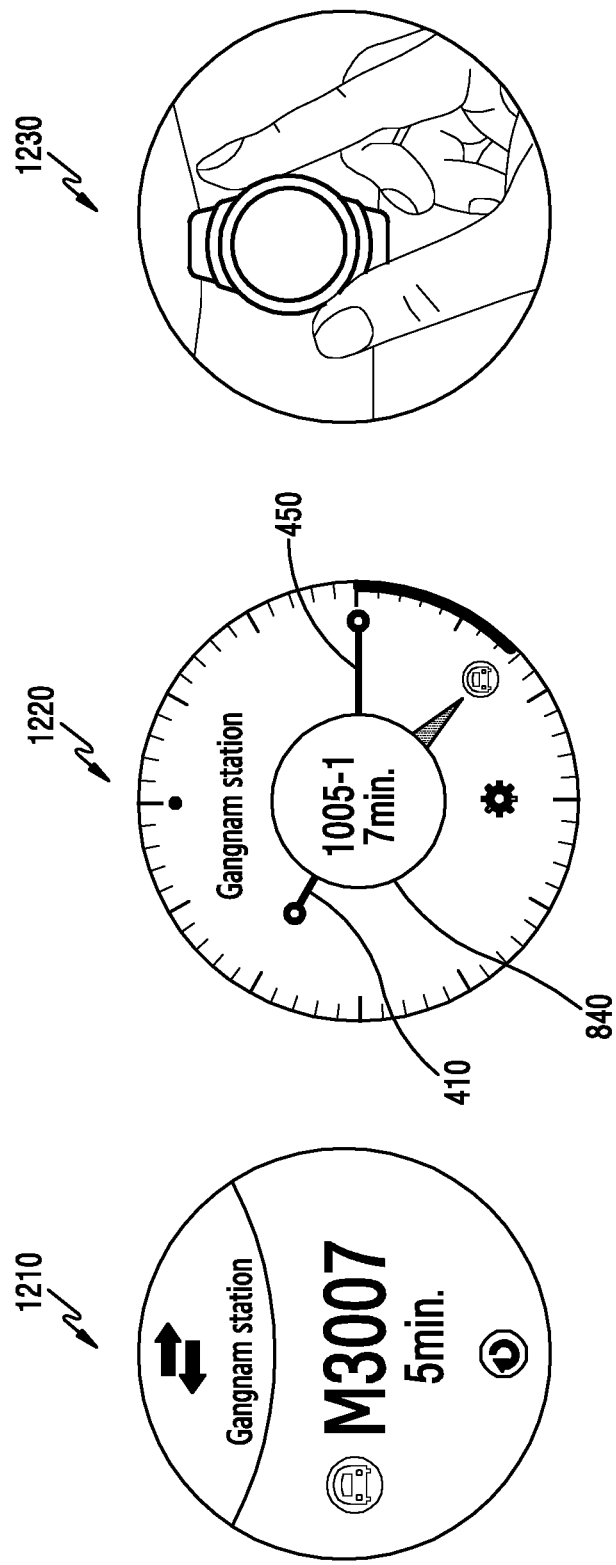
FIG. 12 is a diagram illustrating displaying a bus widget and a bus application according to an embodiment of the present disclosure.

FIG. 11 is a flowchart illustrating an operation in which an electronic device switches a bus widget and a bus application according to an embodiment of the present disclosure. FIG. 12 is a diagram illustrating displaying a bus widget and a bus application.

Referring to FIG. 11, the electronic device displays a clock screen in step 1111. When a mini application (widget) is executed, the electronic device recognizes the same in step 1113, and displays a bus widget screen in the display 250 in step 1115. The bus widget screen may be the same as a screen 1210 of FIG. 12. The bus widget screen may display the bus number of a bus that arrives fastest at a set bus station, and may display an arrival time. Bus numbers displayed in this instance may be the bus numbers that a user sets for checking their arrival times at the corresponding bus station, and the bus number of a bus that arrives fastest among the set bus numbers and an arrival time may be displayed. When the bus widget screen is displayed, the electronic device may not display the clock screen.

When a bus application is set, the electronic device recognizes the same in step 1113, and displays a bus application screen in the display 250 in step 1119. A screen 1220 of FIG. 12 is an execution screen of the bus application. The bus application may display a clock screen that displays the current time using the hour hand 410 and the minute hand 450, and may display bus arrival information transmitted from a server. A user may identify detailed arrival information of a predetermined bus by using a bezel as illustrated in a screen 1230. As illustrated in the screen 1230, when the user selects a displayed predetermined bus icon using the bezel, the electronic device may display the indicator 840 to indicate a selected bus, and may display the detailed arrival information of the selected bus in an area of the indicator 840, as illustrated in the screen 1220. The detailed arrival information may be a bus number, an arrival time and/or empty seats, and the like.

When the user terminates the execution of the bus widget or the bus application, the electronic device recognizes the same, and terminates the operation of the application that displays bus arrival information in step 1117.

Figure 13:
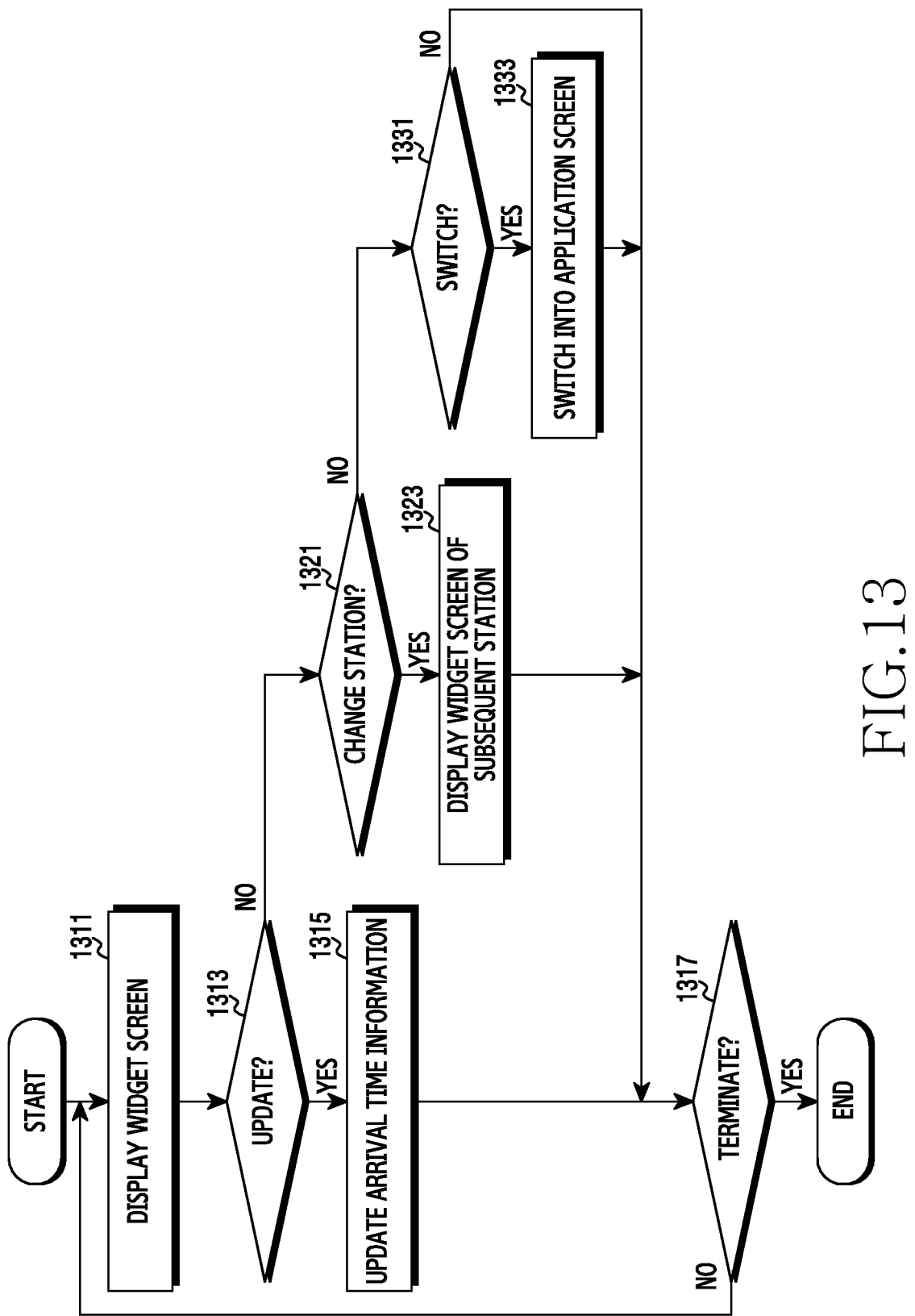
FIG. 13 is a flowchart illustrating an operation in which an electronic device executes a bus widget according to an embodiment of the present disclosure.

FIG. 13 is a flowchart illustrating an operation in which an electronic device executes a bus widget according to an embodiment of the present disclosure. FIGS. 14A to 14D are diagrams illustrating examples of screens displayed in a process of executing a bus widget.

Figure 14A:
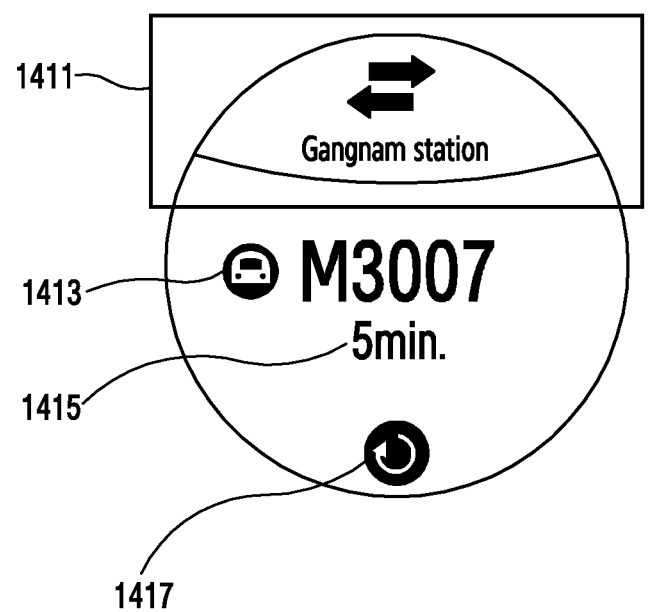
FIGS. 14A to 14D are diagrams illustrating screens displayed in a process of executing a bus widget according to an embodiment of the present disclosure.

Referring to FIG. 13, when a bus widget is executed, the electronic device displays a bus widget screen in step 1311. The bus widget screen may have a structure as shown in FIG. 14A. The bus widget of FIG. 14A may include an area 1411 for displaying a station, an area 1413 for displaying the bus number of a bus that arrives fastest from among set buses on the basis of the current time, an area 1415 for displaying an estimated arrival time, and a button 1417 for updating an estimated bus arrival time. The area 1411 displays a bus station name, and may be used as a button for switching a station. For example, when a user selects the area 1411, the electronic device may switch into a bus widget screen of a subsequent set station. Also, when the button 1417 is selected, the electronic device requests an estimated arrival time of a corresponding bus number from a server, and updates the information displayed in the area 1415 with an estimated arrival time transmitted from the server.

In the state in which a bus widget screen as shown in FIG. 14A is displayed, when a user selects (taps) the button (refresh button) 1417, the electronic device recognizes the same in step 1313, and requests the transmission of an estimated arrival time of a corresponding bus from the server in step 1315. When the estimated arrival time is received, the electronic device may update the estimated arrival time displayed in the area 1415 in step 1315.

Figure 14B:
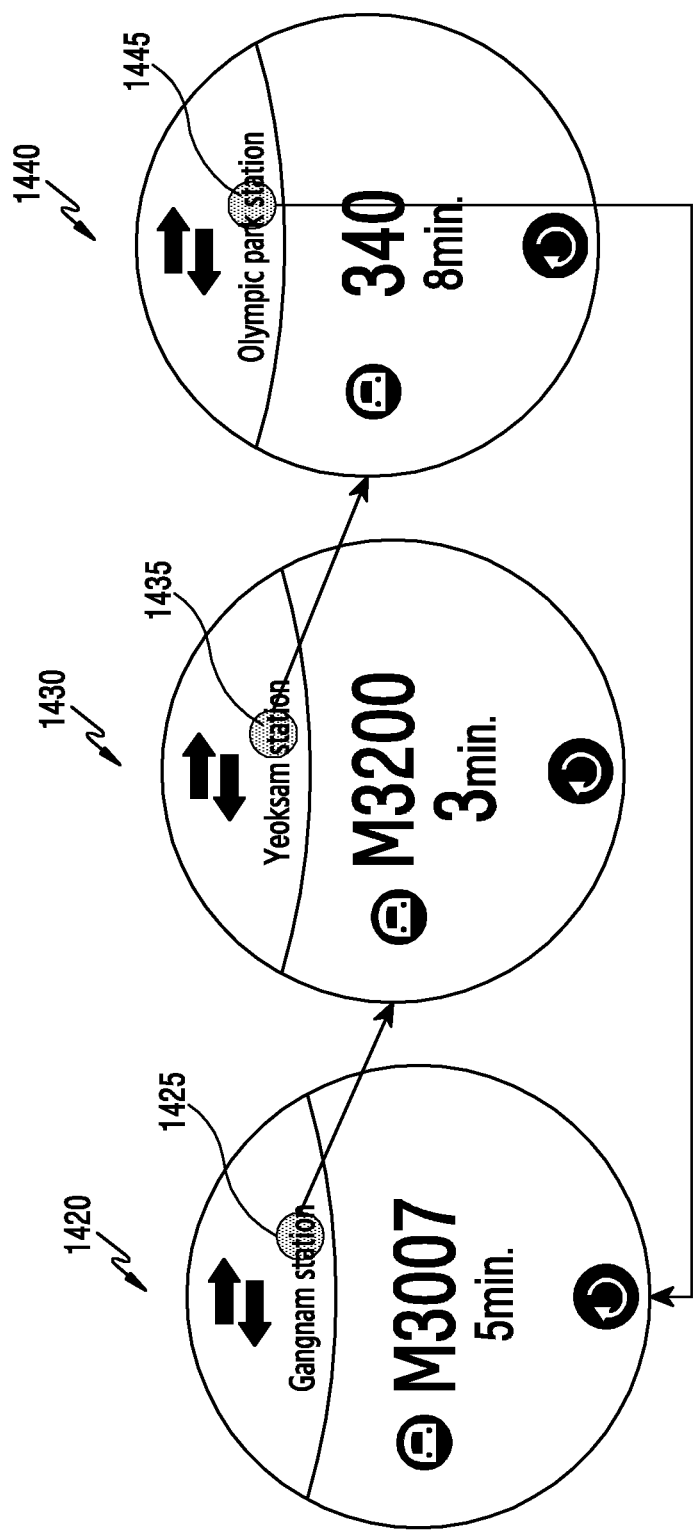

In the state in which the bus widget screen as shown in FIG. 14A is displayed, when a user selects (taps) the area 1411 where a bus station name is displayed, the electronic device recognizes the same in step 1321, and displays a widget screen of a subsequent set bus station in step 1323. FIG. 14B illustrates an example in which three stations (e.g., Gangnam station, Yeoksam station, and Olympic park station) are set. In the state in which a screen 1420 is displayed, when a user taps a bus station area as shown in the diagram 1425, the electronic device recognizes the same in step 1321, and displays a widget screen of a subsequent bus station (e.g., Yeoksam station) as shown in the diagram 1430 in step 1323. Also, in the state in which a screen 1430 is displayed, when a user taps a bus station area as shown in the diagram 1435, the electronic device recognizes the same in step 1321, and displays a widget screen of a subsequent bus station (e.g., Olympic park station) as shown in the diagram 1440 in step 1323. In the state in which a screen 1440 is displayed, when a tap is provided as shown in the diagram 1445, the electronic device recognizes that the displayed bus station is a last bus station, and displays the screen 1420, which is a first widget screen.

Figure 14C:
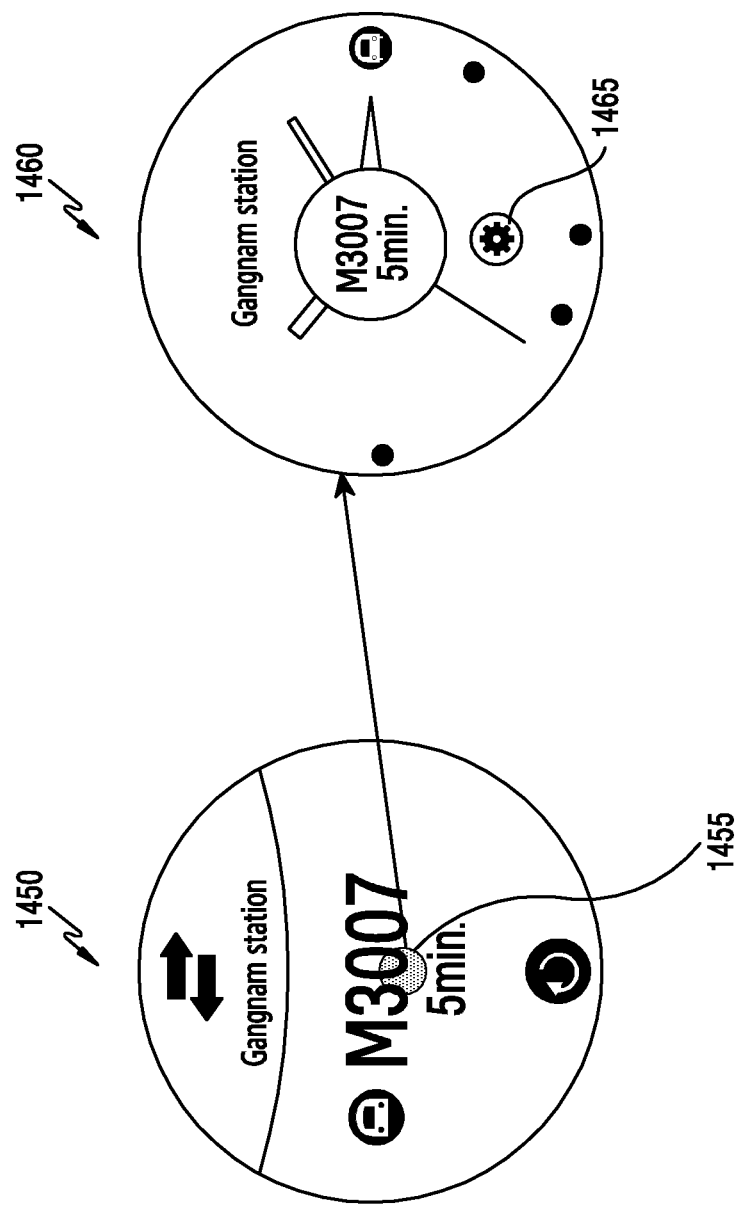
Figure 14D:
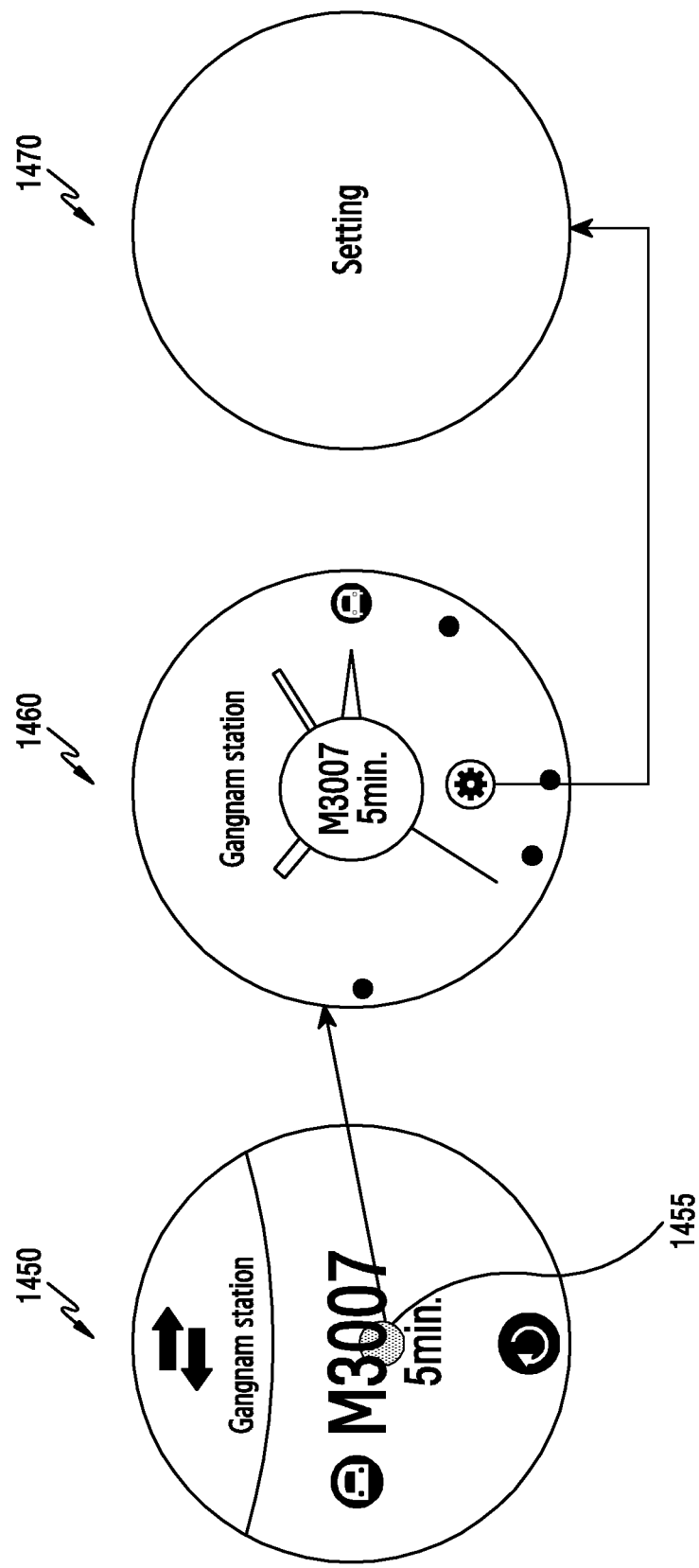

The bus widget screen may display information associated with a bus that arrives first at a current bus station. When a user checks whether another bus arrives at the current bus station or sets a station/bus number, the electronic device may switch the bus widget screen into a bus application. When the user requests switching from the bus widget screen into the bus application, the electronic device recognizes the same in step 1331, and switches into a bus application screen in step 1333. Referring to FIG. 14C, in the state in which a bus widget screen is displayed as shown in the diagram 1450, when the user selects a random area of the bus widget screen, the electronic device may recognize the same as an input that requests switching to a bus application. Therefore, in the state in which the bus widget screen is displayed as shown in the screen 1450, when the user selects (e.g., taps) the bus widget screen as shown in the diagram 1455, the electronic device recognizes the same in step 1331, and switches into a bus application screen as shown in an screen 1460 in step 1333. In this instance, the bus application screen shown after switching may be a bus application screen of the same bus station. The bus application screen 1460 may display bus icons in locations of arrival times of set buses of the corresponding bus station in the state in which a clock screen is displayed. When a button for selecting a bus station and/or a bus number is selected as shown in the diagram 1465, the electronic device may recognize the same, and may display a setting screen as shown in the diagram 1470.

In the state in which a bus widget screen having a structure of FIG. 14A is displayed, when a user requests the termination of a bus widget operation, the electronic device recognizes the same and terminates displaying the bus widget screen in step 1317.

Figure 15:
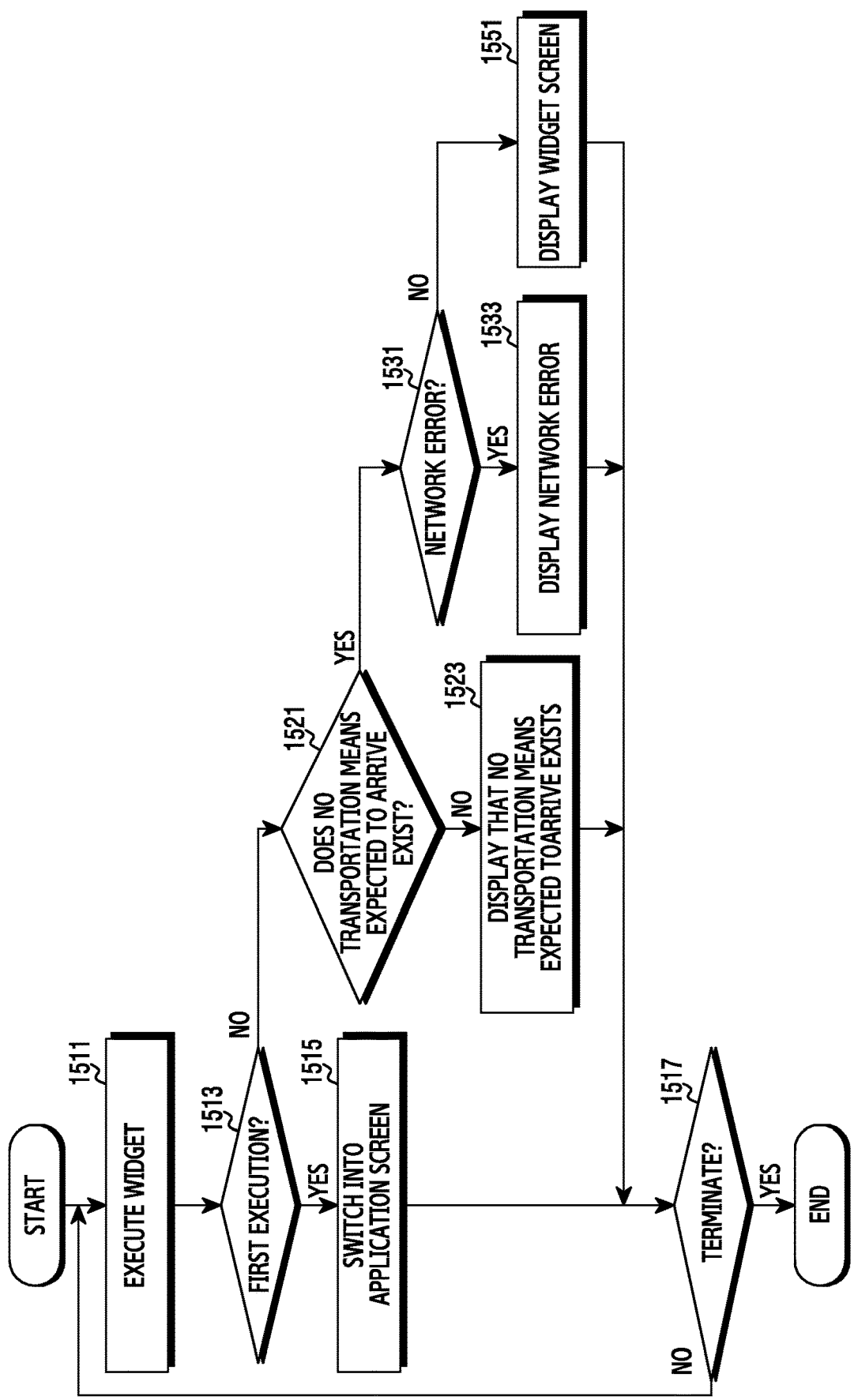
FIG. 15 is a flowchart illustrating a bus widget screen displaying a method of an electronic device according to an embodiment of the present disclosure.
Figure 16A:
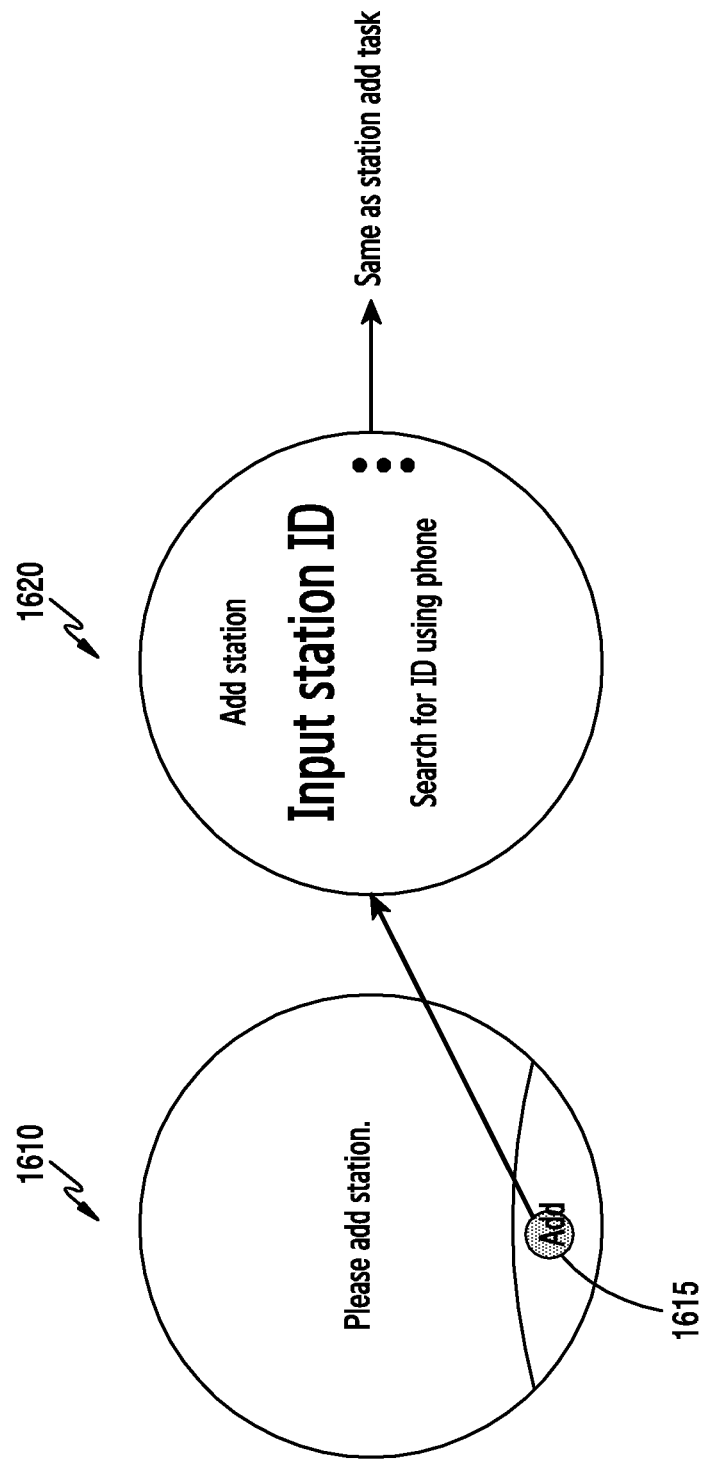
FIGS. 16A to 16C are diagrams illustrating displaying a bus widget screen when the operation of FIG. 15 is executed according to an embodiment of the present disclosure.
Figure 16B:
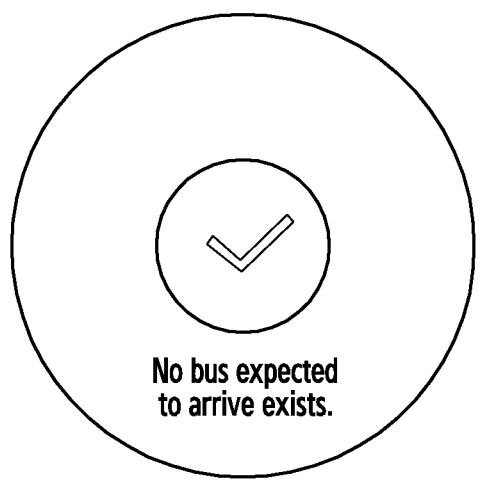
Figure 16C:
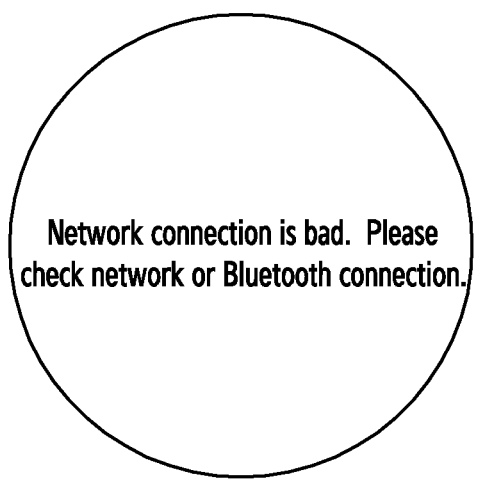

FIG. 15 is a flowchart illustrating a method in which an electronic device displays a bus widget screen according to an embodiment of the present disclosure. FIGS. 16A to 16C are diagrams illustrating displaying a bus widget screen when the operation of FIG. 15 is executed.

Referring to FIG. 15, the electronic device executes a bus widget in step 1511. When the execution of a bus widget is requested for the first time, the electronic device recognizes the same in step 1513, and switches into a bus application screen in step 1515. For example, when the execution of the bus widget is requested for the first time, the electronic device displays a screen 1610 of FIG. 16A in the display 250. The electronic device recognizes that a bus station has not been set in association with the execution of a bus widget, and may display a message (e.g., "Please add station.") as shown in the screen 1610 in display 250. When an addition button area is selected (e.g., tapped) in the screen 1610, as shown in the diagram 1615, the electronic device switches into a bus application screen, and displays a screen 1620 for setting a station ID. The electronic device may set a bus station and bus numbers by executing a setting procedure of the bus application.

In the state in which the execution of the bus widget is requested, when a bus that is estimated to arrive at a corresponding station does not exist, the electronic device recognizes the same in step 1521, and displays that the bus that is estimated to arrive at the corresponding station does not exist in step 1523. For example, when the execution of the bus widget is requested, the electronic device requests, from a server, bus arrival information of a currently set bus station, and receives the bus arrival information from the server. When a bus that is estimated to arrive at the corresponding station does not exist (e.g., a bus estimated to arrive does not exist or a bus estimated to arrive within a certain time period does not exist), the electronic device displays a screen of FIG. 16B in the display 250.

In the state in which the bus widget is executed, when an update button 1417 is selected, the electronic device may access the server, and may receive bus arrival information. Therefore, the electronic device may check a communication connection state with the server, while the bus widget is executed. When a network error is recognized, the electronic device recognizes the same in step 1531, and displays a network error message in the display 250 in step 1533. When the network error state is detected, the electronic device may display a screen of FIG. 16C that displays a network error message in the display 250.

In the case of executing the bus widget, when a bus station and a bus number are set, a bus estimated to arrive exists, and a network state is normal, the electronic device displays a bus widget screen in the display 250 in step 1551. In step 1551 a normal bus widget is executed, and the electronic device performs a bus widget operation while executing the procedure of FIG. 13 in step 1551. When a user requests termination of the bus widget operation, the electronic device recognizes the same, and terminates displaying the bus widget screen in step 1517.

Figure 17:
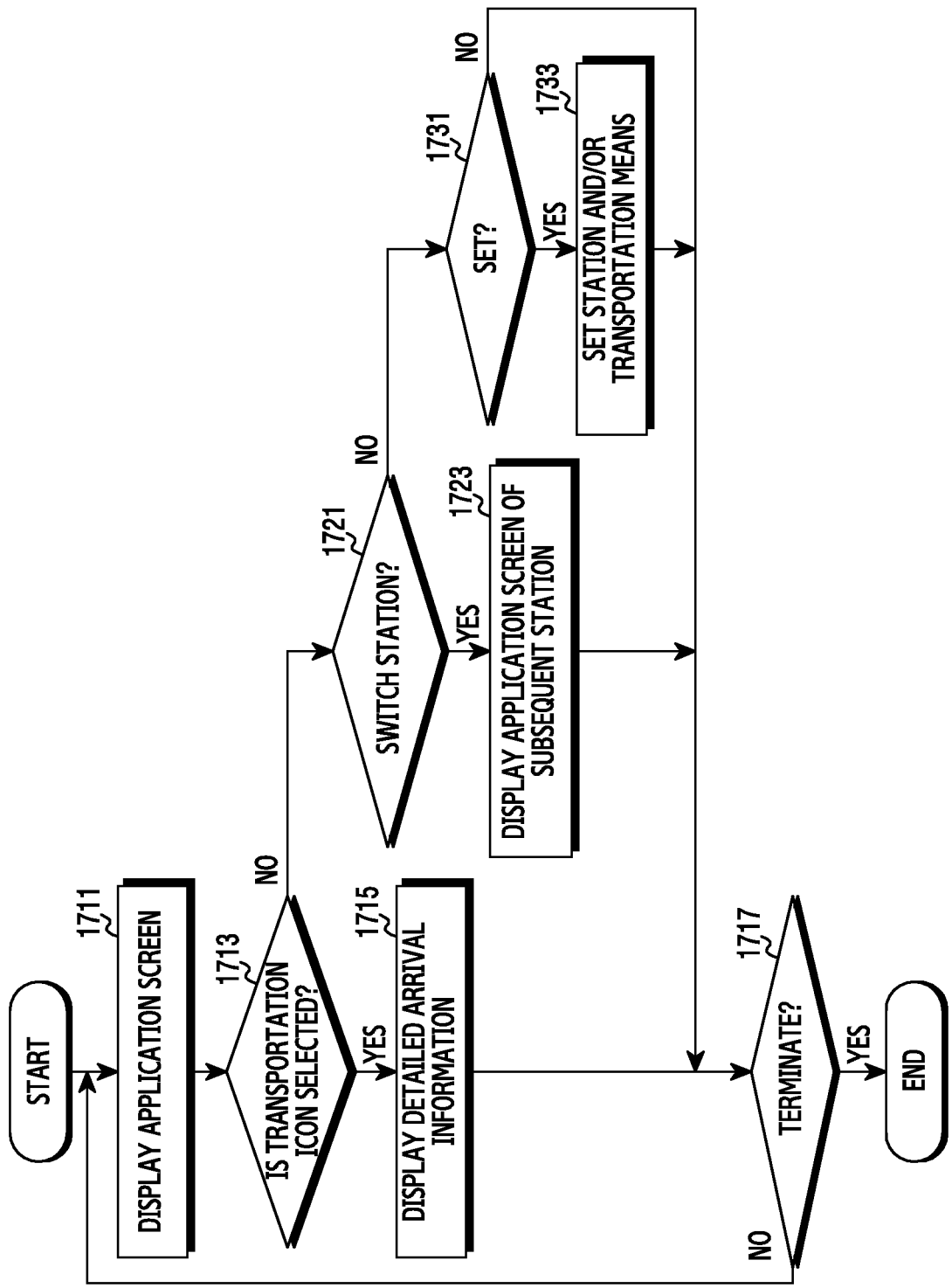
FIG. 17 is a flowchart illustrating a bus application executing method of an electronic device according to an embodiment of the present disclosure.

FIG. 17 is a flowchart illustrating a bus application executing method of an electronic device according to an embodiment of the present disclosure.

Referring to FIG. 17, the electronic device displays a bus application screen in step 1711. The bus application screen may be a screen for displaying arrival times of buses at a set station in a clock screen indicating the time using an hour hand and a minute hand. For example, the bus application screen may be a screen as shown in FIG. 5A. In the state in which the bus application screen of FIG. 5A is displayed, when a bus icon is selected, the electronic device recognizes the same in step 1713, and displays detailed arrival information of a selected bus in the screen in step 1715. The detailed arrival information of the bus may be displayed as illustrated in FIGS. 8A to 8D. In an embodiment of the present disclosure, it is assumed that the detailed arrival information of the bus is displayed in the form of FIG. 8D.

In the state in which the bus application screen is displayed in step 1711, when a user requests switching of a screen, the electronic device recognizes the same in step 1721, and displays a bus application screen of a subsequent set bus station in step 1723. A plurality of bus stations may be set through the electronic device's operation for setting a bus station and/or a bus number. When switching of a bus station is requested, the electronic device may display a bus application screen of a subsequent set bus station.

In the state in which the bus application screen is displayed in step 1711, when a user requests setting of a station and/or a bus number, the electronic device recognizes the same in step 1731, and performs an operation of setting a bus station and/or bus number in step 1733. The operation of setting a bus station and a bus number may be an operation such as registering, editing, adding, deleting, and the like.

When a user requests termination of the operations of the bus application while the bus application is executed, the electronic device recognizes the same, and terminates the operations of the bus application in step 1717.

Figure 18:
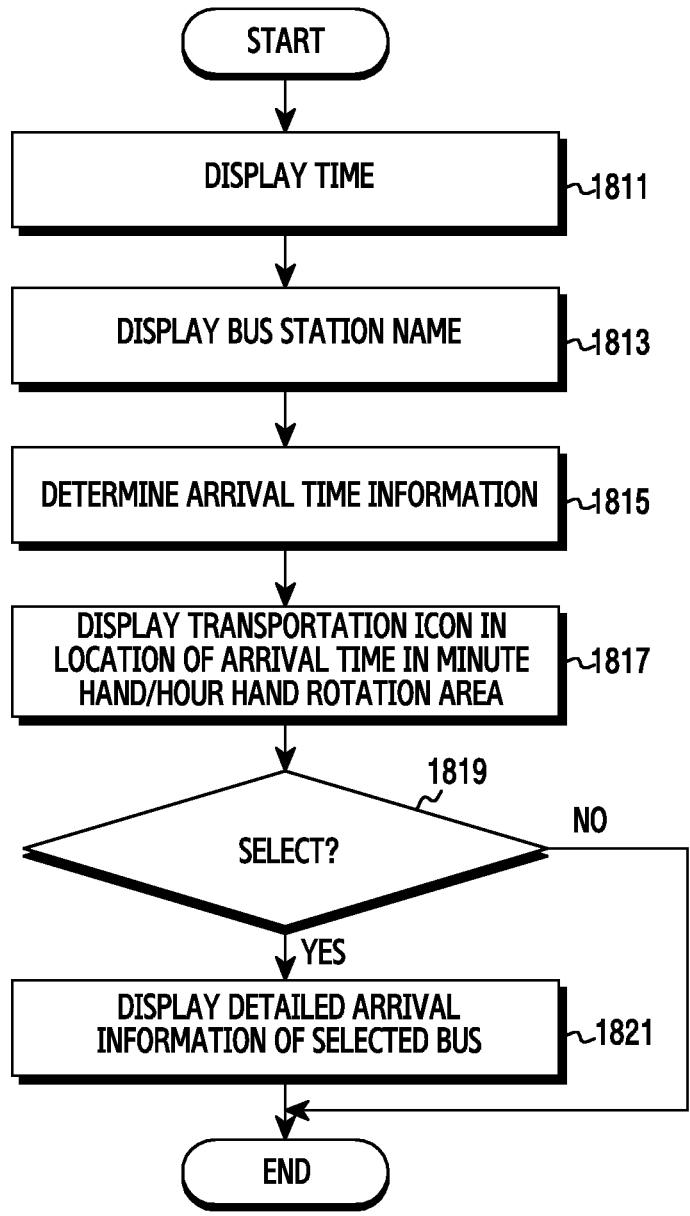
FIG. 18 is a flowchart illustrating a bus application screen displaying method of an electronic device according to an embodiment of the present disclosure.
Figure 19:
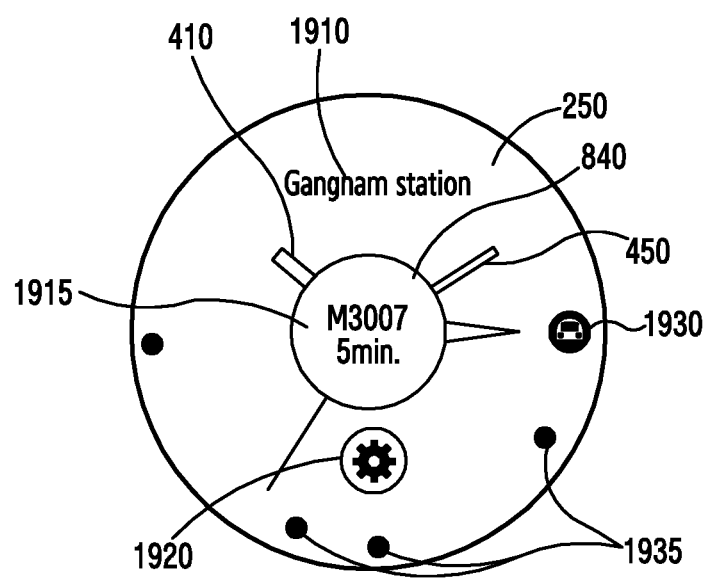
FIG. 19 is a diagram illustrating an example of displaying a bus application screen according to an embodiment of the present disclosure.

FIG. 18 is a flowchart illustrating a bus application screen displaying method of an electronic device according to an embodiment of the present disclosure. FIG. 19 is a diagram illustrating a bus application screen displayed. FIG. 18 may be a flowchart of step 1711 of FIG. 17 that displays a bus application screen.

Referring to FIG. 18, the electronic device displays time in the display 250 in step 1811. The clock screen may be an analog clock screen that indicates the time using an hour hand and a minute hand. The electronic device displays a bus station name in the displayed clock screen in step 1813. The electronic device may request, from the server 130 at predetermined time intervals, arrival information of buses set for a displayed bus station in the state in which the clock screen is displayed, and may receive arrival time information of buses, which is transmitted from the server 130. The electronic device analyzes the received bus arrival time information in step 1815. In step 1817, the electronic device determines the location of a bus icon to be displayed in the clock screen as shown in FIGS. 5B and 5C, and displays the bus icon in the location of the arrival time in the minute hand rotation area and/or hour hand rotation area, as shown in FIG. 5A.

Subsequently, when a user selects the bus icon displayed in the clock screen, the electronic device recognizes the same in step 1819, and displays detailed arrival information of the selected bus in step 1821.

FIG. 19 may be the bus application screen displayed in step 1821 of FIG. 18. The electronic device may display the current time in the display 250 using the hour hand 410 and the minute hand 450. Also, the electronic device may display a currently selected bus station name 1910, a bus station and bus setting button 1920, a bus queue 1935 for displaying arrival times of buses set for the current bus station, and the like. When a predetermined bus is selected by a user, the electronic device may display the indicator 840 as shown in the diagram, and the indicator 840 may indicate a selected bus 1930, and the selected bus 1930 may be displayed in a form that is different from a selected bus queue 1935. The electronic device may display detailed arrival information 1915 of the currently selected bus (e.g., a bus number, an estimated arrival time, a type of bus, empty seats, and the like) in the area of the indicator 840. The color of a bus is determined based on the type of bus, such as a feeder line bus, an arterial line bus, a broad area bus, and the like, and the same color as the bus may be applied to the area 840 or the bus 1930. When a predetermined bus is not selected, the electronic device may display the name 1910 of the currently selected bus station, the bus station and bus setting button 1920, and the bus queue 1935 in the bus application screen as shown in FIG. 19. In this instance, the bus icon 1930 may be displayed in the form of a bus queue.

Figure 20:
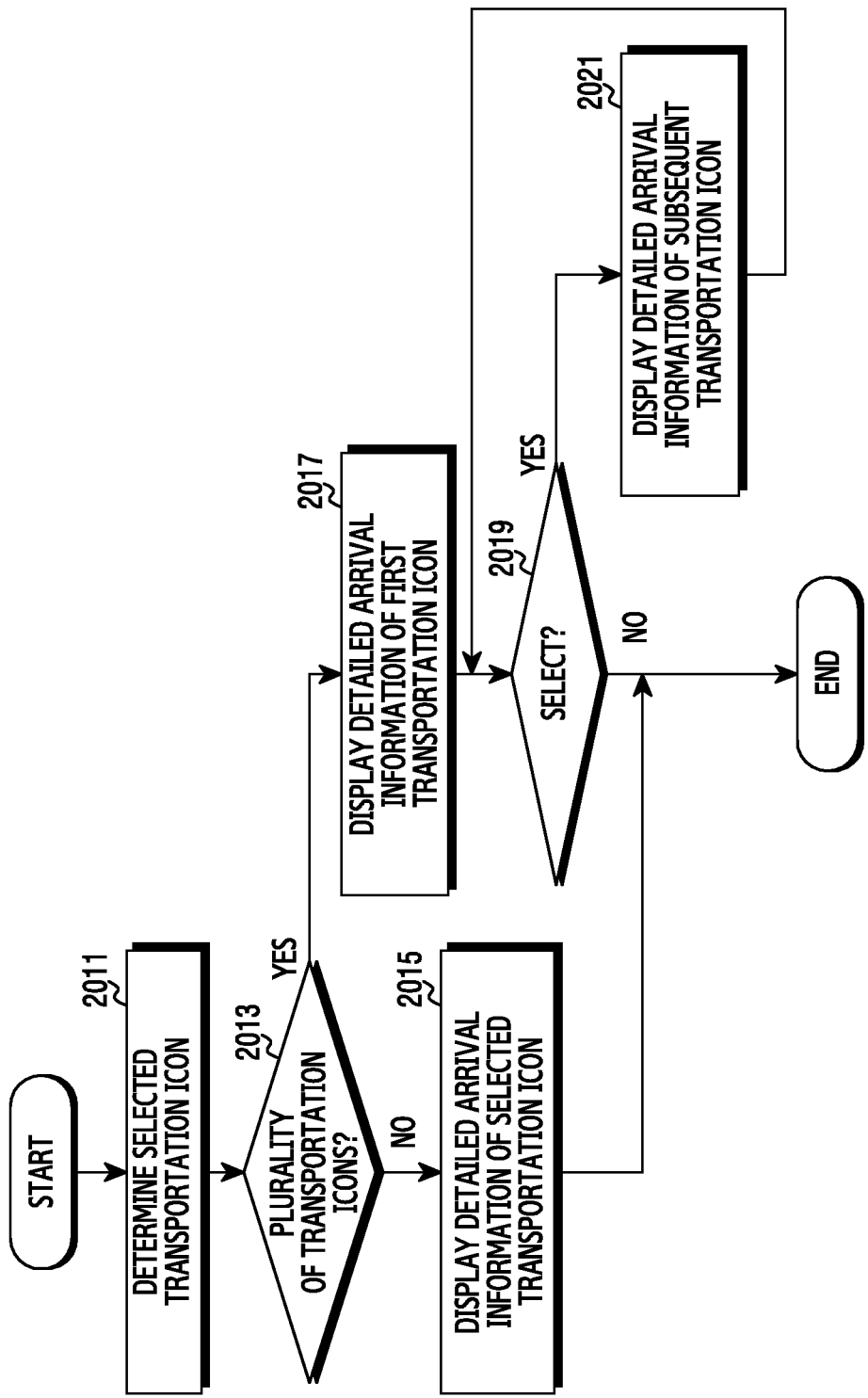
FIG. 20 is a flowchart illustrating a procedure in which an electronic device displays detailed bus arrival information according to an embodiment of the present disclosure.

FIG. 20 is a flowchart illustrating a procedure in which an electronic device displays detailed bus arrival information according to an embodiment of the present disclosure. FIGS. 21A to 21D are diagrams illustrating examples of displaying detailed bus arrival information.

Referring to FIG. 20, when a predetermined bus is selected from the bus queue 1935 displayed in the bus application screen, the electronic device determines the selected bus icon in step 2011. A single bus icon or two or more icons may be located at a selected time. For example, when two or more buses are estimated to arrive at the corresponding time, the electronic device sequentially selects overlapping bus icons according to a selection made by the user, and may display detailed arrival information of each bus. A single bus icon is located in the location of the selected bus icon, the electronic device recognizes the same in step 2013, and displays detailed arrival information of the selected bus in step 2015. However, when a plurality of bus icons are located at the selected location, the electronic device displays detailed arrival information of a bus corresponding to a first bus icon in step 2017. In the state in which the detailed arrival information of a first bus is displayed, when another bus icon is selected, the electronic device recognizes the same in step 2019, and displays detailed arrival information of a subsequent bus icon in step 2021.

Figure 21A:
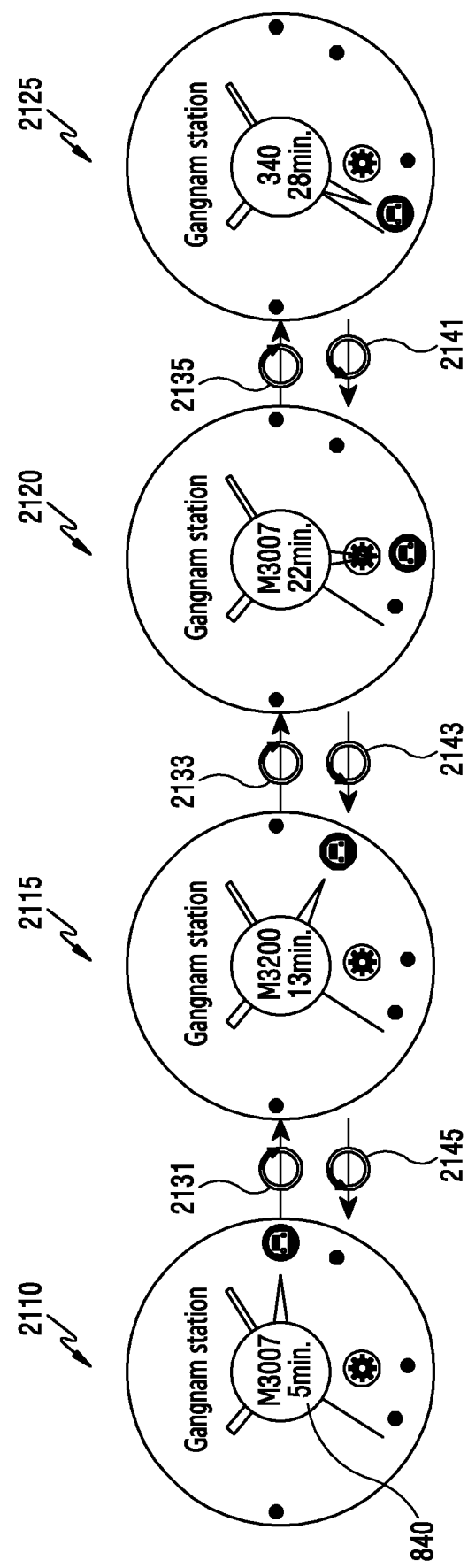
FIGS. 21A to 21D are diagrams illustrating displaying detailed bus arrival information according to an embodiment of the present disclosure.

FIG. 21A is a diagram illustrating selecting a bus icon by rotating a bezel. In FIG. 21A, a number M3007 bus, a number M3200 bus, and a number 340 bus are set for a Gangnam-station bus station. A user rotates a bezel and selects the number M3007 bus, which is estimated to arrive first. The electronic device recognizes that the estimated arrival time of the corresponding bus does not overlap another bus in step 2013, and displays detailed arrival information of the selected number M3007 bus as shown in the diagram 1915 in step 2015. When the user rotates the bezel as shown in the diagram 2131, the electronic device recognizes the same, and determines a bus icon selected through the rotation of the bezel in step 2011. The electronic device displays the bus icon (e.g., the bus icon 1930 of FIG. 19) selected through the rotation of the bezel in a form that is different from a bus queue (e.g., the bus queue 1935 of FIG. 19), thereby enabling the user to recognize that the bus icon is selected. The electronic device recognizes another bus icon that overlaps the location of the selected bus icon in step 2013, and displays detailed arrival information of the selected bus icon in the area of the indicator 840.

When bus icons do not overlap each other as illustrated in screens 2110, 2115, 2120, and 2125 of FIG. 21A, the electronic device may display, in the indicator 840, detailed arrival information of each bus selected through a rotation as shown in the diagrams 2131, 2133, and 2135. In the state in which a screen is displayed as shown in the screen 2125, when the bezel is rotated in the reverse direction as shown in the diagram 2141, 2143, and 2145, the electronic device may recognize the same, and may display detailed arrival information of selected buses in the reverse order, as shown in the screens 2120, 2115, and 2110. Although FIG. 21A illustrates an example in which a user rotates a bezel clockwise or counterclockwise, and sequentially selects a bus in a bus queue according to an arrival time, the bus icons selected according to the amount of rotation of the bezel may be selected in a non-sequential manner. In the case of a device that does not include a bezel, the area 840 may be utilized as a button and a subsequent bus may be sequentially selected. In the state in which a last bus is selected, when the area 840 is touched, the first bus may be selected.

Figure 21B:
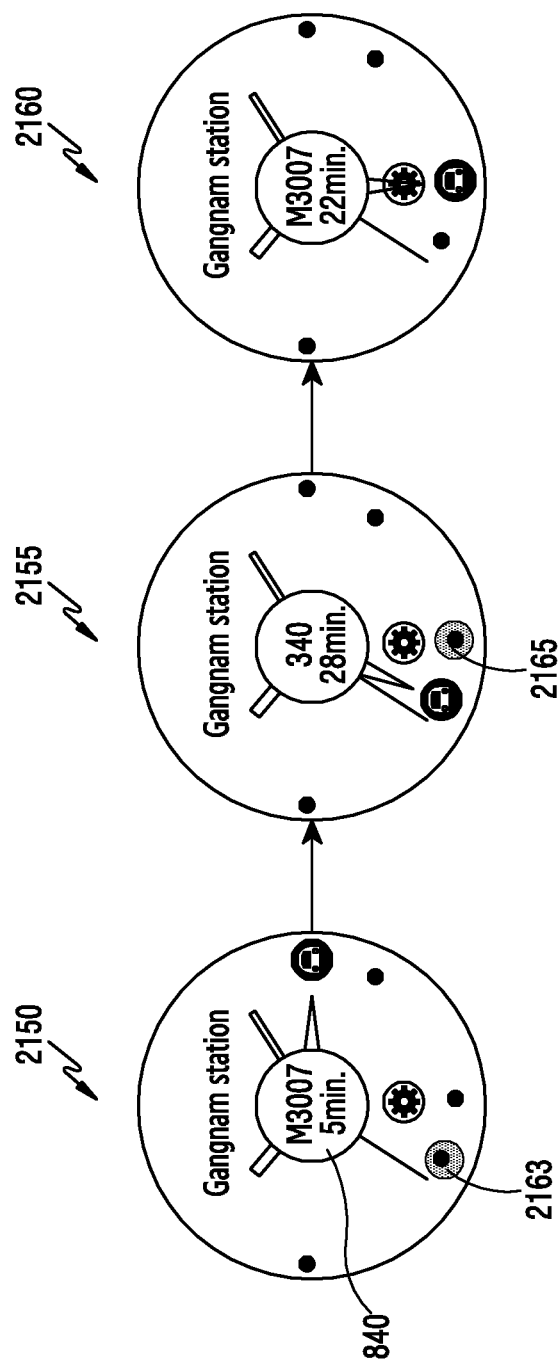

FIG. 21A illustrates an operation of selecting a bus through a rotation of a bezel. However, the bus may be selected by touching a displayed bus queue as shown in FIG. 21B. When a user selects a predetermined bus in the bus queue displayed as shown in screens 2150, 2155, or 2160, the electronic device recognizes the selected bus, and displays detailed arrival information of the selected bus.

Figure 21C:
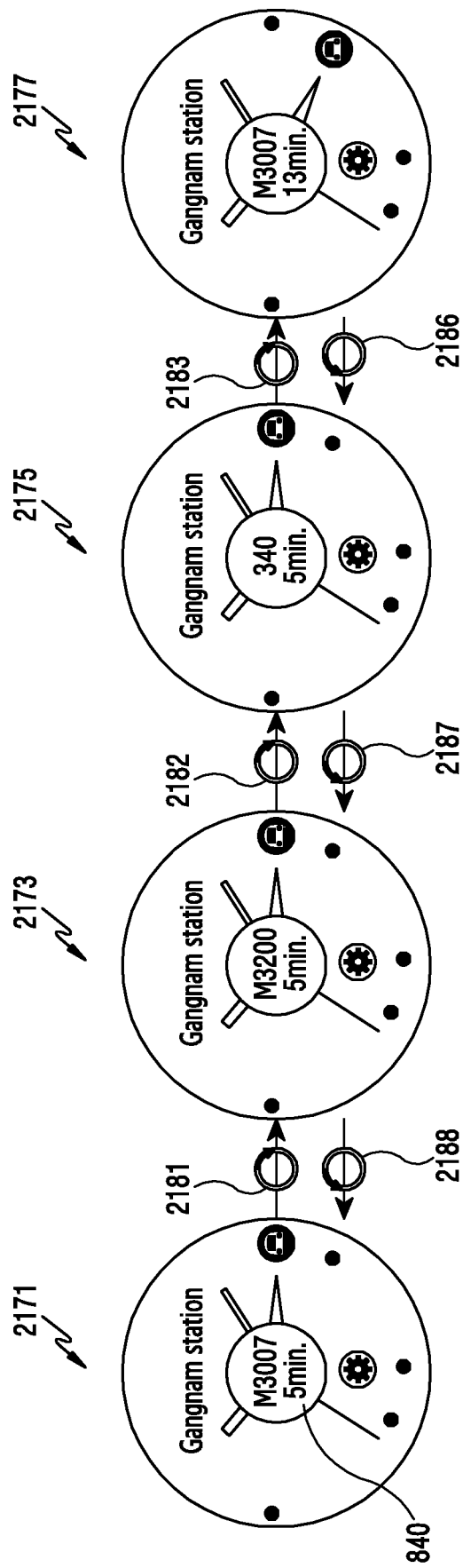

FIG. 21C illustrates an example in which three buses, a number M3007 bus, a number M3200 bus, and a number 340 bus, overlap each other at the location of a bus icon of which the estimated arrival time is 5 minutes. The electronic device recognizes that the arrival time of the selected bus overlaps arrival times of other buses in step 2013, and displays detailed arrival information of a first bus (e.g., the number M3007 bus) as shown in a screen 2171 in step 2017. In this instance, the server 130 may transmit operation information of buses based on seconds. The electronic device may analyze the arrival time of a bus based on minutes and seconds, and may determine a bus that will arrive first. When the user rotates a bezel as shown in diagrams 2181, 2182, and 2183, the electronic device recognizes sequentially selected buses in step 2019, and displays detailed arrival information of the selected buses as shown in screens 2173, 2175, and 2177, in step 2021. When a user sequentially selects buses by rotating a bezel, the electronic device recognizes the rotation of the bezel, and may sequentially display detailed arrival information (a bus number or an estimated arrival time) of a corresponding bus. When the user rotates the bezel in the reverse direction as shown in the diagrams 2186, 2187, and 2188, the electronic device may display detailed arrival information of buses that arrive, in the reverse order, as shown in the screens 2175, 2173, and 2171. In this instance, the user may generate rotations of the bezel to have different rotation amounts, and the electronic device may select bus icons according to a rotation amount of the bezel in a non-sequential order. In the case of a device that does not include a bezel, the area 840 may be utilized as a button and a subsequent bus may be sequentially selected. In the state in which a last bus is selected, when the area 840 is touched, the first bus may be selected.

Figure 21D:
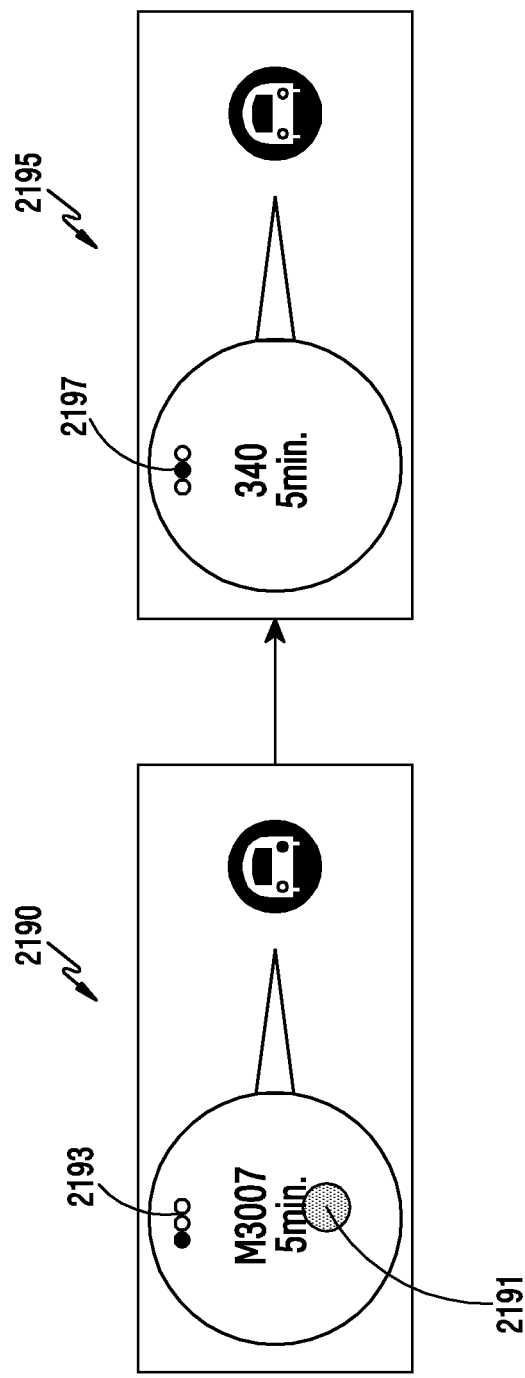

When another bus icon overlaps the location of the selected bus icon, the electronic device displays buses located in the same location in the form of a bus queue as shown in the diagram 2193 and 2197 of FIG. 21D. The bus arrival information received from the server may include an estimated arrival time based on seconds. Therefore, the electronic device may order the bus queue according to the seconds based arrival time information. When there is a case in which a plurality of buses having the same arrival exists, the electronic device may display the bus queue indicators 2193 and 2197 in the top of the screen as shown in the diagrams 2190 and 2195. When a user selects a bus queue indicator, the detailed arrival information of a bus corresponding to the selected bus queue may be displayed as shown in the diagram 2190 or 2195.

Figure 22:
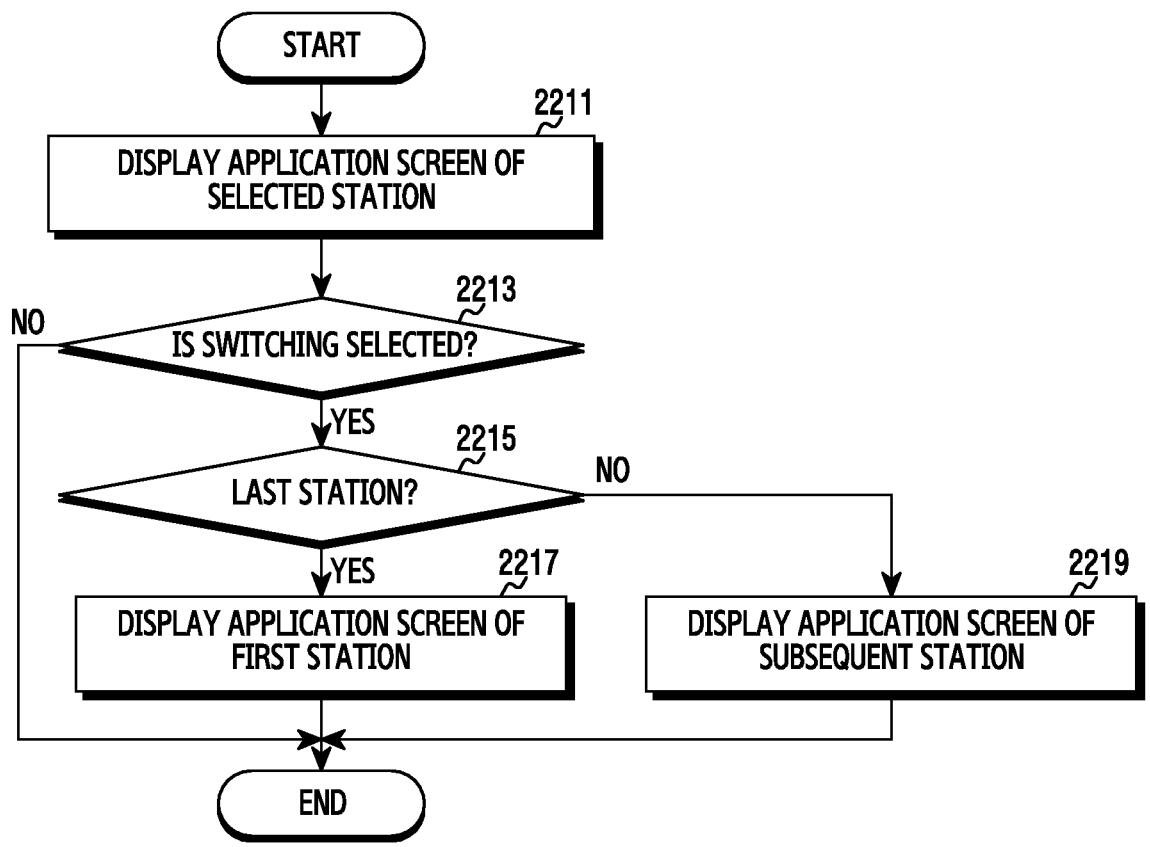
FIG. 22 is a flowchart illustrating a procedure in which an electronic device switches a bus application screen according to an embodiment of the present disclosure.
Figure 23:
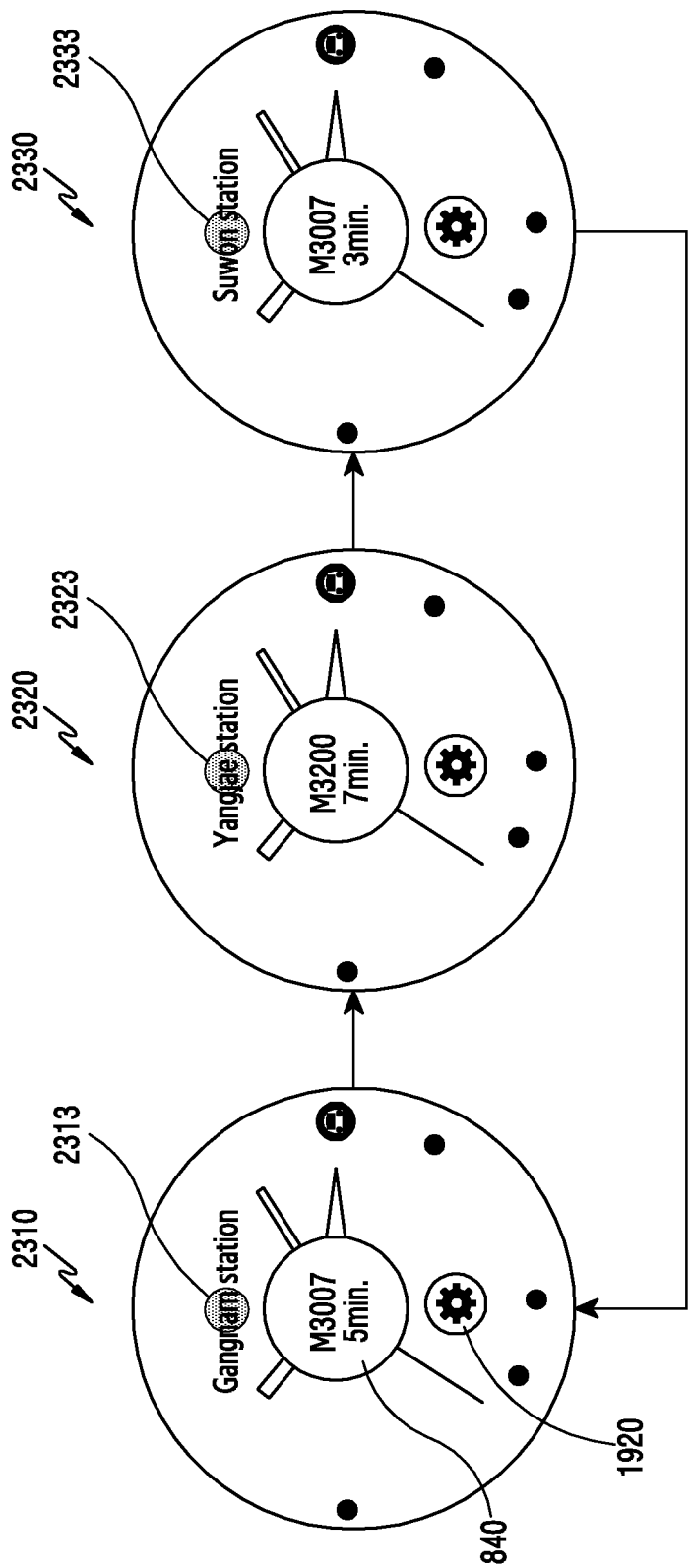
FIG. 23 is a diagram illustrating of displaying a bus application screen after switching according to an embodiment of the present disclosure.

FIG. 22 is a flowchart illustrating a procedure in which an electronic device switches a bus application screen according to an embodiment of the present disclosure. FIG. 23 is a diagram illustrating displaying a bus application screen after switching. FIG. 22 may be an operation procedure of step 1723 of FIG. 17.

Referring to FIG. 22, the electronic device displays a selected bus station screen in step 2211. In the state in which the bus station screen is displayed, when switching of a station is selected, the electronic device recognizes the same in step 2213, and checks whether the currently displayed screen is a bus application screen of a last station in step 2215. In step 2219, the electronic device displays a bus application screen of a subsequent station when the currently displayed screen is not the last station, and displays a bus application screen of a first station when the screen is the last station.

When a plurality of bus application screens are set, a bus application screen may be switched and displayed according to a selection made by a user. FIG. 23 illustrates an example in which three bus stations (Gangnam station, Yangjae station, Suwon station) are set. A number M3007 bus and a number M3200 bus are set as buses that a user frequently takes. A bus application screen displays a bus station name in the area 1910 of the screen, and the indicator 840 displays detailed arrival information of a selected bus. In the state in which a bus application screen is displayed as shown in a screen 2310 of FIG. 23, when the area 1910 is selected (e.g., tapped) as shown in the diagram 2313, the electronic device recognizes the same as a request for switching a bus station in step 2213. The electronic device checks whether a currently displayed bus station is the last set station, and when the station is not the last station, the electronic device displays a bus application screen of the subsequent station (e.g., Yangjae station) as shown in a screen 2320 in step 2219. In the state in which the screen 2320 is displayed, when the area 1910 is selected (e.g., tapped) as shown in the diagram 2323, the electronic device displays a bus application screen of a subsequent station (e.g., Suwon station) as shown in a screen 2330 in step 2219. In the state in which the screen 2330 is displayed, when the area 1910 is selected (e.g., tapped) as shown in the diagram 2333, the electronic device recognizes that the screen 2330 is a bus application screen of the last set station, and displays the bus application screen 2310 of a first set station (e.g., Gangnam station) in step 2217.

As illustrated in FIGS. 22 and 23, when a bus station name is selected, the electronic device may switch into an application screen of a subsequent bus station. The electronic device may display detailed arrival information including a bus number set by a user and an estimated arrival time based on a bus station displayed after switching.

Figure 24:
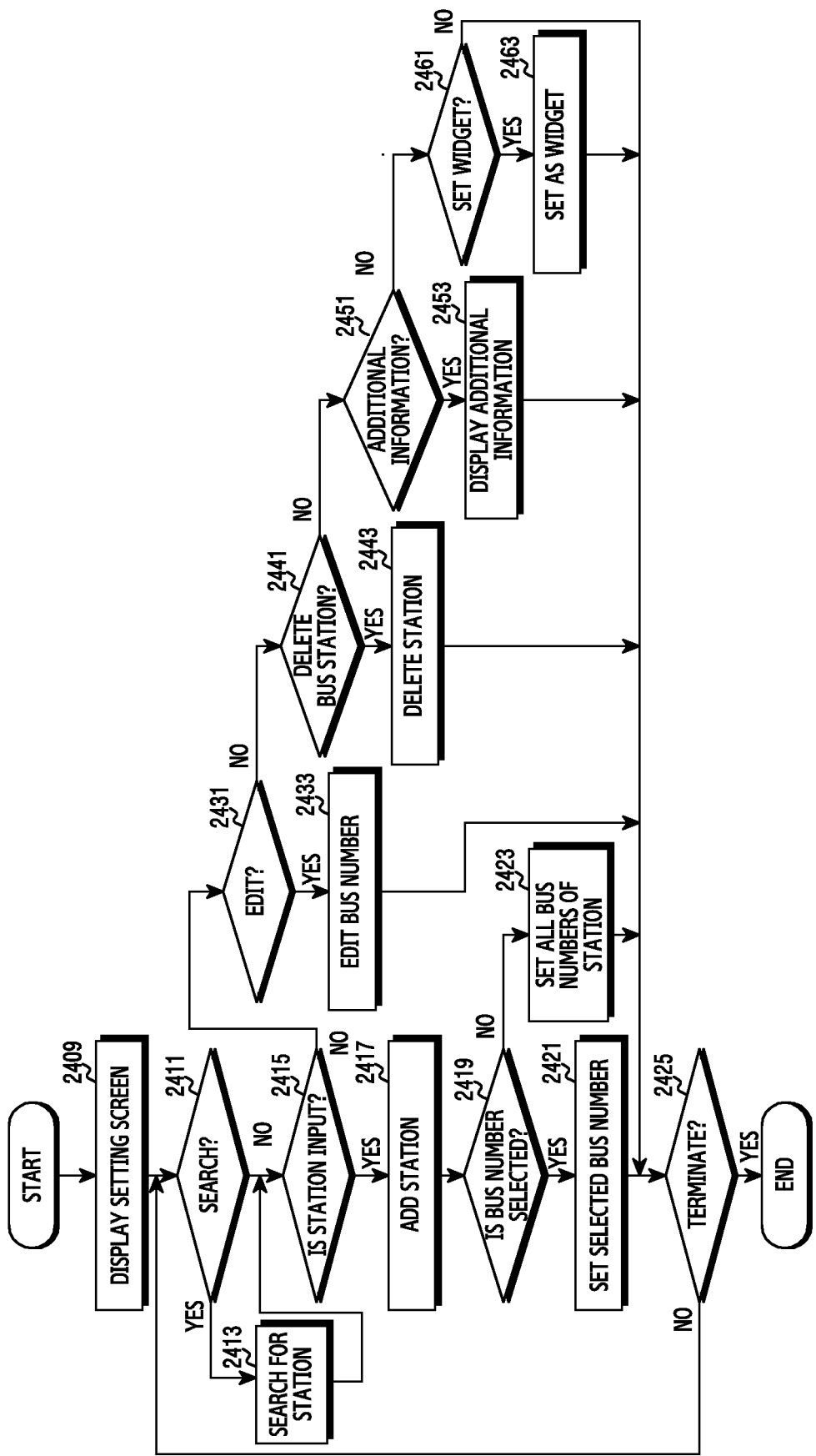
FIG. 24 is a flowchart illustrating a procedure of setting a station and a bus number in a bus application of an electronic device according to an embodiment of the present disclosure.

FIG. 24 is a flowchart illustrating a procedure of setting a station and a bus number in a bus application of an electronic device according to an embodiment of the present disclosure.

Figure 25:
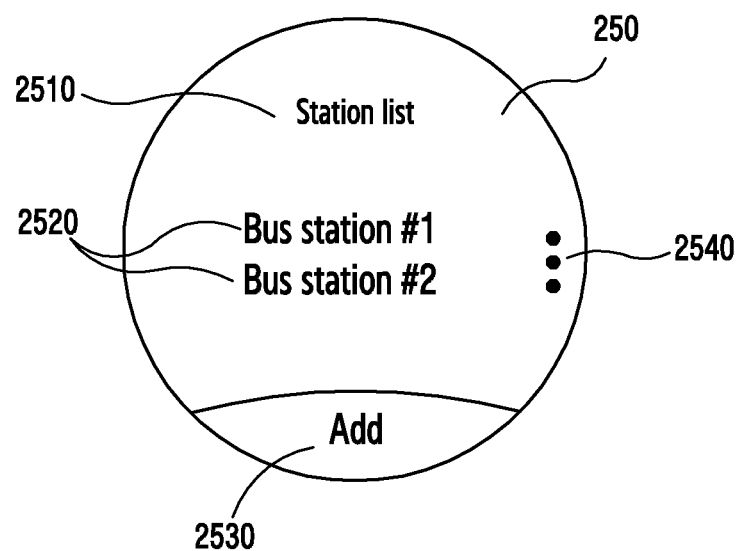
FIG. 25 is a diagram illustrating a screen for setting a station and a bus number, displayed in a bus application according to an embodiment of the present disclosure.

FIG. 25 is a diagram illustrating a screen for setting a station and a bus number, displayed in a bus application according to an embodiment of the present disclosure.

Figure 26:
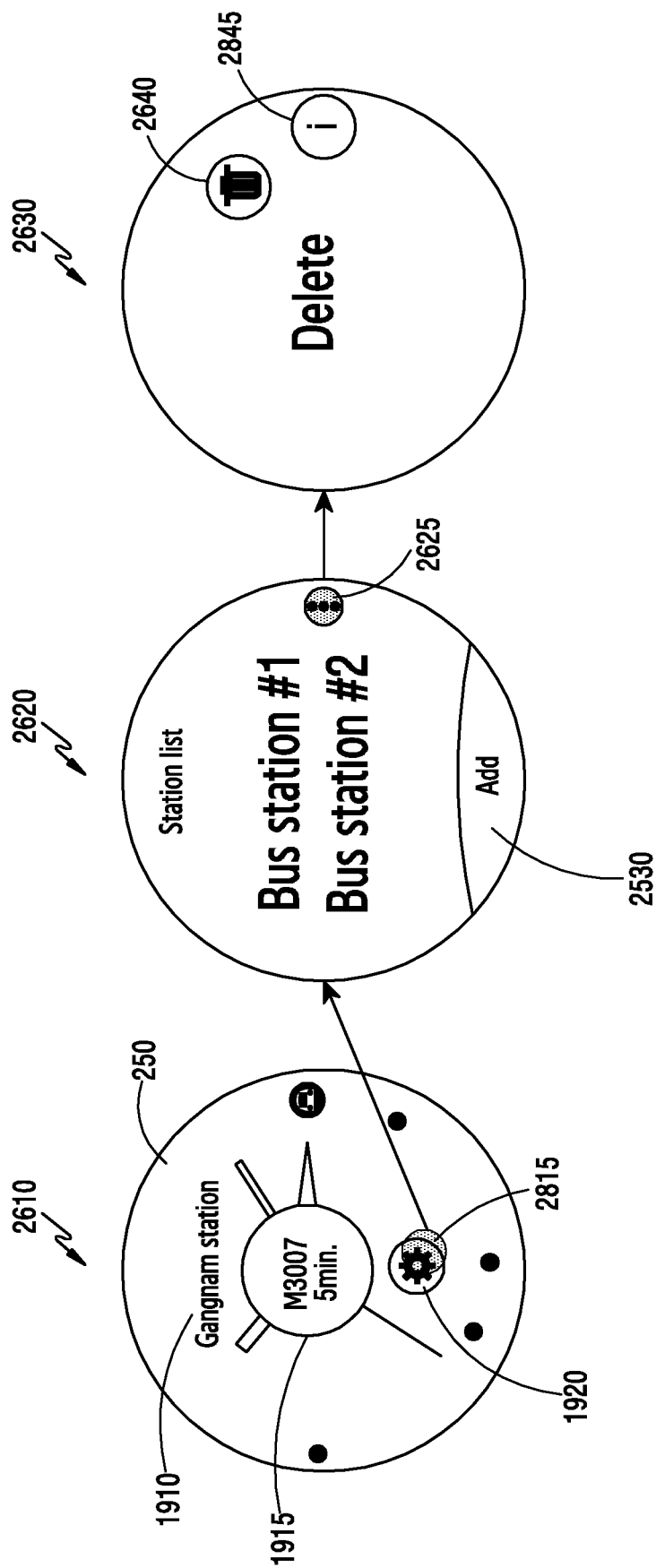
FIG. 26 is a diagram illustrating switching a setting screen and an additional option screen in a bus application according to an embodiment of the present disclosure.

FIG. 26 is a diagram illustrating switching a setting screen and an additional option screen in a bus application according to an embodiment of the present disclosure.

FIGS. 27A to 27D are diagrams illustrating examples of searching for a station identifier in a bus application according to an embodiment of the present disclosure.

Figure 28A:
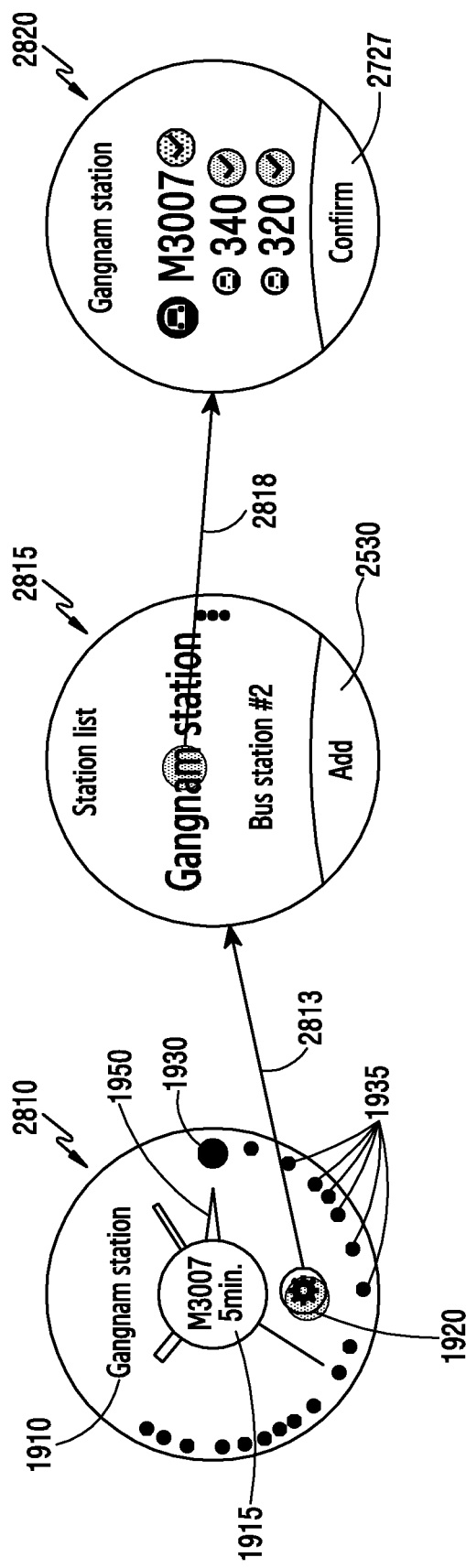
FIGS. 28A to 28C are diagrams illustrating setting a station and/or bus number in a bus application according to an embodiment of the present disclosure.
Figure 28B:
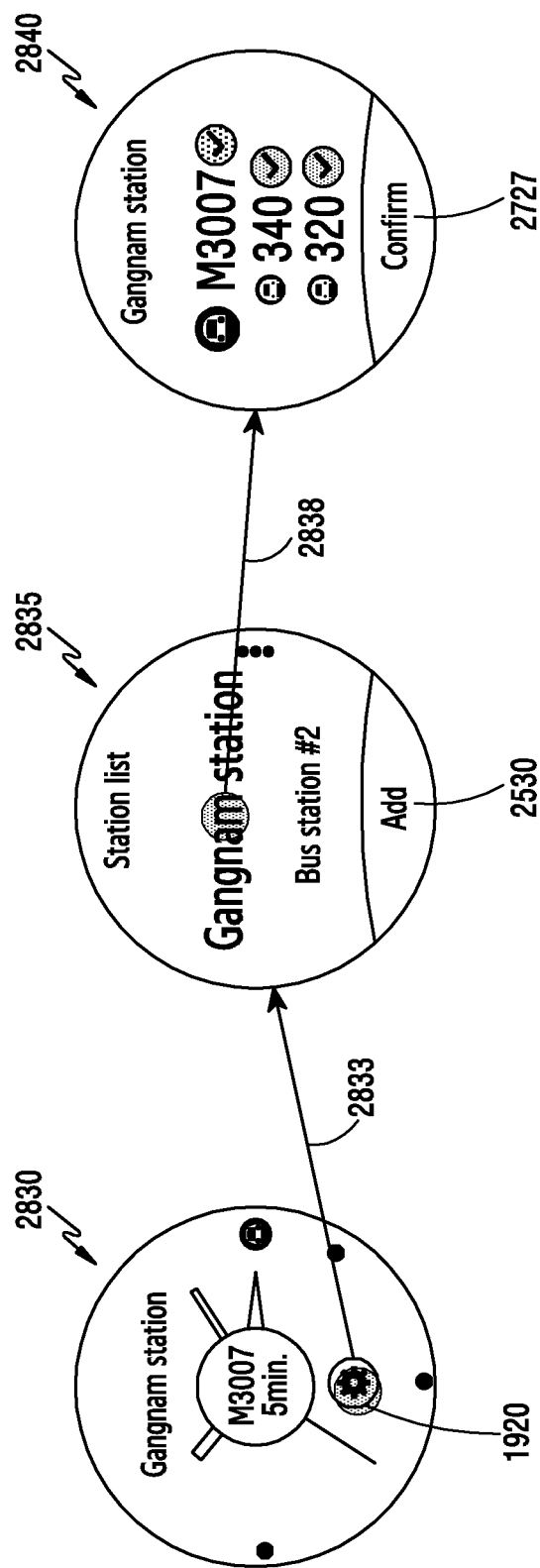
Figure 28C:
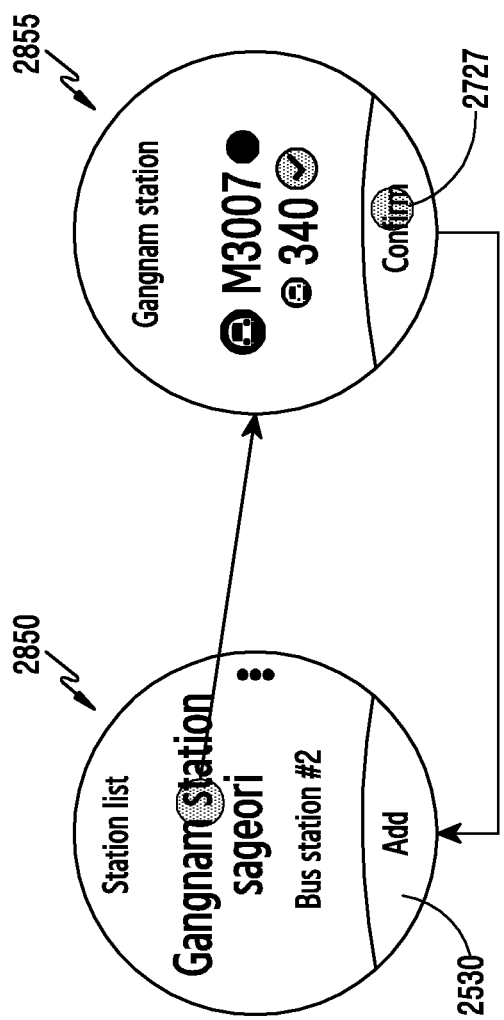

FIGS. 28A to 28C are diagrams illustrating examples of setting a station and/or a bus number in a bus application according to an embodiment of the present disclosure.

Figure 29A:
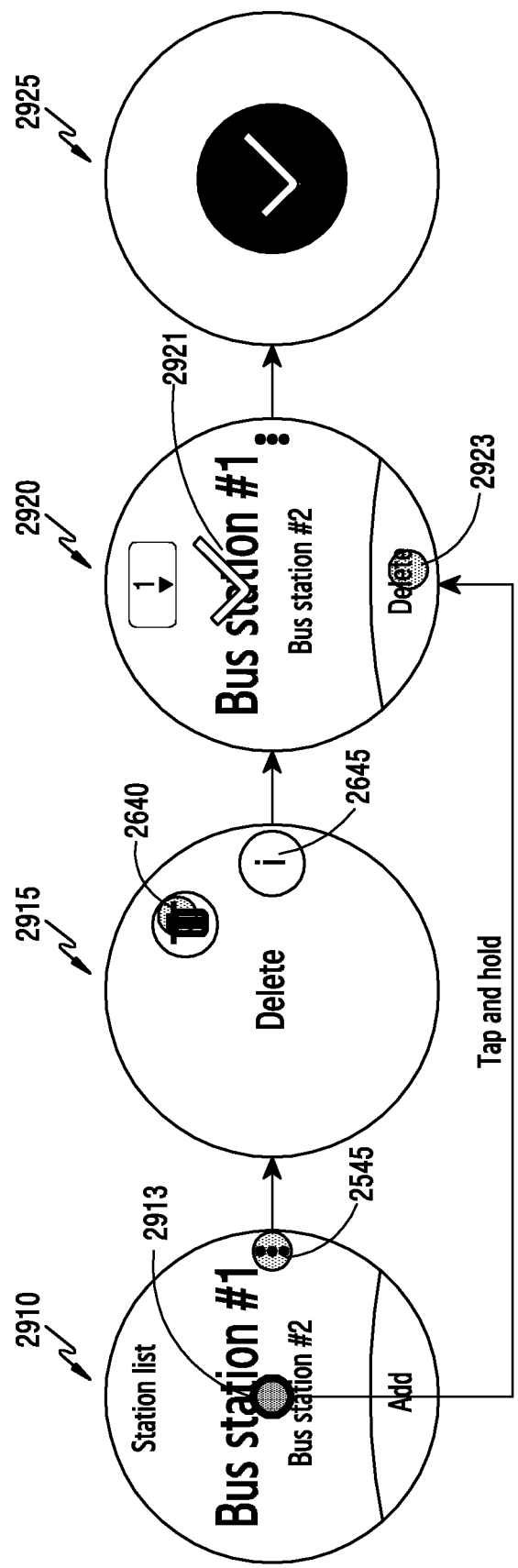
FIGS. 29A and 29B are diagrams illustrating performing an additional option operation in a bus application according to an embodiment of the present disclosure.
Figure 29B:
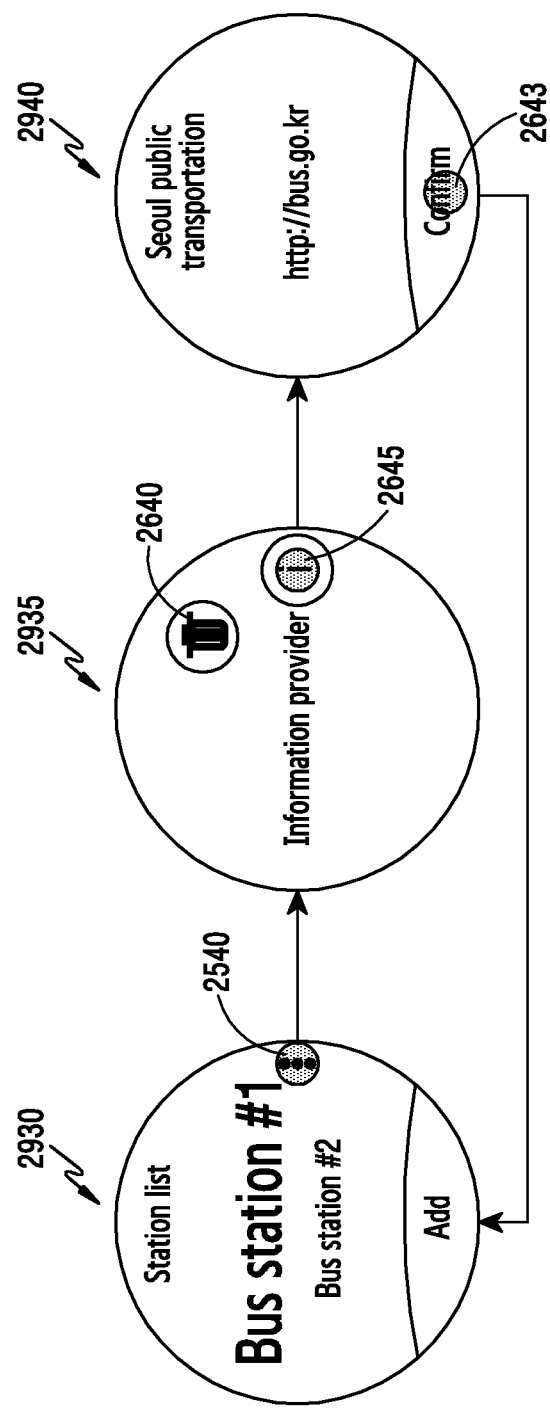

FIGS. 29A and 29B are diagrams illustrating examples of performing an additional option operation in a bus application according to an embodiment of the present disclosure.

Figure 30A:
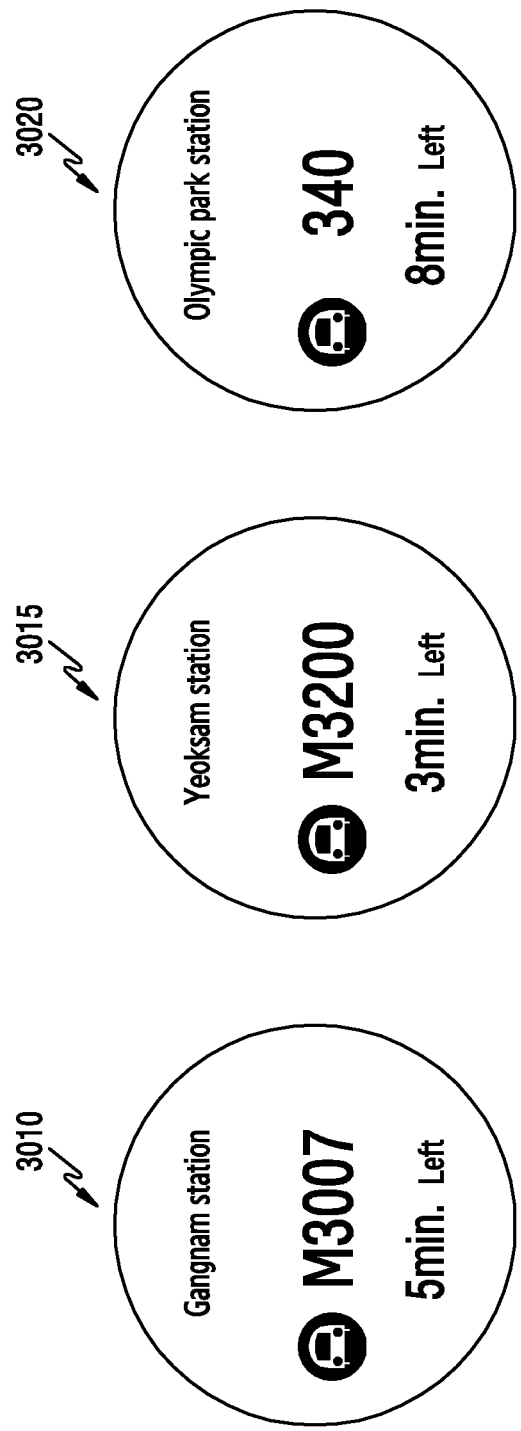
FIGS. 30A and 30B are diagrams illustrating examples of operations of a bus widget in a bus application.
Figure 30B:
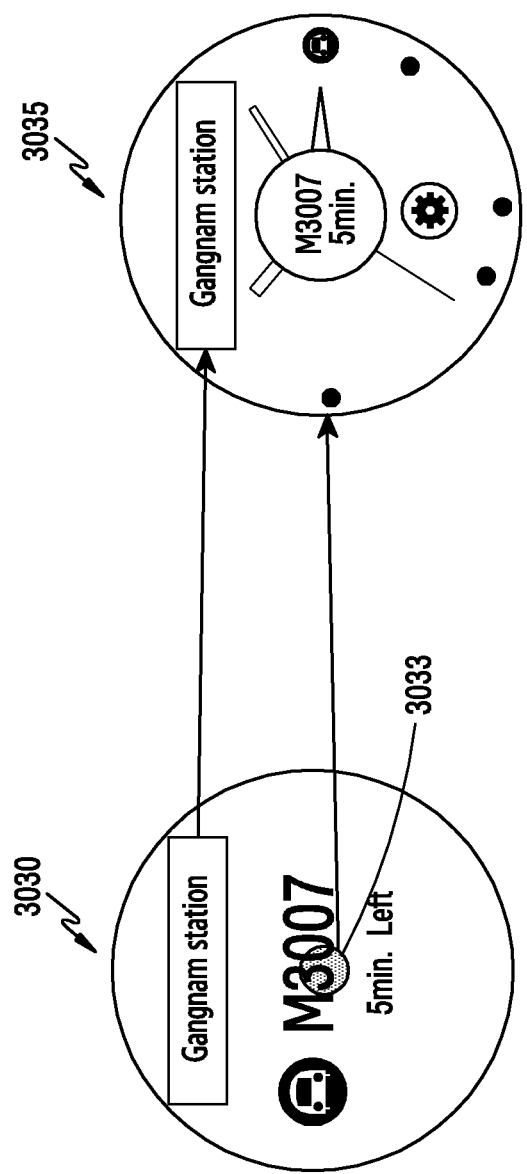

FIGS. 30A and 30B are diagrams illustrating examples of operations of a bus widget in a bus application according to an embodiment of the present disclosure.

Figure 27A:
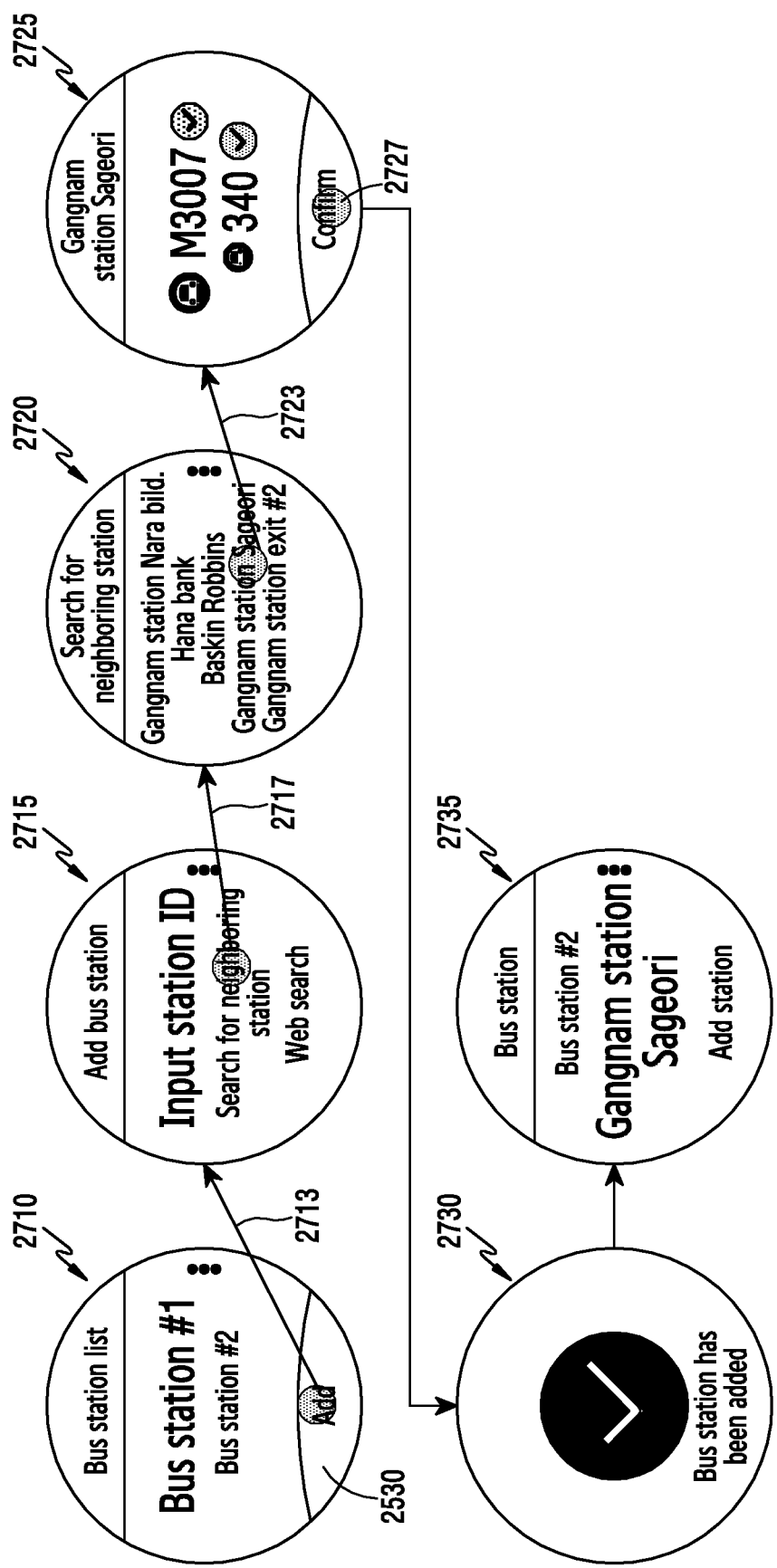
FIGS. 27A to 27D are diagrams illustrating searching for a station identifier in a bus application according to an embodiment of the present disclosure.
Figure 27B:
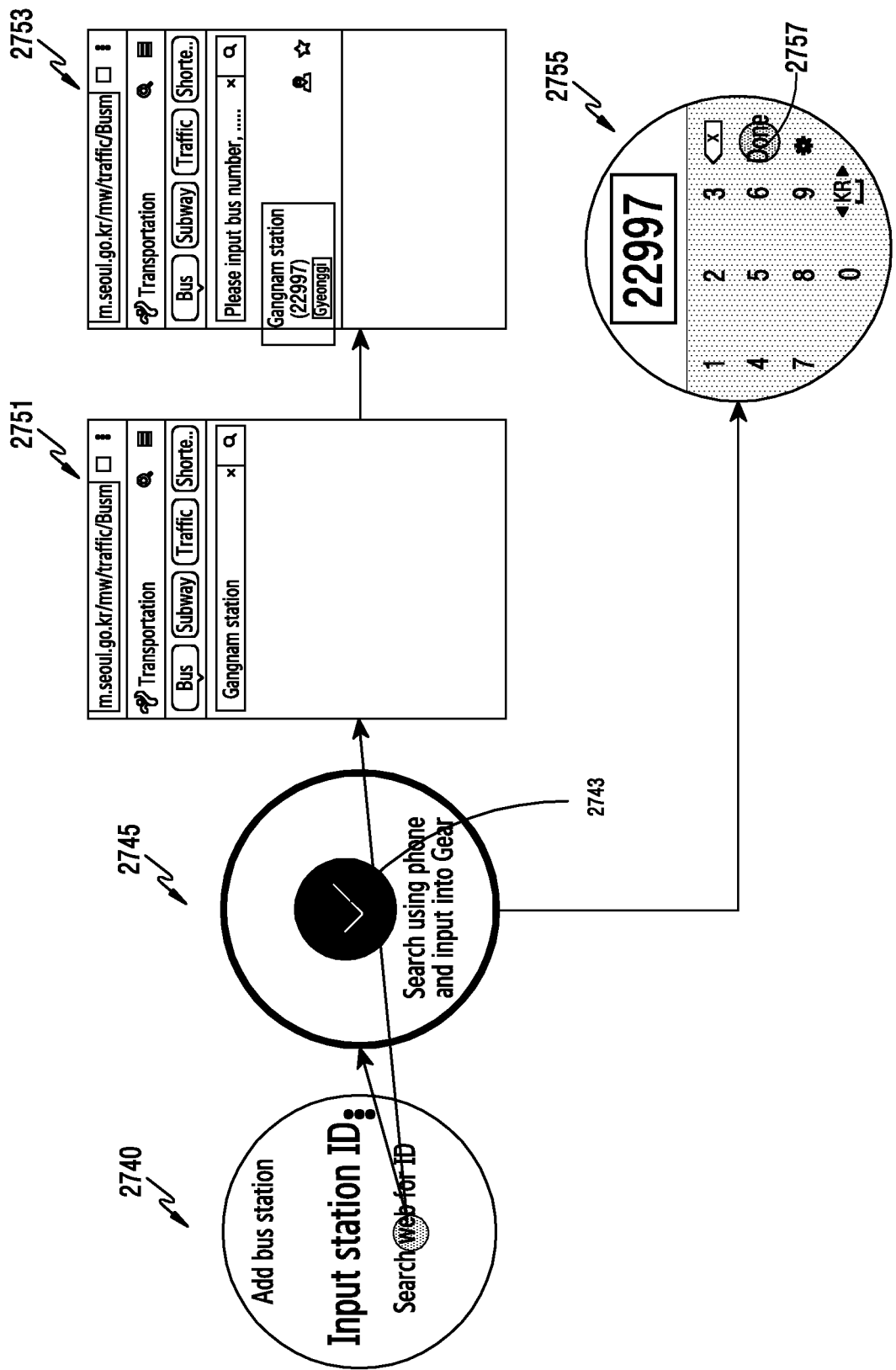

FIG. 24 may be an operation procedure of step 1733 of FIG. 17. Referring to FIG. 24, when an update button 1920 is selected (e.g., tapped) in a bus application screen of FIG. 19, the electronic device displays a setting screen as shown in FIG. 25. The setting screen displayed in the display 250 may display an area 2510 for displaying a list of stations (setting title), an area 2520 for displaying set bus stations, a bus station adding button 2530, and an additional option button 2540. As illustrated in FIG. 26, in the state in which a bus application screen is displayed, when a user selects (e.g., taps) the update button 1920 as shown in the diagram 2610, the electronic device may display a screen 2620 of FIG. 26. When the user selects the additional option button 2540, the electronic device displays screens as shown in FIG. 27A, and performs an operation of searching for and inputting a station ID. When the additional option button 2540 is pressed, the electronic device displays a screen 2630 of FIG. 26, and displays a bus number delete button 2640 and an information provider button 2845.

When the bus station adding button 2530 is selected in the setting screen as displayed in FIG. 25, the electronic device displays a screen for adding a bus station in step 2409. When the user is not aware of a bus station ID, the user may perform a search, and searches for a bus station ID. Therefore, when a station search is selected in the setting screen, the electronic device searches for a station ID in step 2411. When the station ID is input in the setting screen, the electronic device recognizes the same in step 2415, adds the input station ID in step 2417, and displays bus numbers corresponding to the added station ID. When the station ID is added, the electronic device registers the added station ID, and displays a list of bus numbers of which arrival information may be displayed in association with the corresponding station ID. When the user selects a bus number from the displayed list, the electronic device recognizes the same in step 2419, and links selected bus numbers to the registered bus station ID and stores the same in step 2421. However, when the user does not select a bus number from the displayed bus number list, the electronic device recognizes the same in step 2419, and links the displayed bus numbers to the registered bus station ID and stores the same in step 2423.

The electronic device may edit the bus numbers linked to the bus station in the setting screen. The editing of the bus numbers may be adding or deleting the bus numbers. When a request for editing a bus number is generated, the electronic device recognizes the same in step 2431, and edits a selected bus number in step 2433. The electronic device may delete a registered bus station. A bus station may be deleted by selecting a delete button in an additional option screen. When deleting a bus station is requested, the electronic device recognizes the same in step 2441, and displays a list of registered bus stations and deletes a bus station selected by the user in step 2443. When the information provider button 2645 is selected in the additional option screen, the electronic device recognizes that additional information is selected in step 2451, and displays the additional information in step 2453. Here, the additional information may be URL information of an information provider. Also, a widget function may be set in the setting screen. When the widget function is selected, the electronic device recognizes the same in step 2461, and sets the set bus station and bus numbers as information associated with the bus widget in step 2463.

When the user requests the termination of the operations of the bus application while a setting operation of the bus application is executed, the electronic device recognizes the same, and terminates the setting operation of the bus application in step 2425.

Step 2413 which searches for a bus station will be described in detail with reference to FIG. 24. Referring to FIG. 27A, when the setting button 1920 is selected, the electronic device may display a screen 2710 that displays a list of set stations. When the bus station adding button 2530 is selected as shown in the diagram 2713, the electronic device may display a screen 2715 for searching for a bus station. When a user is not aware of a station ID, the user may select a neighboring station search item or a web search item. When a search item is selected, the electronic device recognizes the same in step 2411, and searches for a station in step 2413. When the neighboring station search mode is selected (e.g., tapped), the electronic device searches for the current location of the electronic device (e.g., through GPS), and displays a list of neighboring stations as shown in a screen 2720. When a station is selected as shown in the diagram 2723, from the list of neighboring stations displayed as shown in the screen 2720, the electronic devices senses an inputted station in step 2415, and displays a list of buses that stop at the selected station as shown in a screen 2725. When the user selects a bus number and selects a confirm button 2727, the electronic device recognizes the same in step 2419, and registers the selected bus station and selected bus numbers in step 2421. However, when the user selects the confirm button 2727 without selecting a bus number, the electronic device recognizes the same in step 2419, and registers all bus numbers that stop at the corresponding bus station in step 2423. Subsequently, the electronic device displays that a bus station has been added, in the display 250, as shown in a screen 2730, and displays a list of bus stations as shown in a screen 2735.

The bus station ID may also be obtained through web search. The web search may be performed by the electronic device, or may be performed by another electronic device (the second electronic device 120 of FIG. 1). The other electronic device may be an electronic device having a relatively large display (e.g., a smart phone, a tablet, and the like). The other electronic device may be a portable terminal device, and it is assumed that the portable terminal device is a device capable of accessing an electronic device (e.g., the wearable electronic device 110 of FIG. 1) through short-range wireless communication. When a web search item is selected, the electronic device may display, in the display 250, a message indicating that a station ID needs to be input into the electronic device after a web search using a portable terminal device, as shown in a screen 2745. A station ID may be retrieved through the web search using the portable terminal device, as shown in the diagrams 2751 and 2753. When the name of a bus station (e.g., Gangnam station) is input through the portable terminal device, a Gangnam station ID (22997 in the screen 2753) may be downloaded from the web site. When a user selects a screen 2745 as shown in the diagram 2743 after web searching, the electronic device may display a keypad for inputting a station ID, as shown in a screen 2755. When the user inputs the bus station ID retrieved through web search, using the keypad, and selects a done button as shown in the diagram 2757, the electronic device recognizes the input station ID in step 2415. Subsequently, the electronic device may display a list of bus numbers that stop at the input bus station, as illustrated in a screen 2725 of FIG. 27A, and may link bus numbers to the bus station list according to a selection made by the user.

Figure 27C:
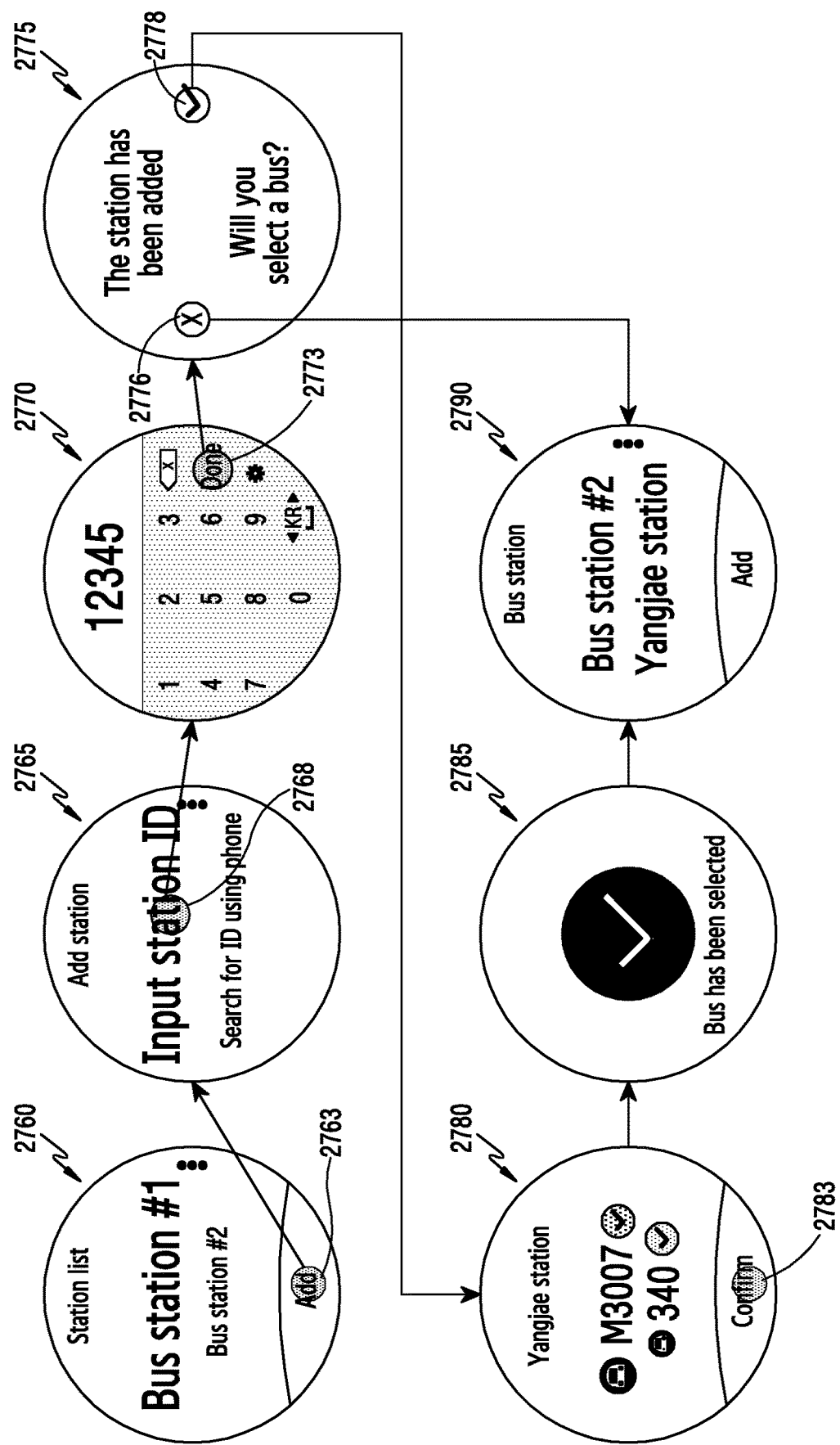

As described above, the electronic device may display a setting screen as shown in the diagram 2760 of FIG. 27C, and when the user selects the bus station adding button 2530 as shown in the diagram 2763, the electronic device may display a screen for inputting a station ID as shown in a screen 2765. When a user is not aware of a station ID, the user may search for a bus station ID by selecting a neighboring station search or a web search. When inputting of a station ID is selected, the electronic device may display a keypad for inputting a bus station ID as shown in a screen 2770. When a done button is selected as shown in the diagram 2773 after the bus station ID is input, the electronic device may display a screen, as shown in a screen 2775. The screen 2775 may be a screen that displays a message for inquiring whether to select a bus number for an added bus station, after adding the bus station. When a user selects a button for not selecting a bus number as shown in the diagram 2776, the electronic device may display a screen that registers the added station as shown in the diagram 2790. Bus numbers registered in the added station may be all of the buses that stop at the corresponding station. When a button for selecting a bus number is selected as shown in the diagram 2778, in the screen 2775, the electronic device displays a list of buses that stop at the corresponding station as shown in a screen 2780, and selects bus numbers selected by the user. Subsequently, when the user selects a confirm button as shown in the diagram 2783 in the screen 2780, the electronic device recognizes the same, and displays a message indicating that setting of a bus has been confirmed as shown in a screen 2785, and registers the station added to the bus station list and selected bus numbers as shown in a screen 2790.

Figure 27D:
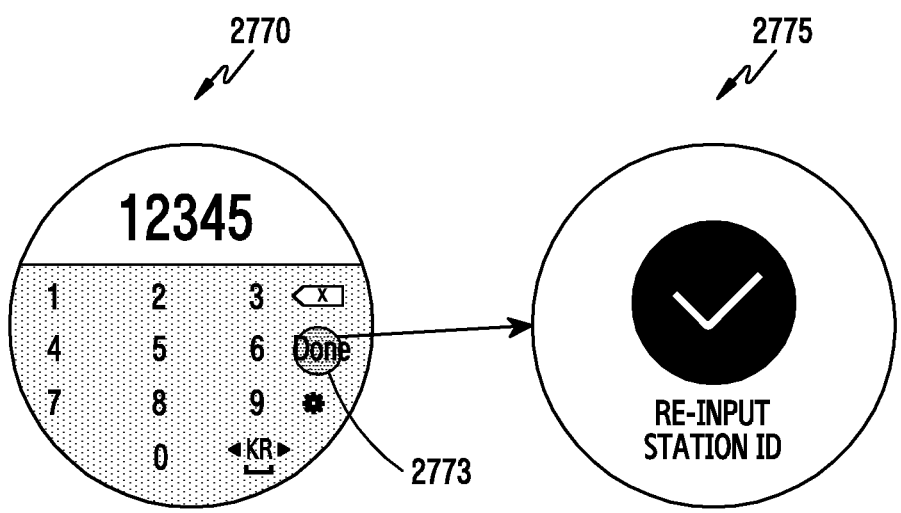

As illustrated in FIG. 27D, when an error occurs in the input bus station ID in the screen 2770 (e.g., when a bus station ID that is identical to the input bus station ID does not exist), the electronic device may display an error state of the bus station ID as a message, as shown in a screen 2795.

FIGS. 28A and 28B are diagrams illustrating steps 2419 to 2423 of FIG. 24. The electronic device may display all of the buses that stop at a corresponding bus station in the form of a bus queue in order of estimated arrival times through a bus application screen as shown in screen 2810 of FIG. 28A. The screen 2810 may be an example that displays a bus station name in the bus station area 1910, displays detailed arrival information 1915 of the selected bus 1930, and displays buses 1935 that are not selected in the form of a bus queue. When the setting button 1920 is selected in the screen 2810, the electronic device may set a bus station list as shown in a screen 2815, and may add a new bus station by selecting the bus station adding button 2530. Also, when a bus station name is selected as shown in the diagram 2818 from the station list displayed in the screen 2815, the electronic device may display a bus list of the selected bus station as shown in a screen 2820. When the user selects a confirm button 2727 without selecting a bus from the bus list, the electronic device may select all of the buses that stop at the corresponding bus station. As described above, when the electronic device sets a bus station, and selects the confirm button 2727 without selecting a bus number, the electronic device may register all of the buses that stop at the corresponding bus station.

As shown in a screen 2830 of FIG. 28B, a bus application screen may display only selected buses out of the buses that stop at the corresponding bus station. When the setting button 1920 is selected in the screen 2830, the electronic device may set a bus station list as shown in the screen 2815, and may add a new bus station by selecting the bus station adding button 2530. When a bus station name is selected as shown in the diagram 2838 from the station list displayed in a screen 2835, the electronic device may display a bus list of the selected bus station as shown in a screen 2840. When the user selects a bus from the bus list and selects the confirm button 2727, the electronic device may register, in the corresponding bus station, only the buses selected by the user out of the buses that stop at the corresponding bus station. As described above, when the electronic device sets a bus station, and selects a bus number and selects the confirm button 2727, the electronic device may register the selected bus numbers for the corresponding bus station.

FIG. 28C is a diagram illustrating steps 2431 and 2433 of FIG. 24. The electronic device may edit bus numbers after registering bus numbers as shown in FIG. 28A or 28B. In a screen that displays a station list as shown in a screen 2850, when a user selects a station name for editing a bus number, the electronic device may display bus numbers registered in the corresponding bus station as shown in a screen 2855. When the user selects desired bus numbers from the displayed bus list (e.g., an operation of editing a bus number) and the user selects a bus number that has already been registered, the electronic device performs toggling and cancels the registration of the corresponding bus number. When the user selects a bus number that has not been selected, the electronic device performs toggling and selects the corresponding bus number. Subsequently, when the user selects the confirm button 2727, the electronic device registers the bus numbers selected out of the bus number list in the corresponding bus station.

FIG. 29A is a diagram illustrating steps 2441 and 2443 of FIG. 24. The electronic device may display a bus station setting screen as shown in a screen 2910. When the additional option button 2540 is selected in the bus station setting screen, the delete button 2640 and the information provider button 2645 may be displayed as shown in a screen 2915. When a user selects the delete button 2640, the electronic device may display a bus station list as shown in a screen 2920. When the user selects a bus station for deleting the bus station as shown in the diagram 2921, and selects a delete button 2923, the electronic device recognizes the same in step 2441, deletes the corresponding bus station in step 2443, displays a screen 2925, and displays the deletion of the corresponding bus station.

When a long touch (tap and hold) is given on a bus station name that a user desires to delete as shown in the diagram 2913, in the screen 2910, the electronic device recognizes the same as a request for deleting a bus station, and displays the screen 2920. When the user selects a bus station for deleting the bus station as shown in the diagram 2921, and selects the delete button 2923, the electronic device recognizes the same in step 2441, deletes the corresponding bus station in step 2443, displays the screen 2925, and displays the deletion of the corresponding bus station.

FIG. 29B is a diagram illustrating steps 2451 and 2453 of FIG. 24. The electronic device displays a bus station setting screen as shown in a screen 2930. When the additional option button 2540 is selected in the bus station setting screen, the delete button 2640 and the information provider button 2645 may be displayed as shown in a screen 2935. When a user selects the information provider button 2645, the electronic device may display information associated with a provider that provides information associated with a bus application, as shown in a screen 2940. The information associated with the information provider may be displayed as URL information. In the state in which the information provider is displayed as shown in a screen 2940, when the user selects a confirm button 2643, the electronic device may return to a screen that displays a bus station list.

FIG. 30A is a diagram illustrating steps 2461 and 2463 of FIG. 24. When bus stations are set as described above, the electronic device may set the same as stations of a bus widget. When the setting of a bus widget is requested, the electronic device may set a bus widget for each bus station in a bus widget area. When the bus widget is set, the electronic device sets bus widget screens as shown in a screen 3010, a screen 3015, and a screen 3020, in order of bus stations set in the bus widget screen. Also, in the state in which a bus widget screen is displayed such as a screen 3030 of FIG. 30B, when a user touches a widget screen as shown in the diagram 3033, the electronic device switches into a bus application screen of a corresponding bus station as shown in a screen 3035.

Figure 31:
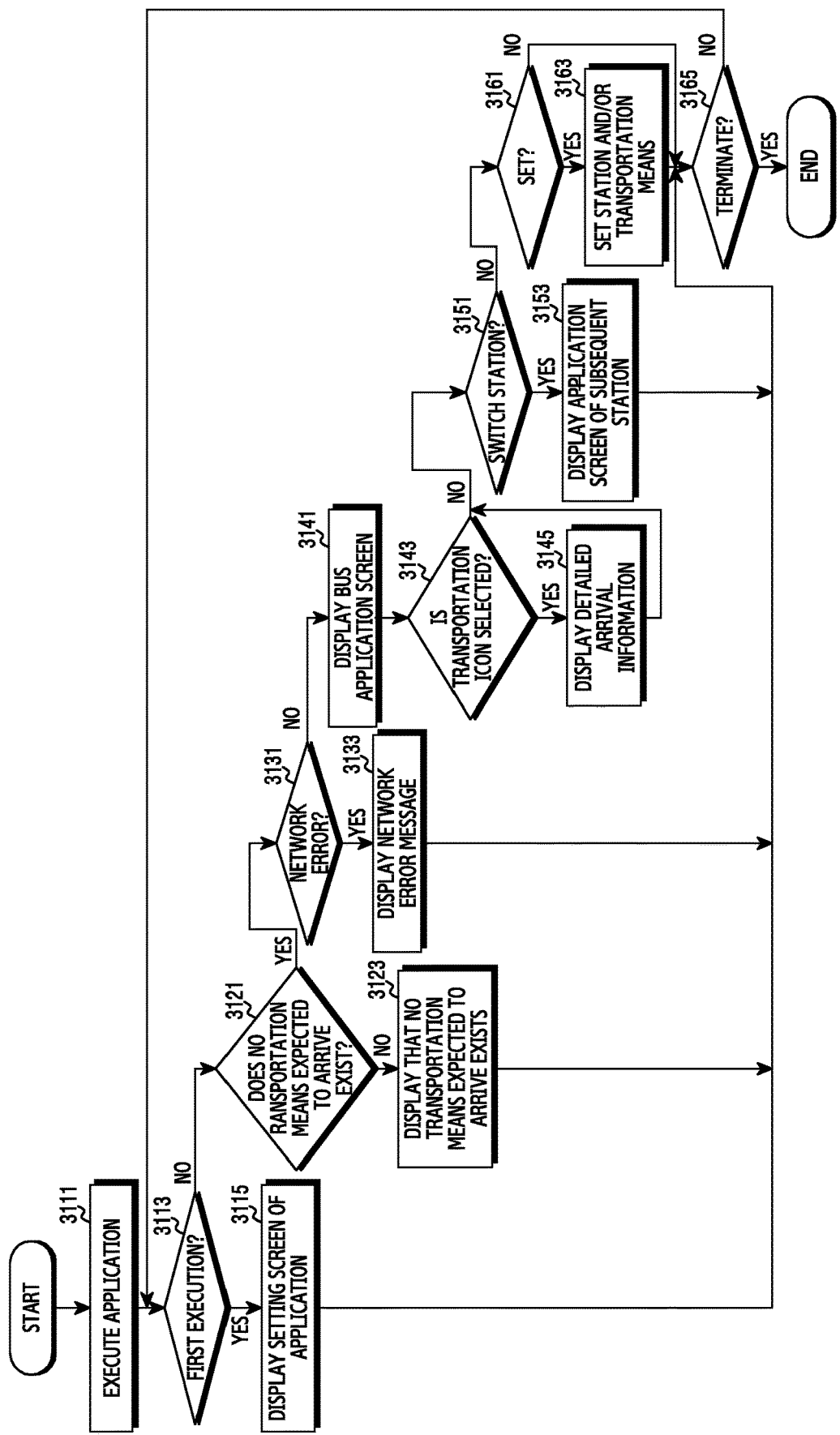
FIG. 31 is a flowchart illustrating a bus application executing operation of an electronic device according to an embodiment of the present disclosure.

FIG. 31 is a flowchart illustrating a bus application executing operation of an electronic device according to an embodiment of the present disclosure.

Figure 32A:
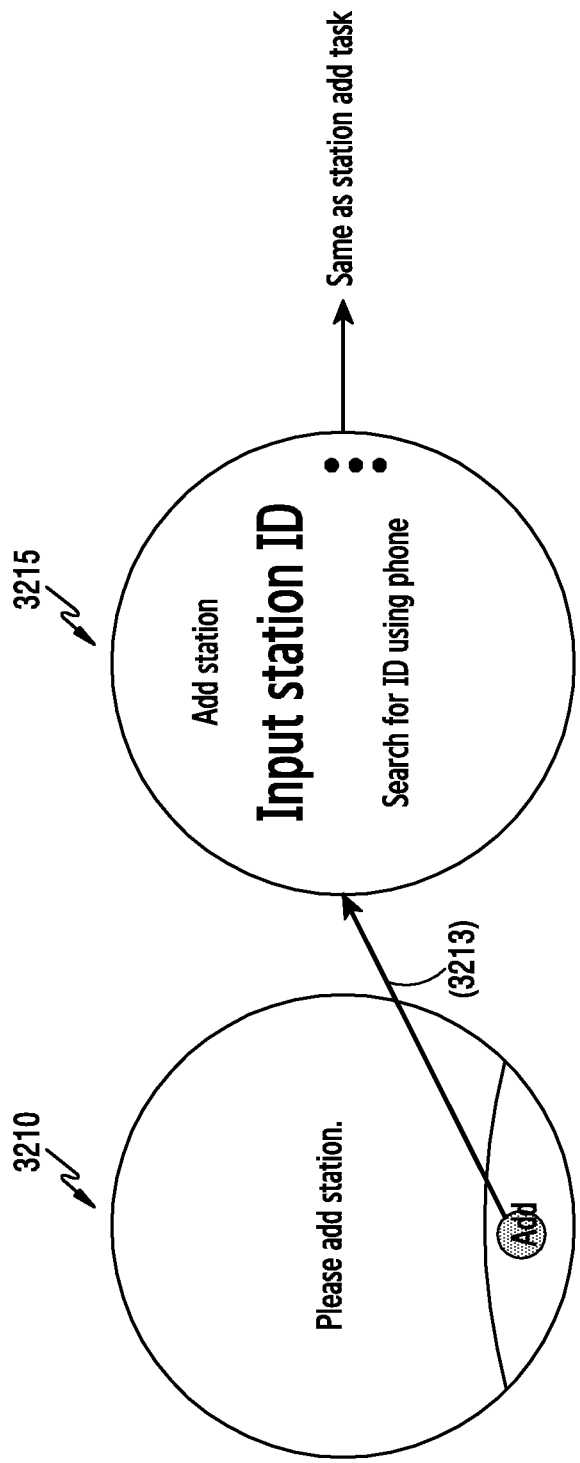
FIGS. 32A to 32C are diagrams illustrating displaying a message in the state in which a bus application is executed according to an embodiment of the present disclosure.
Figure 32B:
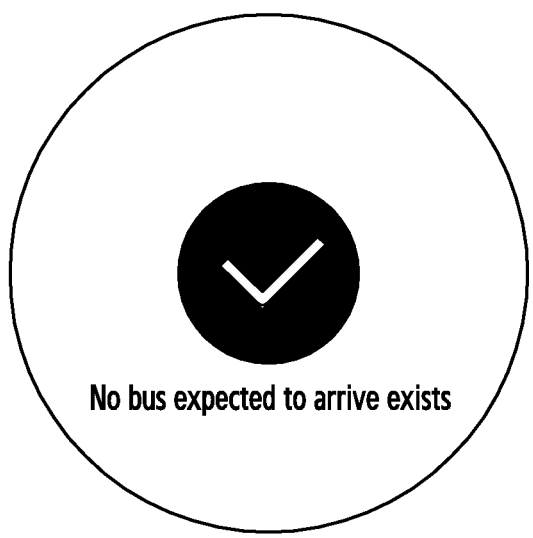
Figure 32C:
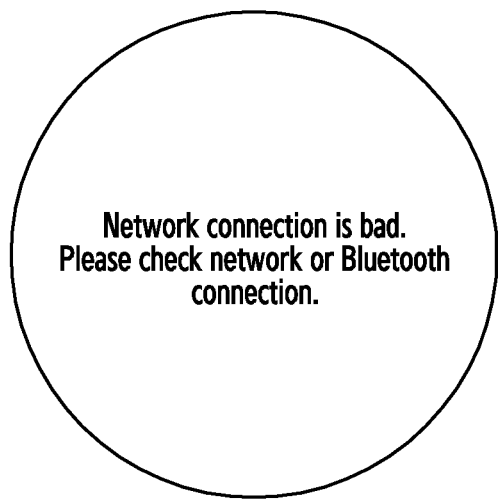

FIGS. 32A to 32C are diagrams illustrating displaying a message in the state in which a bus application is executed according to an embodiment of the present disclosure.

FIGS. 33A to 33D are diagrams illustrating displaying bus arrival information in an execution screen of a bus application according to an embodiment of the present disclosure.

FIGS. 34A to 34D are diagrams illustrating setting a bus station and bus numbers in a bus application screen according to an embodiment of the present disclosure.

Referring to FIG. 31, when a user requests the execution of a bus application, the electronic device executes the bus application in step 3111. When the bus application is executed for the first time, the bus application may be in the state in which a bus station is not set. Therefore, when the bus application is executed for the first time, the electronic device recognizes the same in step 3113. In step 3115, the electronic device displays a message indicating that it is executed for the first time in the display 250, and switches into a setting operation of the bus application when the user selects adding of a bus station. Referring to FIG. 32A, when the bus application is executed for the first time, the bus application may be in the state in which a bus station is not set. In the case in which the bus station is not set, the electronic device may display a message indicating that adding a station is needed, as shown in a screen 3210 of FIG. 32A. When the user selects an add button as shown in the diagram 3213, the electronic device may display a bus station setting screen as shown in a screen 3215 in the display 250. After displaying the bus station adding screen, the electronic device may switch to an operation of setting a bus station and a bus number.

In the state in which the execution of the bus application is requested, when a bus that is estimated to arrive at a corresponding station does not exist, the electronic device recognizes the same in step 3121, and displays that the bus that is estimated to arrive at the corresponding station does not exist in step 3123. For example, when the execution of the bus application is requested, the electronic device requests, from a server, bus arrival information of a currently set bus station, and receives the bus arrival information from the server. When a bus that is estimated to arrive at the corresponding station does not exist (e.g., a bus estimated to arrive does not exist or a bus estimated to arrive within 1 hour does not exist), the electronic device may display a message of FIG. 32B in the display 250.

In the state in which the bus application is executed, the electronic device may periodically perform an operation that accesses the server, transmits a bus station and selected bus number, and receives an estimated arrival time of the selected bus from the server. When a network error is recognized, the electronic device recognizes the same in step 3131, and displays a network error state in the display 250 in step 3133. When the network error state is detected, the electronic device may display a screen of FIG. 32C that displays a network error message in the display 250.

In the case of executing the bus application, when a bus station and a bus number are set, a bus estimated to arrive exists, and a network state is normal, the electronic device displays a bus application screen in the display 250 in step 3141. The bus application screen may display bus icons of the set bus station, in the form of a bus queue in order of arrival time, in a clock screen that indicates the current time using an hour hand and a minute hand. In the state in which the bus application screen is displayed, when a user selects a bus icon, the electronic device recognizes the same in step 3143, and displays detailed arrival information of the selected bus in the bus application screen in step 3145.

Figure 33A:
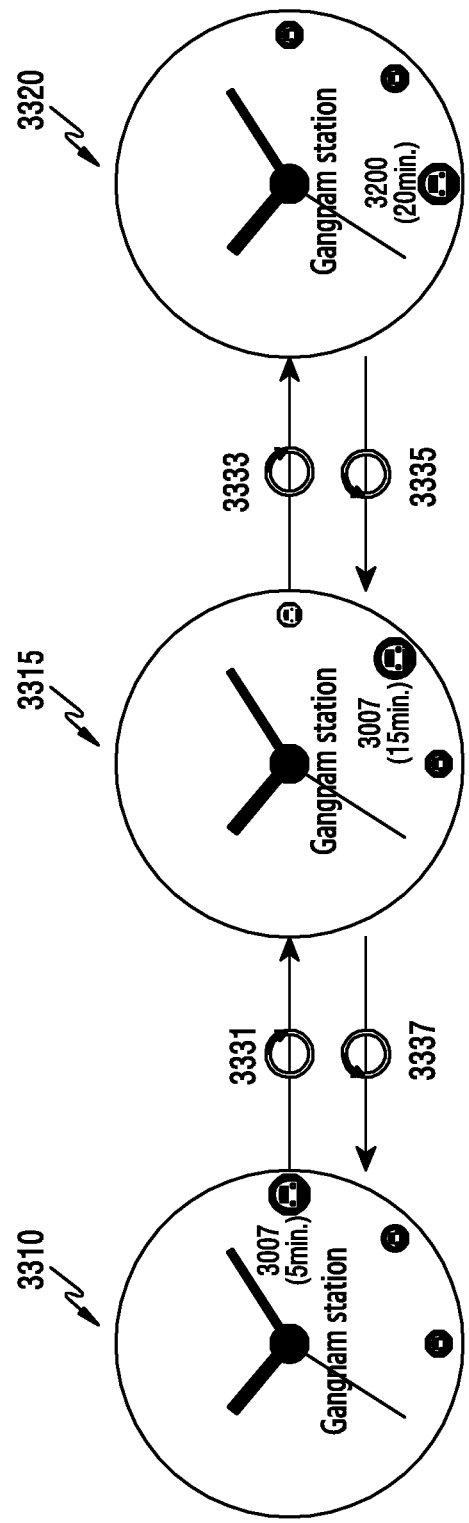
FIGS. 33A to 33D are diagrams illustrating displaying bus arrival information in an execution screen of a bus application according to an embodiment of the present disclosure.
Figure 33B:
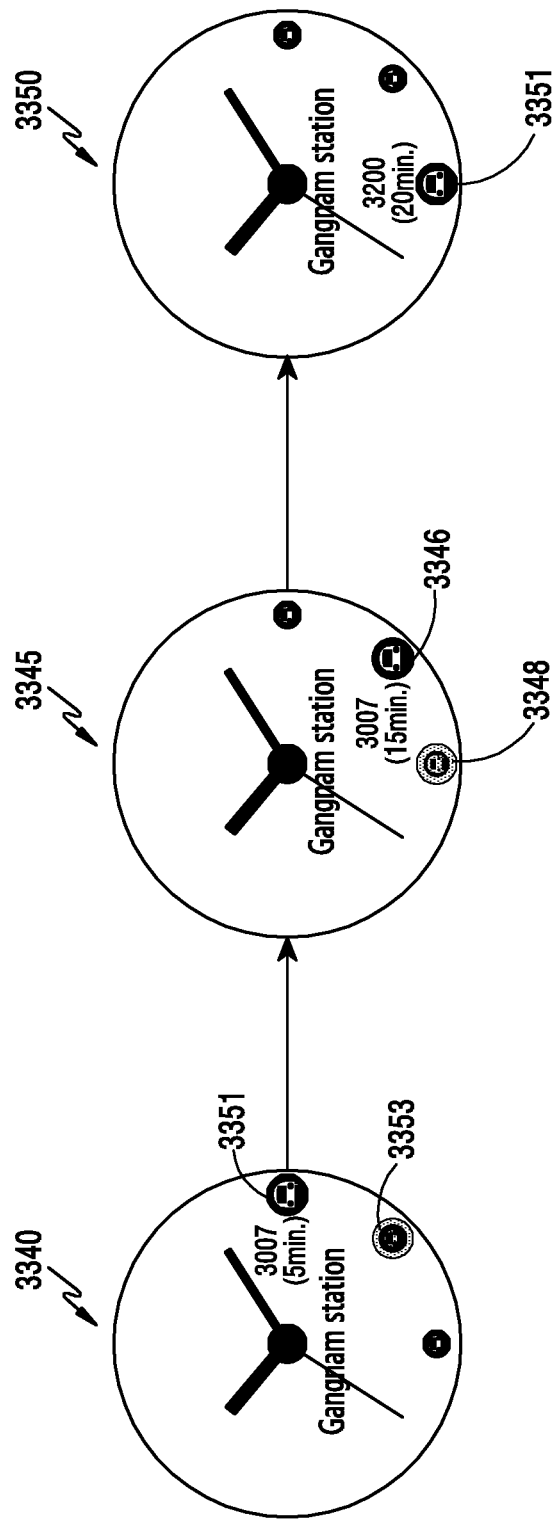
Figure 33C:
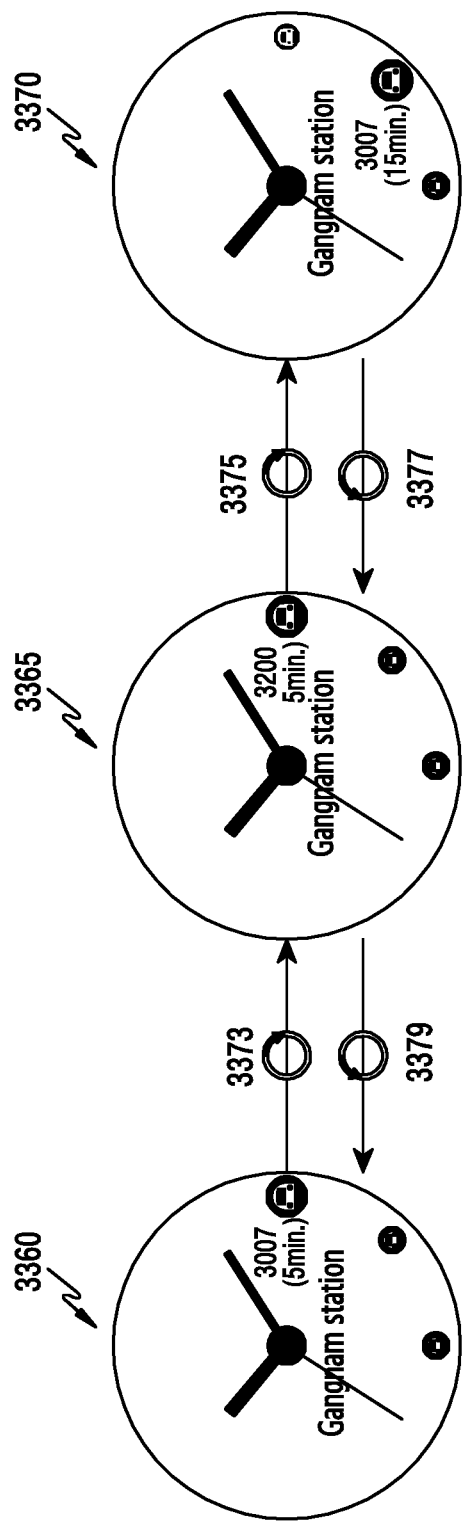
Figure 33D:
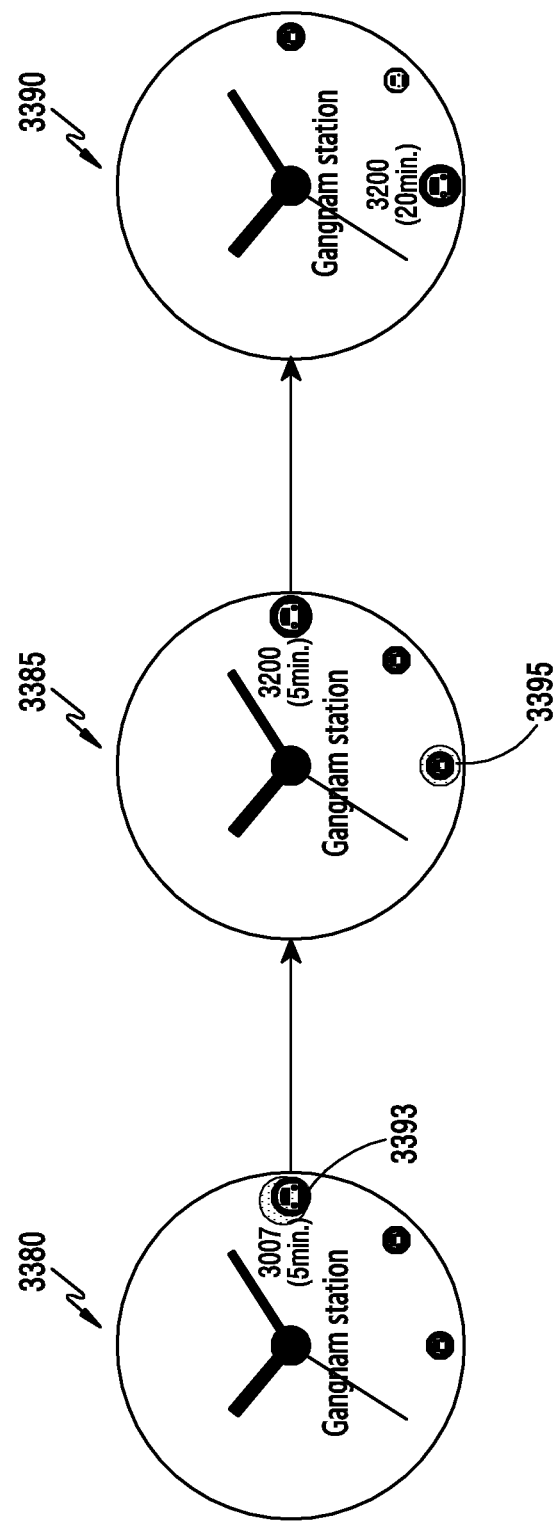

FIGS. 33A to 33D are diagrams illustrating examples of displaying a bus application screen that displays detailed arrival time. FIGS. 33A and 33B may be examples in which buses that arrive in the same time zone do not overlap each other. FIGS. 33C and 33D may be examples in which buses that arrive in the same time zone overlap each other.

Referring to FIG. 33A, a user may select a bus displayed in an application by rotating a bezel. A screen 3310 may be selecting a bus estimated to arrive first (e.g., a number 3007 bus estimated to arrive 5 minutes after the current time) using the bezel in a bus application screen. Subsequently, a user may select a second bus in the bus application screen by rotating the bezel as shown in the diagram 3331, and when the electronic device recognizes that the bus estimated to arrive second is selected, the electronic device displays detailed arrival information (e.g., a number 3007 bus estimated to 15 minutes after the current time) of the second bus as shown in a screen 3315. When the user rotates the bezel as shown in the diagram 3333, the electronic device recognizes that a third bus is selected, and displays detailed arrival information (e.g., a number 3200 bus estimated to arrive 20 minutes after the current time) of the bus estimated to arrive third as shown in a screen 3320. In the state in which the screen 3320 is displayed, when the bezel is rotated in the reverse direction as shown in the diagrams 3335 and 3337, the electronic device recognizes the same, and displays a screen 3315 and a screen 3310.

Referring to FIG. 33B, a user selects (e.g., taps) a bus from a bus queue of a displayed bus application to display detailed arrival information. In the state in which the detailed arrival information of the selected bus is displayed as shown in the diagram 3351 in a screen 3340, when the electronic device selects another bus as shown in the diagram 3353, the electronic device recognizes the same and displays a screen 3345. The electronic device may display detailed arrival information of the selected bus, as shown in the diagram 3346, in the screen 3345. When the user selects another bus as shown in the diagram 3348, the electronic device may display detailed arrival information of the selected bus, as shown in the diagram 3351, in a screen 3350. In the state in which a bus application screen is displayed as shown in FIG. 33B, when a bus in a displayed bus queue is selected, the electronic device may display detailed arrival information of the bus selected by the user.

Referring to FIG. 33C, a screen 3360 displays a number 3007 bus estimated to arrive 5 minutes after the current time and overlaps a number 3200 bus. When detailed arrival information is selected, the electronic device may display detailed arrival information of a bus that arrives earlier (e.g., a bus estimated to arrive earlier based on a second unit, the number 3007 bus) in the overlapping bus numbers, as shown in the screen 3360. In the state in which the screen 3360 is displayed, when a bezel is rotated as shown in the diagram 3373, the electronic device recognizes the same, and displays detailed arrival information of the other bus (e.g., the number 3200 bus) in the same time zone, as shown in a screen 3365. In the state in which the screen 3365 is displayed, when a rotation of a bezel is recognized as shown in the diagram 3375, the electronic device may display detailed arrival information of a bus (a number 3007 bus that arrives 15 minutes after the current time) that arrives at another time, as shown in a screen 3370. In the state in which the screen 3370 is displayed, when a user rotates the bezel in the reverse direction, as shown in the diagrams 3377 and 3379, the electronic device may sequentially display detailed arrival information of buses that overlap in the same time zone (e.g., a number 3200 bus and a number 3007 bus), as shown in screens 3365 and 3360.

Referring to FIG. 33D, a user selects (e.g., taps) a bus from a bus queue of a displayed bus application so as to display detailed arrival information. Buses that are estimated to arrive 5 minutes after the current time may be displayed in the same time zone as illustrated in a screen 3380 and a screen 3385. In the state in which detailed arrival information of a first bus (e.g., a number 3007 bus) of the same time zone is displayed as shown in a screen 3380, when a bus in the same time zone is selected as shown in the diagram 3393, the electronic device may recognize the same and display a screen 3385. The electronic device may display detailed arrival information of another bus (e.g., a number 3200 bus) in the same time zone, in the screen 3385. When the user selects another bus as shown in the diagram 3395, the electronic device may display detailed arrival information of the selected bus in a screen 3390. In the state in which a bus application screen is displayed as shown in FIG. 33D, when a bus in a displayed bus queue is selected, the electronic device may display detailed arrival information of the bus selected by the user.

Figure 34A:
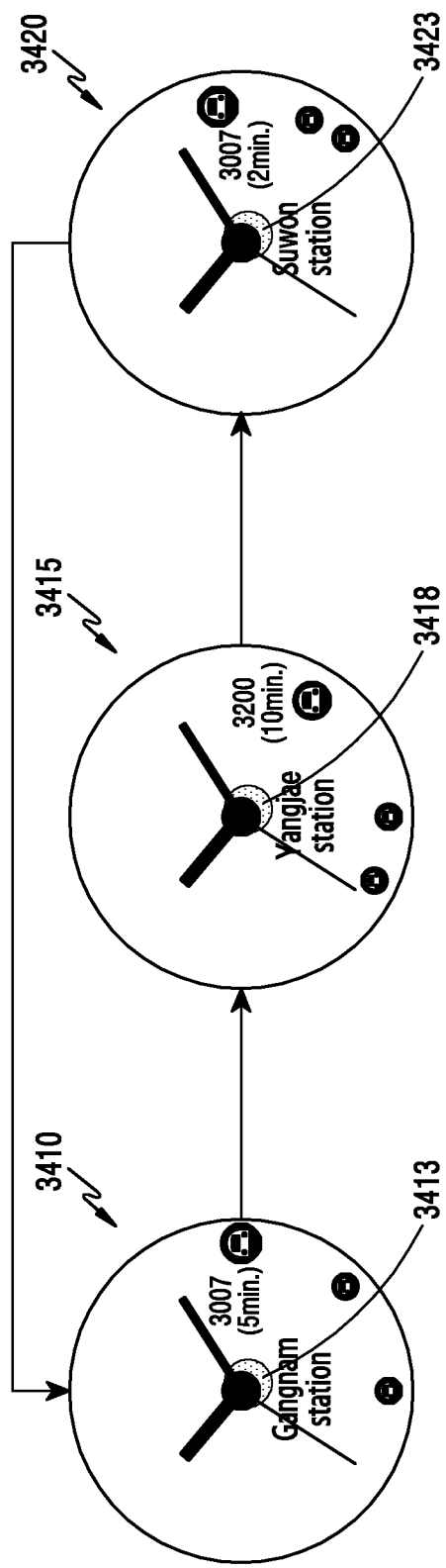
FIGS. 34A to 34D are diagrams illustrating setting a bus station and bus numbers in a screen of a bus application according to an embodiment of the present disclosure.

In the state in which a bus application screen is displayed, when the user requests to switch a station, the electronic device recognizes the same in step 3151, and displays an application screen of a subsequent station in step 3153. FIG. 34A illustrates an example in which three bus stations are set. A number M3007 bus and a number M3200 bus are set as buses that the user frequently takes. An electronic device may display a bus station name in a bus application screen, and may display detailed arrival information of a selected bus. When a bus station name is selected (e.g., tapped) as shown in the diagram 3413 in a screen 3410 of FIG. 34A, the electronic device recognizes the same as a request for switching a bus station in step 3151. When the current bus station is not the last set station, the electronic device may display a bus application screen of a subsequent station (e.g., bus station #2) as shown in a screen 3415 in step 3151. In the state in which the screen 3415 is displayed, when a bus station area is selected (e.g., tapped) as shown in the diagram 3418, the electronic device may display a bus application screen of a subsequent station (e.g., bus station # N). In the state in which a screen 3420 is displayed, when a bus station area is selected (e.g., tapped) as shown in the diagram 3423, the electronic device recognizes the screen 3420 is a bus application screen of the last set station, and may display the bus application screen 3410 of the first set station (e.g., bus station #1).

As illustrated in FIG. 34A, when a bus station name is selected, the electronic device may switch to an application screen of a subsequent bus station. The electronic device may display detailed arrival information including a bus number set by a user and an estimated arrival time, based on a bus station displayed after switching.

In the state in which a bus application is displayed, when a user selects the setting of a station and/or bus, the electronic device recognizes the same in step 3161, and performs a station adding and/or bus setting operation in step 3163.

Figure 34B:
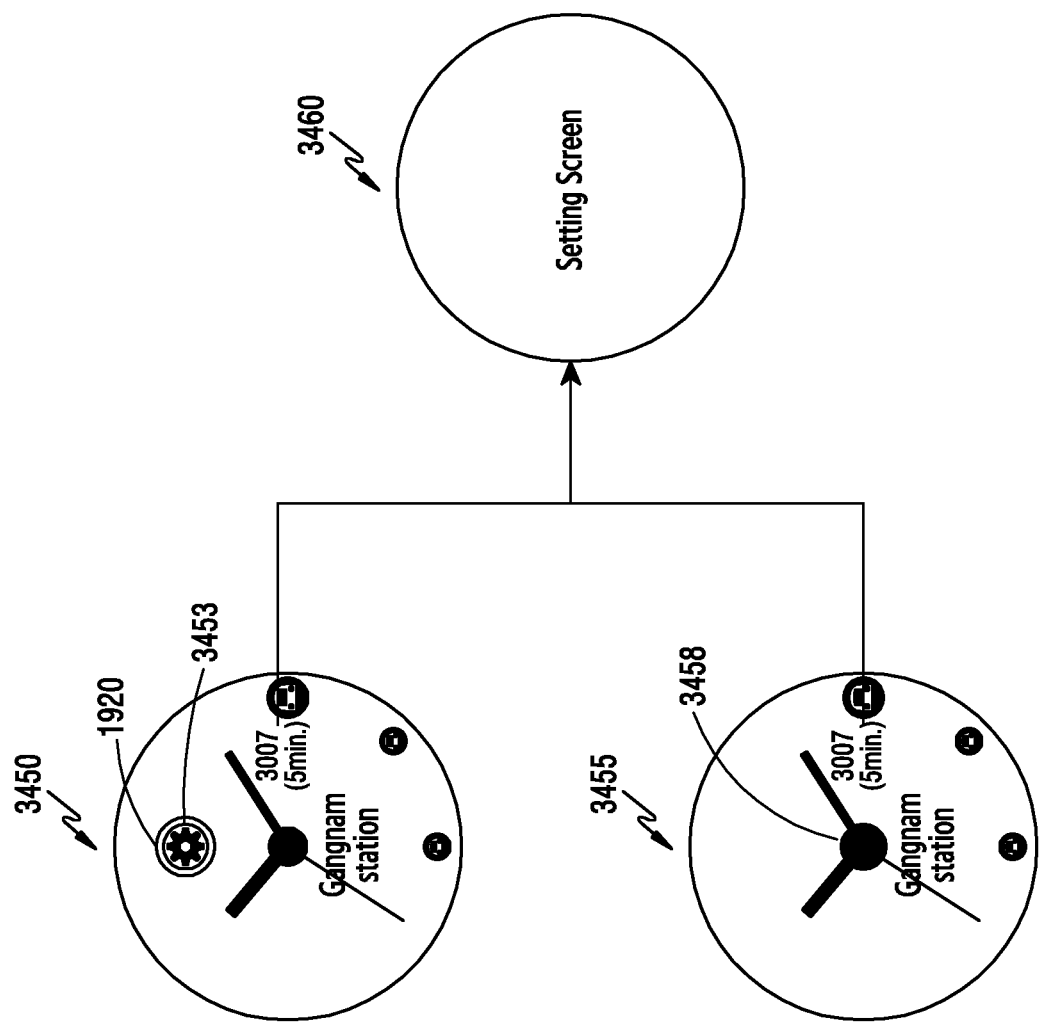

Referring to FIG. 34B, in the state in which a screen 3450 is displayed, when a user selects the setting button 1920, the electronic device recognizes that the setting of a bus station and/or bus is selected in step 3161, and enters a bus station and/or bus setting mode in step 3163 by displaying a setting screen as shown in a screen 3460. In the state in which a screen 3455 is displayed, when a user provides a long touch (tap and hold) on a bus station name as shown in the diagram 3458, the electronic device recognizes that the setting of a bus station and/or bus is selected in step 3161, and enters a bus station and/or bus setting mode in step 3163 by displaying a setting screen as shown in the screen 3460.

Figure 34C:
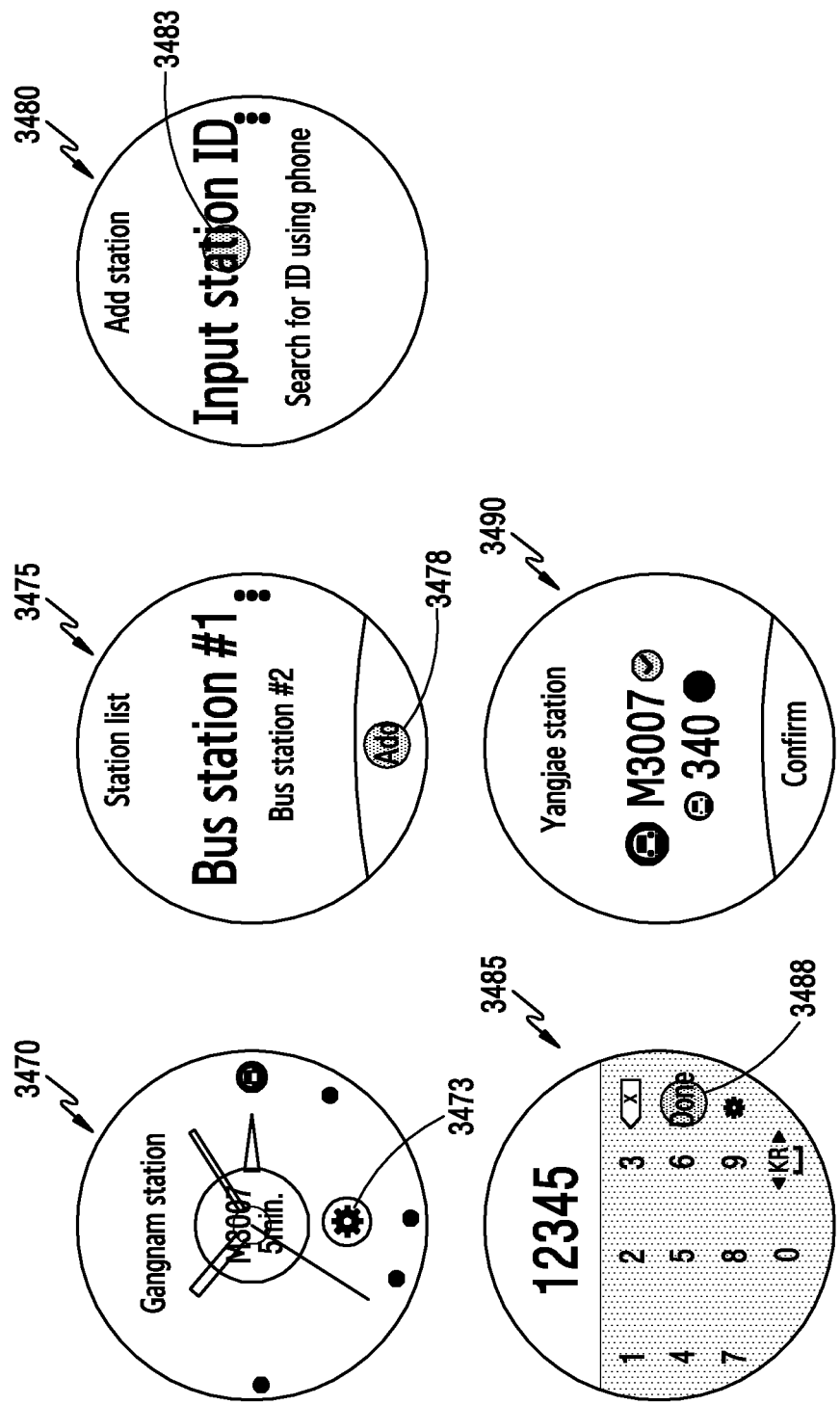

FIG. 34C is a diagram illustrating an operation of setting a bus station and/or bus by selecting the setting button 1920 according to an embodiment of the present disclosure. In the state in which a bus application is displayed as shown in a screen 3470, when a user selects a setting button as shown in the diagram 3473, the electronic device may display a bus station setting screen as shown in a screen 3475. When a bus station adding button is selected as shown in the diagram 3478 in the screen 3475, the electronic device may display a screen for inputting a station ID as shown in a screen 3480. When the user selects the inputting of a station ID as shown in the diagram 3483, the electronic device may display a keypad for inputting a station ID as shown in a screen 3485. When the user inputs a station ID through the keypad, and selects a done button as shown in the diagram 3488, the electronic device may display a bus list from which a bus number of an added bus station may be selected, as shown in a screen 3490. When the user selects a bus from the displayed bus list, and presses a confirm button, the electronic device may register an added bus station and bus numbers.

Figure 34D:
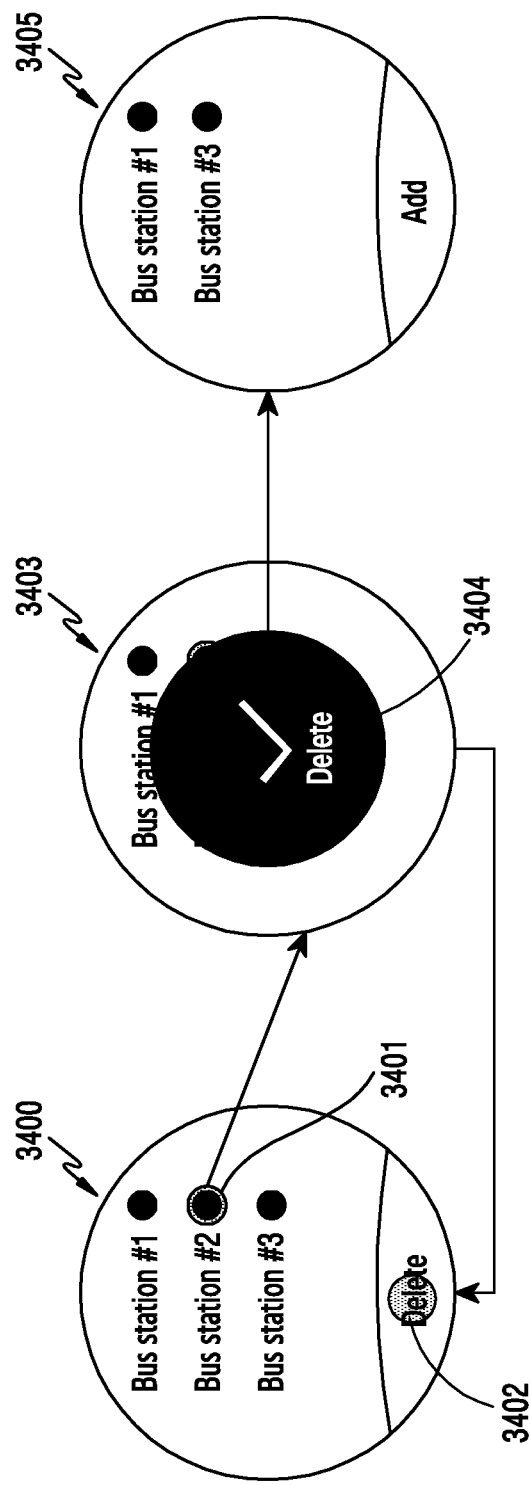

FIG. 34D is a diagram illustrating an operation of deleting a registered bus station. In the state in which a station list is displayed as shown in a screen 3400, when a registered bus station is selected (e.g., bus station #2) as shown in the diagram 3401, the electronic device may display a delete button. When the user selects the delete button as shown in the diagram 3402, the electronic device may delete a selected bus station as shown in the diagram 3403, and may display a message indicating that the bus station (e.g., bus station #2) has been deleted. After deleting the bus station, the electronic device may display a changed bus station list as shown in a screen 3405.

When a user requests the termination of the operations of the bus application while the bus application is executed as shown in FIG. 31, the electronic device recognizes the same, and terminates the operations of the bus application in step 3165.

As described above, a wearable electronic device may display bus arrival time of a set bus station in a clock screen that indicates the time using an hour hand and a minute hand. Therefore, a user may check the estimated arrival times of buses that are estimated to arrive at the set bus station, together with the current time through the clock screen. In the present disclosure the transportation means is a bus; however, the present disclosure is not limited to such. Through access to a server (content provider) capable of transmitting estimated arrival time information of a transportation mean, such as a bus application, arrival time information of various transportation means may be displayed in the wearable electronic device.

For example, in the case of a call taxi, when the server transmits a current location and an estimated arrival time of the taxi, the electronic device may identify the received estimated arrival time of the call taxi, and may display the estimated arrival time of the taxi in the location of the corresponding time in the hour hand or minute hand rotation area of the clock screen.

For example, in the case of a train, when the electronic device sets a station in the similar manner to the method of setting a bus station, and sets desired trains out of trains that stop at the station, the electronic device may register the selected station and train information. The electronic device may identify an estimated departure/arrival time of a train at the set station, which is transmitted from the server, and may display corresponding departure/arrival times of trains at the locations of the hour hand and minute hand rotation area of the clock screen, in the form of a queue. When the user selects a desired train for the detailed arrival/departure information from among the trains displayed in the form of a queue, the electronic device may display the detailed departure/arrival information of the corresponding train.

For example, in the case of a ship, the electronic device may set a harbor where a user gets on a ship, in the similar manner to the method of setting a bus station, and when desired ships are selected from among ships that depart from/arrive at the harbor, the electronic device may register the selected harbor and ship information. The electronic device may identify an estimated departure/arrival time of a ship at the set harbor, which is transmitted from the server, and may display corresponding arrival times of ships at the locations in the hour hand and minute hand rotation area of the clock screen, in the form of a queue. When the user selects a desired ship for the detailed arrival/departure information from among the ships displayed in the form of a queue, the electronic device may display the detailed arrival information of the corresponding ship.

For example, in the case of an airplane, the electronic device may set an airport where a user gets on an airplane, in the similar manner to the method of setting a bus station, and when a desired airplane is selected from among airplanes that depart from/arrive at the airport, the electronic device may register the selected airport and airplane information. The electronic device may identify an estimated departure/arrival time of an airplane at the set airport, which is transmitted from the server, and may display, in the form of a queue, corresponding arrival/departure times of airplanes at the locations in the hour hand and minute hand rotation area of the clock screen. When the user selects a desired airplane for the detailed arrival/departure information from among the airplanes displayed in the form of a queue, the electronic device may display the detailed departure/arrival information of the corresponding airplane.

A user may move through a plurality of transportation means (e.g., an intra-city bus and an inter-city bus, a bus and a train, a bus and an airplane, a train, a bus, and an airplane, and the like). In the case of using a plurality of transportation means, the electronic device may be equipped with applications corresponding to the transportation means. By executing an application of a corresponding transportation means, a station where a user gets on a transportation means and a transportation means that a user is to get on may be set. The electronic device may access a server of a set transportation means by executing an application of each transportation means. Subsequently, the electronic device may receive an estimated arrival/departure time of a transportation means set for a corresponding station, from a corresponding server of the transportation means, and may process the received estimated arrival/departure time of the transportation means in the form that may be displayed in the clock screen. When the display 250 displays an arrival/departure time of a corresponding transportation means in the clock screen, the electronic device may display an icon of the corresponding transportation means in the location of the corresponding arrival/departure time in the hour hand and/or minute hand rotation area. When the electronic device displays a plurality of transportation means through interaction, the electronic device may execute an application of a transportation means that arrives/departs first, and at a point in time when the corresponding transportation means arrives/departs, the electronic device may execute an application of the next transportation means.

According to an embodiment of the present dislosure, an operation method of a wearable electronic device includes displaying a clock screen using an hour hand and a minute hand, receiving time information associated with a transportation means, and displaying a transportation means icon in a location of the time information in a minute hand and/or hour hand rotation area of the clock screen.

The displaying operation may display transportation means icons of transportation means that arrive at/depart from a set station of the transportation means, according to the time information. The displaying operation may further include an operation of displaying detailed arrival/departure time of a selected transportation means when a transportation means icon is selected. The displaying operation may further include an operation of displaying an indicator that rotates according to a rotation of a bezel, and selects a transportation means icon indicated by the indicator. The displaying operation may display the clock screen, the transportation means icon, and the indicator in different layers. The transportation means may be a bus and the displaying operation may display detailed information of a selected bus, such as a number, an arrival time, and/or empty seats associated with the selected bus when a bus icon is selected. The displaying operation may display a bus queue and a setting icon in the clock screen, and displaying a station and/or bus number list when the setting icon is selected, and may register a bus station and a bus number selected from the displayed list. The displaying operation may further include an operation of switching to and displaying a subsequent set station when a predetermined location is selected in the clock screen. The displaying operation may further include an operation of displaying an additional option icon when the setting icon is selected, and an operation of displaying information including a delete icon for deleting a bus number when the additional option icon is selected. The displaying operation may further include an operation of executing a mini application that displays detailed information of a bus that arrives fastest at a set station, and an operation of switching to the displaying operation when a predetermined location is selected in a mini application screen.

According to an embodiment of the present disclosure, a wearable electronic device and an operation method thereof may effectively configure transportation information integrated and organized based on a user setting on a clock screen using the characteristics of the clock screen, may reduce user interaction for checking the transportation information, and may enable a user to intuitively recognize time information and arrival/departure time of a transportation means.

The embodiments of the present disclosure disclosed herein and shown in the drawings are merely specific examples presented in order to describe technical details of the present disclosure and to help the understanding of the present disclosure, and do not limit the scope of the present disclosure. Therefore, it should be construed that, in addition to the embodiments disclosed herein, all modifications and changes or modified and changed forms derived from the technical idea of the present disclosure fall within the scope of the present disclosure as defined by the appended claims and their equivalents.

What is claimed is:

1. A wearable electronic device comprising:
   a display configured to display a clock screen including an hour hand and a minute hand; and
   a processor configured to,
   execute an application that displays an icon including time information in a location corresponding to the time information in a minute hand rotation area of the clock screen or an hour hand rotation area of the clock screen,
   determine, based on a current location of the wearable electronic device, time information associated with at least one available transportation means,
   determine a difference between a current time and an arrival time included in the determined time information associated with the at least one available transportation means;
   when the difference between the current time and the arrival time is based on a minute unit, display at least one first icon corresponding to at least one first time information including minute unit-based time information from among the determined time information in a rotation area of the minute hand, and
   when the difference between the current time and the arrival time is based on an hour unit, display at least one second icon corresponding to at least one second time information including hour unit-based time information from among the determined time information in a rotation area of the hour hand.

2. The device of claim 1, wherein the first icon comprises at least one of an arrival time or a departure time of a first available transportation means associated with the first time information, and
   wherein the second icon comprises at least one of the arrival time or the departure time of a second available transportation means associated with the second time.

3. The device of claim 2, wherein the processor is further configured to display at least one of arrival or departure time of the first available transportation means when the first icon is selected and, display at least one of arrival or departure time of the second available transportation means when the second icon is selected.

4. The device of claim 3, further comprising a rotatable bezel; and
   the processor is further configured to display an indicator indicating the rotation of the bezel, and select at least one the first icon or the second icon corresponding to a location of the indicator.

5. The device of claim 4, wherein the processor is further configured to display the clock screen, the first icon and the second icon, and the indicator in different layers.

6. The device of claim 1, wherein the available transportation means is a bus and wherein at least one of the first icon or the second is bus icon, and
   the processor is further configured to display arrival information of a selected bus including a bus number, an arrival time, and empty seat information when the bus icon is selected.

7. The device of claim 6, wherein the processor is further configured to include a mini application for displaying information of a bus that arrives first to a set station, and
   switch to a bus application screen when a predetermined location is selected in a mini application screen.

8. The device of claim 1, wherein the processor is further configured to display a setting icon in the clock screen of a transportation application, and to set a station or a bus number when the setting icon is selected.

9. The device of claim 8, wherein the processor is further configured to set a plurality of stations, and
   switch to and display a subsequent set station screen when a predetermined location is selected in the screen of the transportation application.

10. The device of claim 8, wherein the processor is further configured to display an additional option icon when the setting icon is selected, and
    display information including a delete icon for deleting a bus number when the additional option icon is selected.

11. An operation method of a wearable electronic device comprising:
    displaying a clock screen including an hour hand and a minute hand;
    determining, based on a current location of the wearable electronic device, time information associated with at least one available transportation means;
    determining a difference between a current time and an arrival time included in the determined time information associated with the at least one available transportation means;
    when the difference between the current time and the arrival time is based on a minute unit, displaying at least one first icon corresponding to at least one first time information including minute unit-based time information from among the determined time information in a rotation area of the minute hand; and
    when the difference between the current time and the arrival time is based on an hour unit, displaying at least one second icon corresponding to at least one second time information including hour unit-based time information from among the determined time information in a rotation area of the hour hand.

12. The method of claim 11, wherein the first icon comprises at least one of an arrival time or a departure time of a first available transportation means associated with the first time information, and
    wherein the second icon comprises at least one of the arrival time or the departure time of a second available transportation means associated with the second time information.

13. The method of claim 12, wherein at least one of the arrival time or the departure time of the first available transportation means is displayed when the first icon is selected; and
    wherein at least one of the arrival time or the departure time of the second available transportation means is displayed when the second icon is selected.

14. The method of claim 13, wherein displaying at least one of the first icon or the second icon further comprises:
    displaying an indicator that rotates according to a rotation of a bezel, and selecting at least one the first icon or the second icon indicated by the indicator.

15. The method of claim 14, further comprising:
    displaying the clock screen, the first icon and the second icon, and the indicator in different layers.

16. The method of claim 11, wherein the available transportation means is a bus, and wherein at least one of the first icon or the second is bus icon, and
    displaying at least one of the first icon or the second icon further comprises displaying information of a selected bus including at least one of a bus number, an arrival time, and empty seat information associated with the selected bus when the bus icon is selected.

17. The method of claim 16, further comprising:
    executing a mini application that displays detailed information of a bus that arrives first at a set station; and
    switching to a displaying operation that displays a bus application screen when a predetermined location is selected in a mini application screen.

18. The method of claim 11, wherein displaying at least one of the first icon or the second icon further comprises:
    displaying a bus queue and a setting icon in the clock screen, and displaying a bus station or a bus number list when the setting icon is selected; and
    registering a bus station and a bus number selected from the displayed list.

19. The method of claim 18, wherein displaying the clock screen further comprises:
    switching to and displaying a subsequent set station when a predetermined location is selected in the clock screen.

20. The method of claim 18, wherein displaying at least one of the first icon or the second icon further comprises:
    displaying an additional option icon when the setting icon is selected; and
    displaying information including a delete icon for deleting a bus number when the additional option icon is selected.

* * * * *